United States Patent
Drexl et al.

(12)

(10) Patent No.: US 6,234,290 B1
(45) Date of Patent: May 22, 2001

(54) ACTUATING INSTALLATION FOR PNEUMATIC CLUTCH ACTUATION WITH OVERLOAD PROTECTION AND/OR INCORRECT-OPERATION PROTECTION

(75) Inventors: Hans-Jürgen Drexl, Schonungen; Barbara Ester, Schweinfurt; Frank Hirschmann, Niederwerrn; Jürgen Liebler, Schweinfurt; Joachim Lindner, Dittelbrunn; Thomas Otto, Gochsheim; Jörg Pankoke, Bergrheinfeld; Winfried Stürmer, Enerbach, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/369,825

(22) Filed: Aug. 6, 1999

(30) Foreign Application Priority Data

Aug. 6, 1998 (DE) ............................... 198 35 574

(51) Int. Cl.⁷ ..................................................... F16D 25/08
(52) U.S. Cl. .................................... 192/85 CA; 192/91 A
(58) Field of Search ........................... 192/85 R, 85 CA, 192/914 A, 99 S, 114 R

(56) References Cited

U.S. PATENT DOCUMENTS

| 4,621,721 | 11/1986 | Czerwick et al. |
| 4,796,739 | * 1/1989 | Jonner et al. ................ 192/85 R X |
| 5,038,907 | * 8/1991 | Baumann et al. ................ 192/99 S |

FOREIGN PATENT DOCUMENTS

| 37 31 118 | 3/1989 | (DE) . |
| 43 22 677 | 1/1994 | (DE) . |
| 197 16 600 | 12/1997 | (DE) . |
| 352 661 | 1/1990 | (EP) . |
| 997 046 | 6/1965 | (GB) . |
| 101 0030 | 11/1965 | (GB) . |
| 1 131 994 | 10/1968 | (GB) . |
| 2 058 272 | 4/1981 | (GB) . |
| 2 076 101 | 11/1981 | (GB) . |
| 2 231 933 | 11/1990 | (GB) . |
| 2 314 137 | 12/1997 | (GB) . |
| 61-32829 | 2/1986 | (JP) . |
| 5-14663 | 2/1993 | (JP) . |
| WO 93/13328 | 7/1993 | (WO) . |

* cited by examiner

Primary Examiner—Richard M. Lorence
(74) Attorney, Agent, or Firm—Cohen, Pontani, Lieberman & Pavane

(57) ABSTRACT

An actuating installation for a friction clutch arranged in the drive line between a drive unit and a transmission. The installation having an actuating arrangement for the actuation of the friction clutch and a clutch-pedal arrangement, which is connected to the actuating arrangement and has a clutch pedal, which, in a first operating state, is actuable according to a force-travel characteristic of a first type. The actuating installation has a signaling and/or protection device, which is in operative connection with or is operatively integrated in the clutch-pedal arrangement, so that, after the response of the signaling and/or protection device to a second operating state, the clutch pedal can be actuated only according to a force/travel characteristic of a second type, which differs significantly from the force/travel characteristic of the first type in order thus to indicate the second operating state.

59 Claims, 19 Drawing Sheets

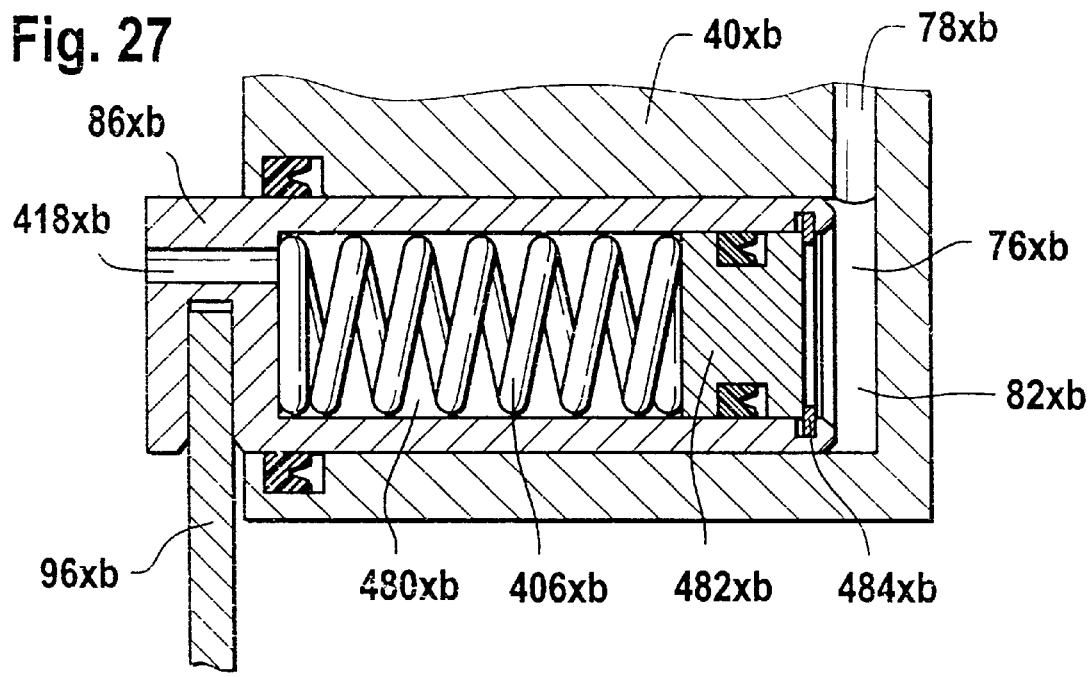
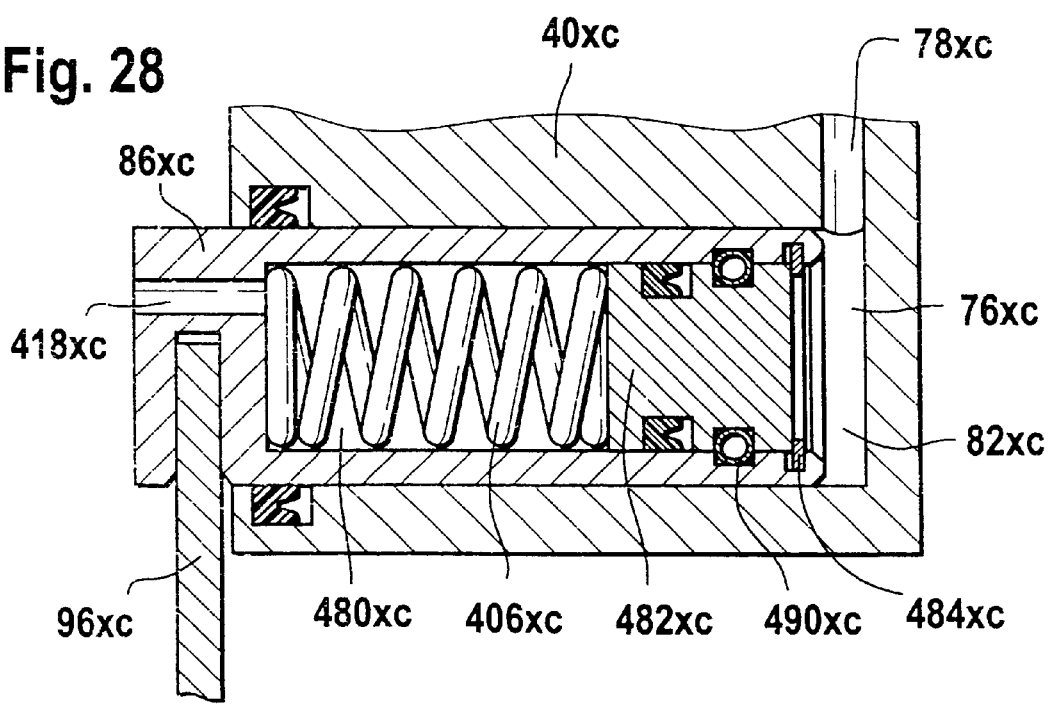

ACTUATING INSTALLATION FOR PNEUMATIC CLUTCH ACTUATION WITH OVERLOAD PROTECTION AND/OR INCORRECT-OPERATION PROTECTION

SUMMARY OF THE INVENTION

1. Field of the Invention

The present invention relates to an actuating installation for a friction clutch arranged in the drive line of a motor vehicle, in particular a commercial vehicle, between a drive unit, in particular an internal combustion engine, and a transmission. Such an installation has an actuating arrangement for the actuation of the friction clutch, a clutch-pedal arrangement connected to the actuating arrangement and having a clutch pedal for the actuation of the friction clutch by means of the actuating arrangement. The clutch pedal, in at least one first operating state of the actuating installation and/or of the friction clutch and/or of the motor vehicle, is actuable according to a force/travel characteristic of a first type.

2. Discussion of the Prior Art

Such an actuating installation has been disclosed by German reference DE 197 16 600 A1, the disclosure contents of which are included in the present application. In this actuating installation, the actuating arrangement comprises a positioning arrangement, which has a control valve, and a release-bearing arrangement, which serves to actuate the friction clutch. The positioning arrangement comprises a pneumatic-power cylinder arrangement, which acts on the release-bearing arrangement and which, via the control valve connected to a pneumatic source, can be actuated as a function of a hydraulic or mechanical reference variable and an actual variable representing the position of the release-bearing arrangement. The reference variable can be produced by means of the clutch-pedal arrangement and can be transmitted to the positioning arrangement by means of a mechanical or hydraulic transmission section.

The positioning arrangement comprises a hydraulic measuring-cylinder arrangement, which detects the actual variable representing the position of the release-bearing arrangement and feeds it back hydraulically to the control valve. The control valve, working according to the pressure-balance principle, controls the feed of pneumatic medium into the pneumatic-power cylinder arrangement or the discharge of pneumatic medium from the pneumatic-power cylinder arrangement in such a way that, during a clutch-pedal actuation, an essentially constant hydraulic pressure is maintained at a hydraulic-system-side inlet of the control valve. To this end, the positioning arrangement works with the control valve as a hydraulic/mechanical control loop.

In such an actuating installation, there is the problem that, if the pneumatic source cannot provide sufficient pneumatic pressure, for example after a prolonged stoppage of the motor vehicle having the actuating installation, the positioning arrangement is inoperative. The positioning arrangement could also be inoperative for another reason, for example because the control valve is defective. If the clutch pedal is actuated when the positioning arrangement is inoperative, the hydraulic pressure in the hydraulic system rises above the pressure level which normally occurs. Such a rise in the hydraulic pressure may be controlled, for example, by the hydraulic system being designed to be sufficiently burst-proof and by the hydraulic measuring-cylinder arrangement being designed as a hydraulic emergency-actuating-force cylinder arrangement. This will often generally be the case when the positioning arrangement is designed as a so-called "positioning servo arrangement", in which the positioning arrangement thus produces an auxiliary release force, which assists the hydraulic or mechanical release force produced by pedal force.

When in this case a positioning arrangement is referred to below, unless expressly indicated otherwise this generally means an arrangement in which the positioning arrangement not only produces an "auxiliary force", assisting the release, in addition to a release force exerted hydraulically or mechanically on the release-bearing arrangement and originating directly from the clutch-pedal actuation, but rather the only or solely essential release force. According to this usage, the term "positioning arrangement"—thus implies "external energy" - actuation of the clutch in contrast to a "servo actuation"—with two components producing release force, that is in contrast to a clutch actuation—assisted by "external energy"—by means of the pedal force exerted on the clutch pedal and transmitted to the release-bearing arrangement.

If it is not desired to design the hydraulic measuring-cylinder arrangement as a hydraulic emergency-actuating-force cylinder arrangement, for example because the hydraulic measuring-cylinder arrangement is contained in a control-valve construction unit removable independently of the pneumatic-power cylinder arrangement and only has a hydraulic cylinder which acts eccentrically or non-coaxially on the release-bearing arrangement, the following problems or disadvantages occur when a positioning arrangement is inoperative:

If the hydraulic system is designed in such a way that hydraulic pressures which may occur during a clutch-pedal actuation without an operative positioning arrangement can be withstood without bursting, this increases the costs and the weight of the hydraulic system without being of further advantage. Since extremely high hydraulic pressures may briefly occur during a rapid clutch-pedal actuation, for example in dangerous situations, the hydraulic system ought to be designed to be even extremely burst-proof at a corresponding cost.

Due to the high hydraulic pressures, damage to the positioning arrangement or to the release-bearing arrangement may occur, in particular at the hydraulic measuring cylinder and at the control valve as well as at a carrier arrangement connecting the release-bearing arrangement to the hydraulic measuring cylinder. In order to avoid such damage, said components ought to be designed for absorbing extremely high forces, which again means a high cost and a corresponding increase in the weight of the system.

If all the components can withstand the high pressures or forces, there is still the grave risk that, in the case of a hydraulic measuring-cylinder arrangement acting eccentrically or non-coaxially on the release-bearing arrangement or the pneumatic-power cylinder arrangement, the pneumatic-power cylinder arrangement will jam in a self-locking manner due to the tilting moments which occur, as a result of which the operability of the actuating installation is put at risk.

In the search for a remedy, said German reference DE 197 16 600 A1 proposes to provide an overload-protection arrangement in the form of a hydraulic cylinder with spring-preloaded piston in the hydraulic system. The overload-protection arrangement works as a pressure accumulator, since the spring preloading is proportioned in such a way that, when the positioning arrangement is operative, the hydraulic pressures which occur are not sufficient to noticeably move the piston against the spring preloading in the direction of an increase in volume of the hydraulic cylinder space, which is constantly in flow connection with the hydraulic system.

On the other hand, if the positioning arrangement is inoperative, for example on account of a lack of compressed air, the overload-protection device, after a preset pressure threshold has been reached, by appropriate increase in volume of the hydraulic cylinder space against the spring preloading, can absorb the hydraulic volume displaced from a hydraulic master cylinder of the clutch-pedal arrangement, so that the hydraulic pressure is limited and kept essentially constant in the process, and damage to components of the actuating installation is avoided.

German reference DE 197 16 600 A1 proposes as a further possible remedy to connect an overload valve to the hydraulic line connecting the hydraulic master cylinder to the control valve, which overload valve permits a flow of hydraulic medium from the hydraulic line to a supply side of the master cylinder only when the hydraulic pressure exceeds a preset pressure threshold. The pressure threshold is selected in such a way that the overload valve, designed as a check valve, only permits a backflow of hydraulic pressure medium from the pressure region of the hydraulic system to the supply side of the master cylinder when the hydraulic pressure which occurs reaches an inadmissibly high degree on account of an inoperative positioning arrangement.

Similar approaches to the limiting of a hydraulic pressure in a hydraulic system of a clutch-actuating installation by means of a hydraulic pressure accumulator or a pressure-limiting valve are also disclosed by German reference DE 43 22 677 A1. Other approaches to the avoidance of inadmissibly high actuating forces in a clutch-actuating installation are disclosed by German reference DE 37 31 118 A1. In this laid-open specification, a multi-piece clutch-pedal plunger is proposed, in which two plunger elements are connected by means of a sleeve producing a frictional connection. If the actuating forces exceed a certain threshold value, the plunger can be telescoped by idle travel by the two plunger elements being pushed deeper into the sleeve against the friction forces of the frictional connection. As an alternative solution, German reference DE 37 31 118 A1 proposes to insert a spring arrangement between a one-piece plunger and a piston of a hydraulic master cylinder, the preloading of the spring arrangement being selected in such a way that, during clutch-actuating forces which normally occur, the spring arrangement acts as a rigid connection and does not yield. The preloading force of the spring arrangement is not overcome until markedly higher actuating forces occur, and the plunger can then retract while performing idle travel in a recess of the piston. As a further possibility, the laid-open specification proposes that appropriate springs or frictional means may also be arranged at another point, for example at the pressure plunger of a hydraulic slave cylinder, which acts directly on a release fork. Appropriate springs or frictional means for limiting the actuating forces are also supposed to be capable of being used during a mechanical clutch actuation by means of a linkage or cable pull.

A common aspect of all the solution proposals mentioned is that, although they more or less reliably prevent the occurrence of excessively high hydraulic pressures or actuating forces, damage which is caused indirectly cannot be reliably prevented. This is because the driver of the motor vehicle will notice that a proper clutch actuation is momentarily not possible at best when he is extremely attentive, something which is not normally to be expected, since he could of course actuate the clutch pedal in a seemingly "normal" manner. In the event of a response of the above-mentioned protection mechanisms for limiting the hydraulic pressure or for limiting the actuating force, although a laboratory measurement of the force/travel characteristic of the clutch-pedal actuation will possibly show certain well-defined differences compared with a corresponding force/travel characteristic when the clutch-actuating installation is normally operative, a human, especially when under stress in traffic or even in dangerous situations, cannot be expected to be sufficiently sensitive to perceive the possible occurrence of slight changes in the force/travel characteristic when the protection mechanisms respond. The driver will therefore assume that everything is all right and will operate the motor vehicle normally, for instance engage or change a gear. However, since the clutch is actually not actuated, these actions may lead to consequential damage, for instance to the transmission or the clutch itself.

SUMMARY OF THE INVENTION

Against this background, the object of the invention is to avoid such indirect damage on account of incorrect operations or to generally avoid incorrect operations with increased reliability. To achieve this object, it is proposed according to the invention that a signaling and/or protection device, in particular an incorrect-operation and/or damage-protection device, be provided which is in operative connection with or is operatively integrated in the clutch-pedal arrangement in such a way that, after the response of the protection device to at least one second operating state of the actuating installation and/or of the friction clutch and/or of the motor vehicle, the clutch pedal, in a response state of the signaling and/or protection device, can be actuated only according to a force/travel characteristic of a second type, which, in order to indicate the second operating state, differs significantly from a force/travel characteristic of the first type.

If there is a positioning arrangement as in German reference DE 197 16 600 A1, the state which exists when the positioning arrangement is operative on account of an operative control valve and sufficient pneumatic pressure may, for example, be regarded as the first operating state for the purposes of the invention. In this case, the clutch pedal, according to the invention, is to be actuable in accordance with a force/travel characteristic of a first type. As a rule, a conventional force/travel characteristic will be selected, in which the actuating forces required for the clutch-pedal movement decrease slightly in the course of the clutch-pedal actuation. Since the force/travel characteristic could easily change in the course of increasing wear of the friction clutch (depending on the design of the friction clutch), reference is made to a force/travel characteristic of a first type and not to a first force/travel characteristic.

With the prerequisite mentioned, the state which exists when the positioning arrangement is inoperative, for example on account of a lack of pneumatic pressure, could be regarded as the second operating state. According to the invention, a signaling and/or protection device is provided which, after the response of the protection device to the second operating state, ensures that the clutch pedal can be actuated only according to a force/travel characteristic of a second type. According to the invention, the force/travel characteristic of the second type differs significantly from the force/travel characteristic of the first type, as a result of which the existence of the second operating state (in the example the inoperability of the positioning arrangement) is clearly signaled to the driver.

As an alternative or in addition, a possibility which could also be considered would be to signal the existence of the second operating state by an optical and/or acoustic alarm being transmitted. However, the signaling of the second operating state by means of the change in the force/travel characteristic has the great advantage that the driver will immediately associate this signal with his instantaneous action, namely the actuation of the clutch pedal, and without further thought will draw the conclusion from this that something is not right with the clutch or with the clutch-actuating installation. An acoustic or optical signal, which may relatively easily be missed or not heard anyway, must first be rationally evaluated so that the driver recognizes the situation and draws the necessary conclusions, that is, for example, stops the intended further actions (for instance engaging/changing a gear).

Unlike the example having a positioning arrangement as disclosed by DE 197 16 600 A1, which example is explained above and corresponds to a preferred embodiment, the invention may also be used for other purposes. Thus, in principle, the existence or non-existence of any state of the actuating installation, the friction clutch or the motor vehicle may be indicated to the driver via the clutch pedal by the force/travel characteristic being changed from a first type to a second type. Considered here in particular are faults or exceptional states in which the friction clutch or the clutch pedal should not be actuated, at least momentarily. However, it is also conceivable in this case for the signaling and/or protection device to respond to several different operating states of this type, since it is primarily a matter of actually first of all drawing the driver's attention to an incorrect or exceptional situation. The particular state or states which exist can then be deduced by the driver from corresponding optical indications or the like. The invention can therefore be advantageously used completely irrespective of how the actuating arrangement or the drive unit is designed. An electric motor could thus be provided instead of an internal combustion engine. It would also be possible for the actuating arrangement to be activated electrically. In the last-mentioned case, the clutch-pedal arrangement could expediently contain a simple electric displacement sensor or angle sensor, which detects the clutch-pedal actuation and converts it into an electrical signal. Excessive actuating forces or hydraulic pressures on account of the clutch-pedal actuation are then unable to occur. Nonetheless, it may be appropriate to signal the existence of an incorrect or exceptional state to the driver via the clutch pedal. A possibility which could also be considered is apply the inventive idea in a corresponding manner to another pedal of the vehicle, in particular the accelerator pedal.

The signaling and/or protection device may receive at least one electric and/or mechanical and/or hydraulic and/or pneumatic and/or optical signal, which directly or indirectly indicates whether a first or a second operating state is present. When a signal is mentioned here, this may be any variable input into the system (actuating installation) or occurring in the latter, such as, for instance, the force or velocity with which the clutch pedal is actuated, the hydraulic pressure in a hydraulic system possibly provided, or the pneumatic pressure delivered by a pneumatic source possibly provided. Irrespective of the representation of the signal (for instance by a voltage, a current, a pressure, a force, a volume, a travel, an angle or a light intensity), the respective signal may represent a primary variable which determines or jointly determines the operating state or which corresponds to an actuating state of the actuating arrangement or of the clutch-pedal arrangement or is dependent thereon. As already partly indicated, the primary variable may be an actuating force, a hydraulic pressure in a hydraulic system connecting the clutch-pedal arrangement to the actuating arrangement, a pneumatic pressure in a pneumatic system assigned to the actuating arrangement, an actuating-travel difference, an actuating velocity or a hydraulic-medium volumetric flow (volume per unit of time) in the hydraulic system. In the case of an actuating-travel difference, what is being considered is, in particular, a difference between actuating travel of the clutch pedal and actuating travel of, for instance, a release-bearing arrangement, in which case absolute amounts of travel need not be related to one another but rather the amounts of travel may also be converted to a comparable scale if need be. In the case of an actuating velocity, this refers to the actuating velocity of the clutch pedal or possibly also to the actuating velocity of a release-bearing arrangement. In the case of a hydraulic system which is to activate the actuating arrangement, this actuating velocity will also be reflected directly in the hydraulic-medium volume. A variable determining or jointly determining the operating state is, for example, the pneumatic pressure delivered by the pneumatic source. If this pneumatic pressure is too low, a second operating state exists in the example explained above. An example of a primary variable determining or jointly determining the actuating state of the clutch-pedal arrangement is the clutch-pedal-actuating velocity or the force with which the clutch pedal is actuated. An example of a primary variable determining or jointly determining the actuating state of the actuating arrangement, in the case of a hydraulic system, would be the hydraulic pressure prevailing in the hydraulic system or the hydraulic-medium volumetric flow flowing to the actuating arrangement.

The signaling and/or protection device may therefore be designed to respond to a clutch-pedal force exceeding a limit value; and/or to a hydraulic pressure exceeding a limit value in a hydraulic system connecting the clutch-pedal arrangement to the actuating arrangement; and/or to an incorrect or exceptional state of the actuating installation and/or of the friction clutch and/or of the motor vehicle; and/or to a pneumatic pressure undershooting a limit value in a pneumatic system assigned to the actuating installation; and/or to an actuating velocity, exceeding a limit value, of the clutch pedal and/or a hydraulic-medium volumetric flow (volume per unit of time) exceeding a limit value in a hydraulic system connecting the clutch-pedal arrangement to the actuating arrangement; and/or to a difference exceeding a limit value between clutch-pedal-side actuating travel and clutch-side actuating travel.

It is also proposed for the signaling and/or protection device that, in the response state, it prevents a secondary variable rising above a critical threshold, the secondary variable occurring in the actuating installation and being directly or indirectly dependent on the actuating state of the clutch-pedal arrangement. Alternatively or additionally, the signaling and/or protection device may smooth peaks of a secondary or tertiary variable or of the secondary or tertiary variable occurring in the actuating installation and dependent directly or indirectly on the actuating state of the clutch-pedal arrangement.

When primary, secondary and tertiary variables are mentioned here, a sequence in a signal chain from the clutch-pedal arrangement to the actuating arrangement is thus to be considered. A primary variable would be, for example, the force with which the clutch pedal is depressed. A secondary variable would then be, for example, the force which acts on a hydraulic piston of a hydraulic master-cylinder arrangement of the clutch-pedal arrangement. A tertiary variable would then be, for example, the hydraulic pressure in the hydraulic system adjoining the hydraulic master cylinder. However, this hydraulic pressure could also be regarded as a secondary variable, and a tertiary variable would then be, for example, the force exerted on the release-bearing arrangement by a hydraulic measuring-cylinder arrangement possibly provided. A further possibility is that the hydraulic pressure in a master-cylinder-side part of the hydraulic system is regarded as primary variable, and the hydraulic pressure in an actuating-arrangement-side part of the hydraulic system is regarded as secondary variable. Further combinations and allocations are possible. The secondary variable and/or the tertiary variable may thus be, for example, an actuating force (occurring somewhere in the actuating installation), a hydraulic pressure in a hydraulic system connecting the clutch-pedal arrangement to the actuating arrangement, an actuating-travel difference, an actuating velocity or a hydraulic-medium volumetric flow (volume per unit of time) in the hydraulic system.

As especially effective, it is proposed that the signaling and/or protection device act on the secondary or tertiary variable in such a way as to limit the rise in said variable and/or to smooth said variable by virtue of the fact that a)i) an actuating force is stored in an energy storage arrangement and/or ii) is absorbed by an abutment arrangement, and/or b) actuating travel is absorbed by an idle-travel arrangement; and/or c) an actuating velocity is decelerated by a braking device, and/or d)i) a hydraulic connection is interrupted by a hydraulic interrupt device and/or ii) is choked by a hydraulic choke device, and/or e)i) hydraulic medium is stored intermediately by a hydraulic pressure accumulator arrangement and/or ii) is discharged by a hydraulic discharge device into a pressureless or pressure-reduced region of the hydraulic system and/or is stored intermediately by a hydraulic-medium intermediate-accumulator arrangement while reducing the hydraulic pressure prevailing in the hydraulic system.

In this case, it may be expedient that a plurality of the measures mentioned under a) to e) are used simultaneously and/or successively according to a preset program of travel measures in order to provide a certain force/travel characteristic. One possibility would be that, in the course of a clutch-pedal actuation, after the response of the signaling and/or protection device, the force/travel characteristic is first significantly determined by measure a)i) and/or measure e)i) and is then significantly determined by measure b) and/or measure e) ii) or by measure a)ii) or measure d)i).

In general, with regard to an especially clear signaling function, it is proposed as an indication of the second operating state that a force/travel characteristic of the second type differs from a force/travel characteristic of the first type owing to the fact that, according to the force/travel characteristic of the second type, the clutch pedal, at least over a substantial part of its actuating stroke, can be actuated against substantially reduced counterforces or even without substantial counterforces, or the clutch pedal, with actuating forces to be expected from a vehicle driver, can be actuated at most only over a markedly restricted section of the actuating stroke possible according to the force/travel characteristic of the first type or only against substantially larger counterforces.

In general, it is proposed as especially preferred that the signaling and/or protection device have a blocking and/or braking device, by means of which the clutch pedal can be blocked and/or braked. In a preferred design, provision is made for the blocking and/or braking device to comprise at least one engagement element assigned to the clutch-pedal arrangement for the blocking or braking of an actuating movement of the clutch pedal by producing a positive-locking or frictional engagement between the engagement element, moving along during a clutch-pedal actuation, and an associated counterelement secured against an associated movement during the clutch-pedal actuation.

In this connection, it is especially expedient if the engagement element and the counterelement can be brought into engagement with one another by mechanical and/or hydraulic and/or electrical conversion of an actuating force exerted on the clutch pedal and/or by means of a hydraulic slave-cylinder arrangement, if need be against the action of a preloading-spring arrangement, which preloads the engagement element and the counter-engagement element in the direction of a position without mutual engagement, or if the engagement element and the counterelement are preloaded by means of a preloading-spring arrangement in the direction of mutual engagement and can be disengaged from one another by means of a pneumatic-cylinder arrangement against the action of the preloading-spring arrangement. If no pneumatic pressure is available in the latter case, the preloading-spring arrangement brings engagement element and counterelement into engagement with one another or keeps them in engagement with one another.

In one embodiment, the clutch-pedal arrangement comprises a plunger arrangement, which connects the clutch pedal to a transmitter-element arrangement, in particular a hydraulic master cylinder, has the engagement element, has a longitudinal axis and is displaceable at least approximately along the longitudinal axis in accordance with the actuating movement of the clutch pedal, in which case the extension of the plunger arrangement is variable in at least one radial direction relative to the longitudinal axis as a function of the actuating force exerted on the plunger arrangement by the clutch pedal, and—if the extension exceeds a limit on account of an actuating force exceeding a limit value—the engagement element, projecting beyond the limit, of the plunger arrangement can be brought into positive-locking or frictional engagement with the associated counterelement in order to block or brake the actuating movement. In this case, the plunger arrangement may comprise a first end element, having a clutch-pedal-side end, and a second end element, having a transmitter-element-side end and movable relative to the first end element, a spring arrangement being effective between the end elements, if need be via at least one intermediate element, which spring arrangement preloads the end elements relative to one another in order to spread the two ends apart, in which case a relative movement, shortening the distance between the two ends, of the two end elements against the preloading force of the spring arrangement can be converted into an extension or swing-out movement of the engagement element, if need be serving as intermediate element, in the direction of the limit. With regard to a clear signal to the driver, it is proposed that the shortening in the distance between the two ends which is necessary for producing the engagement between engagement element and counterelement be substantially less than the disengaging travel of the clutch pedal.

In another embodiment, a transmitter-element arrangement, in particular a hydraulic master cylinder, having the engagement element may have a transmitter element, in particular a hydraulic piston, which is motionally coupled to the clutch pedal and is displaceable along an axis of movement in accordance with the actuating movement of the clutch pedal, in which case the extension of the transmitter element is variable in at least one radial direction relative to the axis of movement as a function of the actuating force exerted on the transmitter element by the clutch pedal, if need be via a transmission arrangement, and—if the extension exceeds a limit on account of an actuating force exceeding a limit value—the engagement element, projecting beyond the limit, of the transmitter element can be brought into positive-locking or frictional engagement with the associated counterelement in order to block or brake the actuating movement. To this end, the transmitter element may comprise a first sectional element, motionally coupled to the clutch pedal, and a second sectional element, movable relative to the first sectional element, a spring arrangement being effective between the sectional elements, if need be via an intermediate element, which spring arrangement preloads the sectional elements relative to one another in order to spread the two sectional elements apart, in which case a relative movement of the two sectional elements toward one another against the preloading force of the spring arrangement can be converted into an extension or swing-out movement of the engagement element, if need be serving as intermediate element, in the direction of the limit. For a clear signal to the driver, it is again recommended that the relative movement of the two sectional elements which is necessary for producing the engagement between engagement element and counterelement be substantially less than the disengaging travel of the clutch pedal.

With regard to another exemplary embodiment which is very effective with regard to the overload-protection function and the signaling function, it is proposed that a pedal anchor secured in the vehicle be provided, which pedal anchor carries the engagement element or serves as engagement element, and that the clutch pedal carry the counterelement or serve as counterelement. The clutch pedal can be locked in a positive manner on the pedal anchor in a preset position by the engagement element and the counterelement. Furthermore, it is proposed that one element of engagement element and counterelement be a sliding pin, which engages in an opening of the other element in order to block the clutch pedal.

In another approach, the signaling and/or protection device may comprise a hydraulic interrupt and/or choke device, by means of which a hydraulic connection connecting a hydraulic master-cylinder arrangement of the clutch-pedal arrangement to the actuating arrangement can be interrupted and/or choked. Depending on the design of the actuating installation, the hydraulic interrupt and/or choke device may serve as blocking and/or braking device for the clutch pedal in the above-mentioned sense. This is because, if the hydraulic connection is interrupted, no hydraulic medium can flow off from the hydraulic master cylinder, provided other hydraulic flow paths are not open or opened. If no hydraulic medium can flow off, the clutch pedal can also no longer be actuated in the case of a rigid connection between clutch pedal and hydraulic piston of the hydraulic master cylinder. The same applies correspondingly to a hydraulic choke device by means of which the clutch pedal can be braked under said preconditions.

The hydraulic interrupt and/or choke device preferably comprises a barrier element, which can be moved out of a through position without interrupting or choking the hydraulic connection into a barrier position and, in the barrier position, reduces the cross section of a hydraulic passage or closes the latter. In this connection, it is proposed as especially expedient that the barrier element can be put into the barrier position by mechanical and/or hydraulic and/or electrical conversion of an actuating force exerted on the clutch pedal and/or by means of a hydraulic slave-cylinder arrangement, preferably against the action of a preloading-spring arrangement, which preloads the barrier element in the direction of the through position, or that the barrier element can be put into the barrier position by means of a preloading arrangement preloading the barrier element in the direction of the barrier position and can be put into the through position from the barrier position by means of a pneumatic-cylinder arrangement against the action of the preloading spring. In the case of a hydraulic slave-cylinder arrangement, this hydraulic slave-cylinder arrangement is preferably connected at a point of the hydraulic connection which lies between the hydraulic passage and the hydraulic master-cylinder arrangement.

In another approach, it is generally proposed that the signaling and/or protection device have a freeing and/or idle-travel arrangement, by means of which the clutch pedal can be freed (can be actuated against counterforces which are substantially reduced compared with normal counterforces counteracting a clutch-pedal movement, or can be actuated without substantial counterforces) and/or which, in the response state, permits an actuating movement of the clutch pedal via idle travel, corresponding to at least a substantial part of normal clutch-pedal-actuating travel, without clutch actuation and without damaging components of the actuating installation.

In one possible design, the freeing and/or idle-travel arrangement may comprise a first element, which moves or moves along during a clutch-pedal actuation, and a second element, which is motionally coupled to and/or is integral with a transmitter element of a transmitter-element arrangement, in particular a master-cylinder arrangement, of the clutch-pedal arrangement, in which case the first element and the second element are motionally coupled or can be motionally coupled for the motional coupling of transmitter element and clutch pedal and can be moved relative to one another, in particular can be motionally uncoupled, for the freeing of the clutch pedal and/or for the provision of idle travel.

There are various possible ways of designing a first element and a second element. For example, the first element may be the clutch pedal. The clutch-pedal plunger or an additional element not provided in conventional clutch-pedal arrangements, for example a pivoted element pivotable with the clutch pedal about a common pivot, is then suitable as the second element.

With regard to the clutch-pedal plunger, it is proposed that this clutch-pedal plunger, at least in a certain area, preferably essentially entirely, be designed as a spring element, in particular a leaf spring, which spring element is preloaded in the direction of a maximum effective length of the plunger and/or, during shortening of an effective length of the plunger, starting from a maximum effective plunger length, is increasingly loaded.

According to another possibility, the first element and the second element may be integrated in a plunger arrangement connecting the clutch pedal to the transmitter element and may permit shortening in the length of the plunger arrangement in order to free the clutch pedal or provide idle travel.

In general it is proposed that the clutch-pedal arrangement comprise a plunger arrangement having a first plunger member, if need be serving as first element, and a second plunger member, if need be serving as second element, said first and second plunger members, in order to shorten an effective length of the plunger arrangement, being movable relative to one another, in particular being telescopic or being pivotable toward one another. In this case, a spring arrangement may be effective between the two plunger members, by means of which spring arrangement the plunger members, at least in a relative-position region adjoining a relative position having maximum effective length of the plunger arrangement, can be preloaded relative to one another or are preloaded relative to one another in the direction of an increase in the effective length.

In an especially preferred development, a pneumatic slave-cylinder arrangement, if need be serving as spring arrangement, is formed in the plunger arrangement, with which slave-cylinder arrangement the two plunger members are movable relative to one another for increasing the effective length, in particular for restoring a maximum effective length, and/or by means of which slave-cylinder arrangement the two plunger members can be secured in a given relative position. The pneumatic slave-cylinder arrangement, at least in one preset state, can perform the function of a spring arrangement in the above-mentioned sense.

With regard to the signaling function according to the invention of the signaling and/or protection device, it is especially preferred that the first element and the second element, for the motional coupling, can be locked on one another in a positive manner, or can be latched to one another, by means of a locking or latching arrangement. A clear signal can be given by the locking being released or by the latching being unlatched, so that the clutch pedal is freed as a result, which becomes apparent by virtue of the fact that the clutch pedal can be actuated with counterforces substantially reduced compared with normal counterforces counteracting a clutch-pedal movement and without substantial counterforces. However, the unlocking or unlatching may also serve in general only to provide idle travel.

In this connection, it is proposed that the locking or latching arrangement comprise at least one locking element, in particular a sliding pin, which is movable between a locking position and an unlocking position and which can be put into the unlocking position by mechanical and/or hydraulic and/or electrical conversion of an actuating force exerted on the clutch pedal and/or by means of a hydraulic slave-cylinder arrangement, if need be against the action of a preloading spring, which preloads the locking element in the direction of the locking position, or which locking element is preloaded by means of a preloading-spring arrangement in the direction of the unlocking position and can be put into the locking position by means of a pneumatic-cylinder arrangement against the action of the preloading-spring arrangement. If no pneumatic pressure is available in the latter case, the preloading-spring arrangement puts the locking element into the unlocking position or holds it in the unlocking position with corresponding release of the clutch pedal.

Furthermore, it is proposed that the locking or latching arrangement comprise at least one latching element, which can be unlatched by mechanical and/or hydraulic conversion of an actuating force exerted on the clutch pedal.

For the latching element, it is proposed as an advantageous development that the latching element be formed by a spring element of the spring arrangement effective between the two plunger members or by a clutch-pedal-side end section of the clutch-pedal plunger, in which case—starting from a maximum effective length of the plunger arrangement or of the clutch-pedal plunger respectively—the effective length, at adequate counterforce exerted on the clutch-pedal plunger by the transmitter element, in particular in the response state of the signaling and/or protection device, can first be shortened by clutch-pedal actuation under elastic deformation and correspondingly increasing loading of the spring element, in the course of which the spring element, after reaching a certain loading, unlatches and the clutch pedal is thereby freed, if need be by permitting a further shortening in the effective length.

In another approach, it is generally proposed that the signaling and/or protection device, in a hydraulic system connecting a hydraulic master-cylinder arrangement of the clutch-pedal arrangement to the actuating arrangement, comprise a hydraulic-medium accumulator and/or discharge arrangement, which comprises at least one first hydraulic-medium intermediate accumulator, essentially receiving the hydraulic pressure in the hydraulic system, serving as a hydraulic pressure accumulator and if need capable of being rendered active and inactive, and/or comprises at least one second hydraulic-medium intermediate accumulator, capable of being rendered active and inactive, significantly reducing the hydraulic pressure in the hydraulic system when specifically rendered active and serving as a hydraulic pressure-relief accumulator, and/or comprises a hydraulic discharge valve for the specific discharge of hydraulic medium to a pressureless or pressure-reduced region of the hydraulic system. Depending on the design of the actuating installation, the hydraulic-medium accumulator and/or discharge arrangement may serve as a freeing and/or idle-travel arrangement for the clutch pedal, since, for example, in the event of an unhindered discharge of the hydraulic medium from the hydraulic system into a pressureless hydraulic-medium reservoir, the clutch pedal can be actuated without substantial counterforces. The clutch pedal can therefore be freed by the discharge of hydraulic medium. With the freeing of the clutch pedal, idle travel for the clutch pedal is also provided. Such idle travel may also be provided without a substantial change in the force/travel characteristic of the clutch pedal, for example by a hydraulic pressure accumulator becoming active, this hydraulic pressure accumulator essentially receiving the hydraulic pressure in the hydraulic system, so that the actuating forces required for the actuation of the clutch pedal are changed slightly at the most.

With regard to the important signaling function of the signaling and/or protection device, it is proposed that the respective hydraulic-medium intermediate accumulator have a holding arrangement, in particular a latching arrangement, for a hydraulic piston, by means of which holding arrangement the intermediate accumulator can be held in the inactive state and which holding arrangement can be released for rendering the intermediate accumulator active, or that the respective hydraulic-medium intermediate accumulator be rendered active and inactive by means of a hydraulic valve alternatively opening or closing a hydraulic connection. This is because, by appropriate activation or design of the holding arrangement, a situation can, for example, be achieved in which the intermediate accumulator becomes active after a second operating state occurs. If the force/travel characteristic of the clutch pedal is to be changed in this way, the hydraulic-medium intermediate accumulator will be a second hydraulic-medium intermediate accumulator significantly reducing the pressure in the hydraulic system. In the case of a hydraulic-medium intermediate accumulator designed with a spring-preloaded hydraulic piston, a first hydraulic-medium intermediate accumulator is distinguished from a second hydraulic-medium intermediate accumulator by virtue of the fact that, in the first hydraulic-medium intermediate accumulator, the preloading-spring arrangement is dimensioned and preloaded in such a way that hydraulic pressures which normally occur are not sufficient for a substantial hydraulic volume to occur in the intermediate accumulator. In the case of a second hydraulic-medium intermediate accumulator, however, the preloading-spring arrangement would be dimensioned and preloaded in such a way that even normal hydraulic pressures are sufficient for a substantial hydraulic-medium volume to occur in the intermediate accumulator, and accordingly the hydraulic pressure in the hydraulic system drops significantly when the intermediate accumulator is specifically rendered active. In the case of the holding arrangement or latching arrangement, the second hydraulic-medium intermediate accumulator may be rendered active by the holding arrangement being appropriately released, and the release, in the case of a latching arrangement, without interference from outside, can be effected solely by the forces induced by the hydraulic pressure and acting on the latching arrangement. Alternatively, a hydraulic valve is provided for specifically rendering the hydraulic-medium intermediate accumulator active and inactive. However, the hydraulic valve and holding arrangement, if need be, may also be appropriately used in a first hydraulic-medium intermediate accumulator.

In general, it is proposed for the holding arrangement that this holding arrangement can be released electrically and/or mechanically and/or hydraulically and/or pneumatically. For the discharge valve or the hydraulic valve, it is proposed that it be electrically and/or hydraulically and/or mechanically and/or pneumatically operable.

It is especially preferred that the respective hydraulic-medium intermediate accumulator can be rendered active by mechanical and/or hydraulic and/or electrical conversion of an actuating force exerted on the clutch pedal and/or by means of a hydraulic slave-cylinder arrangement, or that the respective hydraulic-medium intermediate accumulator can be rendered inactive pneumatically.

An advantageous embodiment variant is distinguished by the fact that a/the hydraulic-medium intermediate accumulator of the hydraulic-medium accumulator arrangement can be switched over—preferably pneumatically—between a pressure-accumulator function and a pressure-relief-accumulator function, so that the hydraulic-medium intermediate accumulator, depending on the switching state, serves as first or second hydraulic-medium intermediate accumulator. Thus both a pressure accumulator and a pressure-relief accumulator in the sense of the above definition can be realized with one hydraulic component. Such a switchable hydraulic-medium intermediate accumulator could be used, for example, in such a way that it serves as a pressure accumulator as long as a first operating state exists, so that pressure peaks in the hydraulic system would be smoothed. If a second operating state exists or occurs, the hydraulic-medium intermediate accumulator could then be switched over to its pressure-relief-accumulator function, as a result of which hydraulic medium, with corresponding pressure drop in the hydraulic system, would flow off from the latter into the intermediate accumulator.

Furthermore, to develop the switchable hydraulic-medium intermediate accumulator, it is proposed that this hydraulic-medium intermediate accumulator have a separating element, which subdivides a receiving space into a hydraulic sectional space and a pneumatic sectional space and is movable in the direction of an increase in the size of the hydraulic sectional space while the pneumatic sectional space is reduced in size and in the direction of a decrease in the size of the hydraulic sectional space while the pneumatic sectional space is increased in size. In this case, the separating element may be a piston element, which is displaceably arranged in the receiving space and has a first end face defining the pneumatic sectional space and a second end face defining the hydraulic sectional space, which end faces have surface areas which are preferably adapted to one another, in order to set a response threshold for the pressure-accumulator function.

For the above-mentioned discharge valve and/or the above-mentioned hydraulic valve, it is generally proposed that the respective valve can be actuated for opening the valve by mechanical and/or hydraulic and/or electrical conversion of an actuating force exerted on the clutch pedal and/or by means of a hydraulic slave-cylinder arrangement, if need be against the action of a preloading-spring arrangement, which preloads a valve-element arrangement in the direction of a position closing the valve, or that the valve have a valve-element arrangement, which is preloaded by means of a preloading-spring arrangement in the direction of a position opening the valve, and can be put into a position closing the valve by means of a pneumatic-cylinder arrangement against the action of the preloading-spring arrangement.

In an advantageous development, the discharge valve and/or the hydraulic valve and/or a second hydraulic-medium intermediate accumulator may be integrated in a first hydraulic-medium intermediate accumulator in such a way that the second hydraulic-medium intermediate accumulator is rendered active or the valve is opened when the first hydraulic-medium intermediate accumulator has received a preset hydraulic medium. With regard to an especially clear signaling function, it is preferred that a holding arrangement, in particular a latching arrangement, be provided, and this holding arrangement, after the second hydraulic-medium intermediate accumulator is rendered active or the valve is opened, keeps this hydraulic-medium intermediate accumulator active or respectively keeps this valve open. The holding arrangement can be actuable manually and/or hydraulically and/or pneumatically and/or mechanically and/or electrically for rendering the second hydraulic-medium intermediate accumulator inactive or respectively for closing the valve.

In a preferred embodiment, the respective hydraulic-medium intermediate accumulator (first hydraulic-medium intermediate accumulator or second hydraulic-medium intermediate accumulator) is integrated in a hydraulic measuring-cylinder arrangement, which detects a position of a release-bearing arrangement of the actuating arrangement and/or an engaging or actuating state of the friction clutch.

As already mentioned at the beginning, the actuating arrangement may comprise a positioning arrangement, having a control valve, and a release-bearing arrangement serving to actuate the friction clutch, the positioning arrangement comprising a pressure-medium-power cylinder arrangement, in particular a pneumatic-power cylinder arrangement, which acts on the release-bearing arrangement and which, via the control valve connected to a pressure-medium source, in particular a pneumatic source, can be actuated as a function of a hydraulic or mechanical reference variable and an actual variable representing the position of the release-bearing arrangement, in which case the reference variable can be produced by means of the clutch-pedal arrangement and can be transmitted to the positioning arrangement by means of a mechanical or hydraulic transmission section.

The positioning arrangement may be a so-called "positioning servo arrangement", which produces only a release auxiliary actuating force in addition to a primarily acting, mechanical or hydraulic release force, which originates directly from a clutch-pedal actuation. Furthermore, the positioning arrangement, if need be designed as a positioning servo arrangement, may be capable of being actuated in an emergency (this is generally the case with a positioning servo arrangement); to this end, reference is made to the comments in the introduction to the description. Although some of the problems explained in the introduction to the description are alleviated in such a case, it may nonetheless be extremely appropriate to signal a "second operating state" by means of the clutch pedal and/or to provide protection from incorrect operation or damage, for example on account of an excess rise in the hydraulic pressure on account of an excessively pronounced and quick clutch-pedal actuation. However, it is preferable for the positioning arrangement not to be a "positioning servo arrangement" in the sense explained at the beginning and for there to be no emergency actuation of the clutch. The problems or disadvantages, discussed in the introduction to the description with reference to the prior art, in connection with an inoperative positioning arrangement or excessively high hydraulic pressures can be readily coped with on the basis of the present invention.

The invention also relates to an actuating installation as described above, in which, however, unlike the actuating installation as described above, there is no significant difference between the force/travel characteristic decisive in the first operating state and the force/ travel characteristic decisive in the second operating state after the response of the signaling and/or protection device. Many of the measures and developments described above may also be advantageously used in such an actuating installation and lead to a protectable actuating installation. It is proposed as a development that the signaling and/or protection device preferably signal the second operating state in another manner. For example, a suitable method is to indicate the second operating state by means of an acoustic or optical signaling device. A further possibility may also be to put the drive unit in a state which transmits no drive or to keep the drive unit in such a state. An interesting possibility already mentioned is to change the force/travel characteristic of another actuating element, in particular of another vehicle pedal. Considered here, in particular, is the accelerator pedal.

Furthermore, the invention relates to a signaling and/or protection device for an actuating installation as described above. The signaling and/or protection device may have at least one of the signaling and/or protection-device features specified above, in which case it is not absolutely necessary for the force/travel characteristic of a clutch pedal to be significantly influenced, or the signaling and/or protection device may even, in particular cases, be designed in such a way that such influencing of the force/travel characteristic of a clutch pedal is not possible at all, for example since components which would be necessary for a corresponding interaction with the clutch-pedal arrangement are absent.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIGS. 3–6 show four variants of the signaling and protection device and/or of the clutch-pedal arrangement according to FIG. 2 in representations in accordance with FIG. 2a;

FIG. 27 shows a hydraulic pressure accumulator integrated in a hydraulic measuring-cylinder piston;

FIG. 28 shows a development of the arrangement according to FIG. 27 with regard to a signaling function of the overload-protection device.

DETAILED DESCRIPTION OF THE PREFERRED EMBODIMENTS

Figure 1:
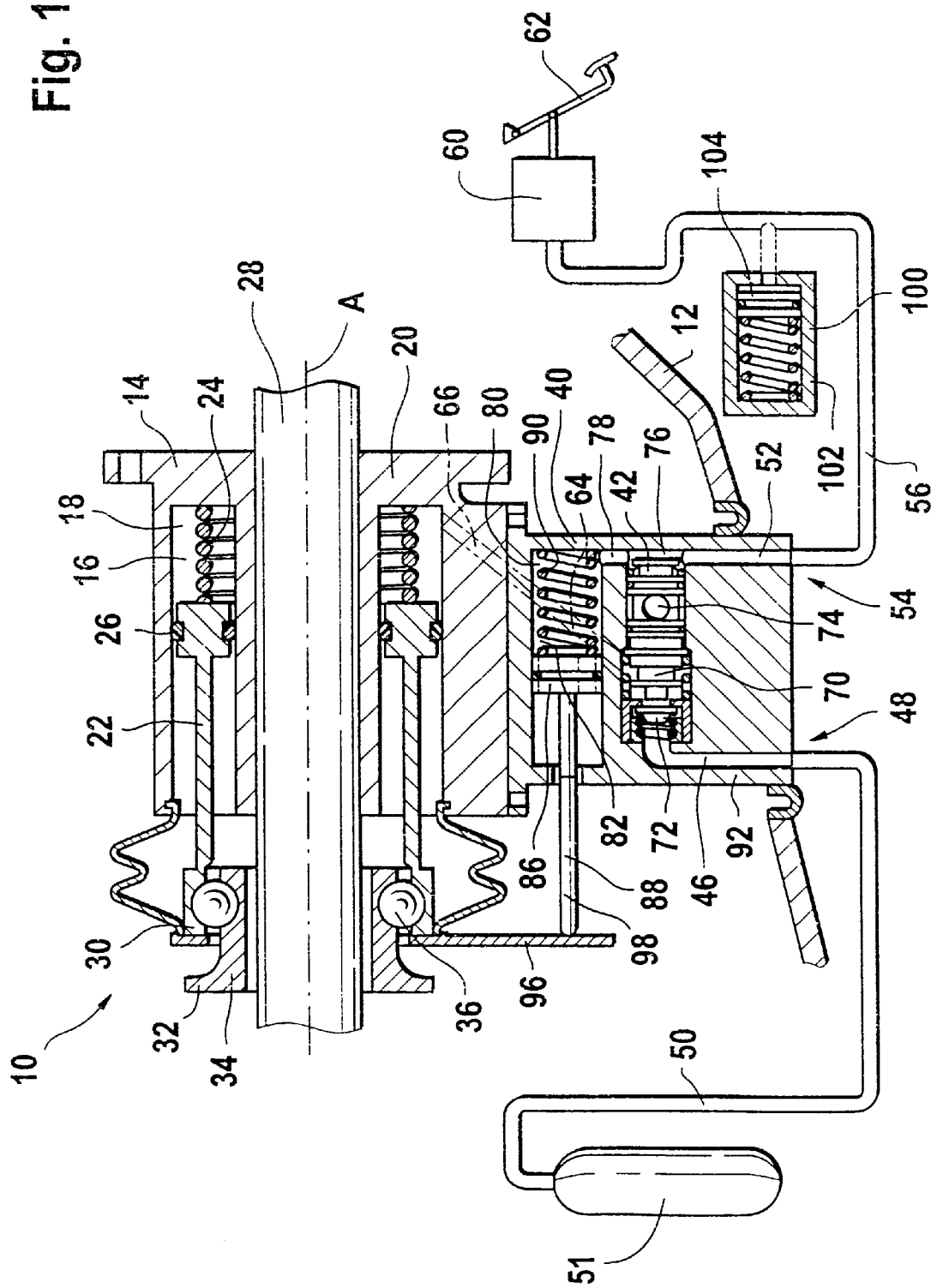
FIG. 1 shows an exemplary embodiment for an actuating installation with an actuating arrangement, comprising a pneumatic annular cylinder for actuating a friction clutch by means of a release-bearing arrangement, in a schematic sectional view.

FIG. 1 schematically shows an exemplary embodiment of an actuating installation 10 for a friction clutch, here a pushed clutch, arranged in a housing bell 12 in the drive line of a motor vehicle between an internal combustion engine and a transmission, in which actuating installation the invention may be advantageously used. The actuating installation 10 comprises a pressure-medium-force cylinder arrangement 14, here a pneumatic-force cylinder arrangement, which is designed as a construction unit and may also be designated as actuating-cylinder construction unit. The actuating-cylinder construction unit 14 comprises a pressure-medium main cylinder in the form of a pressure-medium annular cylinder, here a pneumatic annular cylinder 16, which is formed by an annular cylindrical recess 18 in a fixed body part 20 and by a pneumatic annular-piston element 22. The annular-piston element 22 is preloaded by spring means 24 in the direction (to the left in FIG. 1) of the clutch (not shown) and carries sealing rings 26 for sealing the annular-cylinder space of the pneumatic annular cylinder 16.

The pneumatic annular cylinder 16 and the pneumatic annular-piston element 22 are arranged coaxially to a clutch axis A. The body part 20 has an axial bore, through which the transmission input shaft 28 extends coaxially to the clutch axis A.

An annular section 30 of the pneumatic annular-piston element 22 at the clutch-side end of the annular-piston element forms a release ring 30 of a release-bearing arrangement 32, which furthermore comprises a release ring 34, rotatable relative to the release ring 30 and rotating along with the clutch, and a ball bearing 36 permitting the relative rotation between the two release rings 30 and 34. Upon actuation of the actuating installation, the release-bearing arrangement acts on the clutch in a known manner, in particular via diaphragm-spring tongues of a diaphragm spring serving as clutch spring, in order to disengage the clutch for the interruption of the power flow between the transmission and the internal combustion engine.

The actuating-cylinder construction unit 14 carries a control-valve construction unit 40, which is detachably fastened to the actuating-cylinder construction unit and comprises a control valve 42 known per se and working according to the pressure-balance principle.

The control valve 42 is connected to a pneumatic source 51 via a pneumatic line 46 inside the control-valve construction unit 40, via a pneumatic connection 48 of the control-valve construction unit and via a further pneumatic line 50. Furthermore, the control valve 42 is connected to a reference-signal transmitter unit 60 via a line 52 inside the control-valve construction unit 40, via a connection 54 of the control-valve construction unit 40 and via a further line 56. The reference-signal transmitter unit 60 is a clutch-pedal arrangement 60, which has a clutch pedal 62 and is designed for transmitting a reference signal in the form of a hydraulic signal to the control valve 42 via the line 56, the connection 54 and the line 52. The lines 52 and 56 are accordingly hydraulic lines, which are connected via the connection 54, which is designed as a hydraulic connection. However, the reference signal could also be transmitted in another way, for example mechanically by means of a Bowden-cable or actuating-linkage arrangement, to the appropriately adapted control valve.

Furthermore, the control valve 42 is connected to the annular-cylinder space of the pneumatic annular cylinder 16 via a pneumatic line 64 inside the control-valve construction unit 14 and via a pneumatic line 66 inside the actuating-cylinder construction unit 14. Furthermore, the control valve 42 is connected via a further pneumatic line (not shown) inside the control-valve construction unit 40 to a pressure-compensation opening (likewise not shown) of the control-valve construction unit.

The control valve 42 comprises a valve body 70, which is mounted in a bore of the control-valve construction unit 40 so as to be displaceable along a valve axis and has an axial bore (not shown), closable by a cover element 72 toward the pneumatic line 46, and radial bores, which lead into the axial bore and of which one radial bore 74 can be seen in FIG. 1.

The valve body 70, which is acted upon by a compression spring with a preloading action to the right, closes and opens, in interaction with the cover element 72, pneumatic connections inside the control valve. In a right-hand position of the valve body, an air-relief connection is made between the annular space of the pneumatic annular cylinder and the air-relief opening. In a center position of the valve body, the annular space of the pneumatic annular cylinder is closed off in a pneumatically tight manner. In a left-hand position of the valve body, a pressurizing connection is made between the pneumatic source 51 and the annular space of the pneumatic annular cylinder 16 via the pneumatic lines 50, 46, 64 and 66.

The position of the valve body 70 which occurs in each case depends on the hydraulic pressure in a hydraulic chamber 76, formed by a hydraulic-line section, of the control valve 42, which hydraulic pressure acts on the valve body 70 in the direction of a displacement of the valve body to the left against the spring force of the compression spring acting on the valve body 70. The hydraulic chamber 76 is connected to the cylinder space 80 of a hydraulic measuring cylinder 82 via a hydraulic-line section 78. The measuring cylinder 82 comprises a piston 86, provided with a sealing ring, on a piston rod 88.

The piston defining the cylinder space of the hydraulic measuring cylinder 82 is displaceable along a motion axis parallel to the clutch axis A and coaxial to the piston rod 88 and is preloaded by a compression spring 90 in the direction of the clutch, that is in the release direction of the release-bearing arrangement 32, upon actuation of the clutch for disengagement. The piston rod 88 projects through an opening in the control-valve construction unit 40 in the direction of the clutch and acts on a carrier arm of a carrier 96, which is rigidly fastened to the annular section 30 of the pneumatic annular-piston element 22 and against which the piston rod 88 is preloaded with its free end by the pressure force of the compression spring 90. The carrier 96 therefore forms a stop for the piston rod 88. The piston rod 88 and the piston 86 may be regarded as parts of a transmitter element 98 of a transmitter-element arrangement formed by the hydraulic measuring cylinder 82.

During the release of the pneumatic annular-piston element 22, the transmitter element 98, under the action of the compression spring 90, follows the movement of the pneumatic annular-piston element 22 to the left. During the engagement of the pneumatic annular-piston element 22, it presses against the transmitter element 98 via the carrier 96 and carries the transmitter element 98 along during its movement to the right. The transmitter element 98 and the pneumatic annular-piston element 22 are therefore motionally coupled to one another for the movement in the axial direction. The axial movement of the pneumatic annular-piston element 22 is therefore converted into an increase or decrease in the volume of the cylinder space of the hydraulic measuring cylinder 82. As a result, the axial position of the pneumatic annular-piston element 22 and thus of the release-bearing arrangement 32 is fed back to the control valve 42. The hydraulic pressure in the hydraulic chamber 76 therefore depends, on the one hand, on the hydraulic-medium volume displaced from the master cylinder of the reference-signal transmitter unit 60 by actuation of the clutch pedal 62 and, on the other hand, on the hydraulic-medium volume accommodated in the cylinder space of the hydraulic measuring cylinder 82 and thus on the axial position of the release-bearing arrangement 32. The control valve 42 is designed in such a way that an approximately constant hydraulic-medium pressure is always maintained in the hydraulic chamber 76 in the course of a clutch actuation by appropriate pressurizing and air-relief of the annular-cylinder space of the pneumatic annular cylinder 16. The control valve 42, the power cylinder arrangement 14 and the transmitter-element arrangement 82, 98 assigned to the release-bearing arrangement 32 form a control loop, which controls the position of the release-bearing arrangement in accordance with the setpoint input of a reference signal supplied by the clutch-pedal arrangement 60. To this end, the transmitter-element arrangement 82, 89 detects the actual position of the release-bearing arrangement in the form of an actual variable, and a differential variable, which determines the control state of the control valve 42, is derived from the actual variable and the reference variable. To this end, reference is made to the detailed explanations in DE 197 16 600 A1, the entire disclosure contents of which are included in the disclosure contents of the present application.

However, the positioning arrangement formed by the control valve 42, the transmitter-element arrangement 82, 98 and the pneumatic-power cylinder arrangement 14 can only function properly on the condition that the pneumatic source 51 provides sufficient pneumatic pressure. If a motor vehicle having the actuating installation has been left standing for a prolonged period, it may be the case that the pneumatic source 51 still cannot provide sufficient pneumatic pressure directly after the vehicle is started. In principle, there may also be a malfunction of the pneumatic source 51. In such a case, an actuation of the clutch pedal 62 would cause the pressure in the hydraulic chamber 76 to rise without the control valve 42 being able to feed pneumatic medium to the power cylinder arrangement 14. The release-bearing arrangement 82 accordingly stays in its axial position and, via the carrier 96, holds the transmitter element 98 formed by piston 86 and piston rod 88 in its axial position. The volume of the hydraulic measuring cylinder 82 is thus also retained, and a pressure balance reducing the hydraulic pressure in the hydraulic chamber 76 by discharge of hydraulic medium into the hydraulic measuring cylinder is not possible. If the clutch pedal is actuated in a correspondingly powerful manner, the pressure in the hydraulic chamber 76 and in hydraulic measuring cylinder 82 will rise to such an extent that damage to the positioning arrangement, in particular the hydraulic measuring cylinder including the transmitter element 98 and/or the control valve 42, may occur. If the control-valve construction unit 40 and transmitter element 98 as well as the carrier 96 and its fastening to the release ring 30 are sufficiently robust, the system could jam in a self-locking manner, since a tilting moment is exerted on the pneumatic annular-piston element 22 by the transmitter element 98 via the carrier 96. This is because the pneumatic annular-piston element 22 is acted upon only on one side of the clutch axis A, that is eccentrically. Depending on the design of the hydraulic system, this hydraulic system could even burst at excessive hydraulic pressures. On account of the damage to components which may occur (in the arrangement according to FIG. 1 in particular bending of the carrier arm 96 is also to be considered) and/or on account of the self-locking jamming which may occur, the system may possibly no longer function properly even when sufficient pneumatic pressure can be delivered again from the pneumatic source 51.

In addition to the possibility discussed, that the pneumatic source 51 may not provide sufficient pneumatic pressure, the possibility that the control valve does not function properly is also to be considered. A simple repair per se is possible, since it is comparatively simple to exchange the control valve 42. However, if consequential damage to the system has occurred on account of an excessive pressure rise in the hydraulic chamber 76 and in the hydraulic measuring cylinder 82, correspondingly costly additional repairs are necessary.

As known per se, such damage on account of an excess hydraulic pressure may be prevented by means of an overload-protection unit 100, which comprises, for example, a cylinder 102, connected to the hydraulic line 56, and a sealed-off piston 104, which is spring-preloaded in the direction of a reduction in the volume of the cylinder space, connected to the hydraulic system, of the cylinder 102. The overload-protection unit 100 could be provided at any point of the hydraulic system and can receive hydraulic medium which is displaced by the clutch-pedal arrangement 60 and which cannot be received by the hydraulic measuring cylinder 82 on account of the blocking described of the transmitter element 98. An excessive rise in the hydraulic pressure in the hydraulic system is thus prevented. So that such an overload-protection unit 100 can perform its function, its cylinder space is constantly in hydraulic connection with the hydraulic system, with the hydraulic line 56 in the case of FIG. 1, and its spring arrangement preloading the piston 104 is adapted to the hydraulic pressure normally prevailing in the hydraulic system in such a way that normally no substantial quantity of hydraulic medium enters the hydraulic space of the overload-protection unit 100, that is provided there is sufficient pneumatic pressure available and all the components of the system are finctioning properly.

If the overload-protection unit 100 comes into operation, for example on account of too low a pneumatic pressure, the hydraulic pressure in the system increases only in accordance with the preloading of the spring arrangement, the preloading increasing with a displacement of the piston 104. When the clutch pedal 62 is actuated, there is accordingly no significant change in the force/travel characteristic of the clutch-pedal actuation relative to the force/travel characteristic which is normally decisive, so that the driver will mistakenly assume that the system is functioning properly, that is that the clutch is actuated properly. This may result in considerable safety problems during driving and in damage to the system on account of operation which is not adapted to the situation (for instance gear engagement or gear change despite the fact that there is no interruption in the power flow between engine and transmission on account of the inoperative actuating installation). Although an overload-protection unit 100, as described, can thus prevent damage on account of an excessively increasing hydraulic pressure, it indirectly causes a susceptibility of the system to incorrect operations and to damage, resulting indirectly from this, to the system. Various means of preventing such incorrect operations are explained below, provision also being made for overload protection with regard to excessive hydraulic pressures or forces in the case of a hydraulic or mechanical reference-signal transmission section between clutch-pedal arrangement and actuating arrangement. If not expressly stated otherwise, the explanation of the various approaches to solving the problem are based on an actuating installation as shown in FIG. 1, although the overload-protection unit 100 is generally not provided. However, such an overload-protection unit 100, if need be, could be provided in addition to the protection device according to the invention or could be integrated in the protection device according to the invention, provided this is possible and appropriate from the functional principle of the protection device.

Provided that it is appropriate, the same reference numerals are used below for identical or analogous components in the description of the various exemplary embodiments, small letters (starting with a and continued in alphabetical order up to z and then continuing xa to xc) being affixed in each case in order to identify the embodiment. In each case only the differences from the preceding embodiments already described are explained and reference is otherwise expressly made to the description of the preceding embodiments.

Figure 2A:
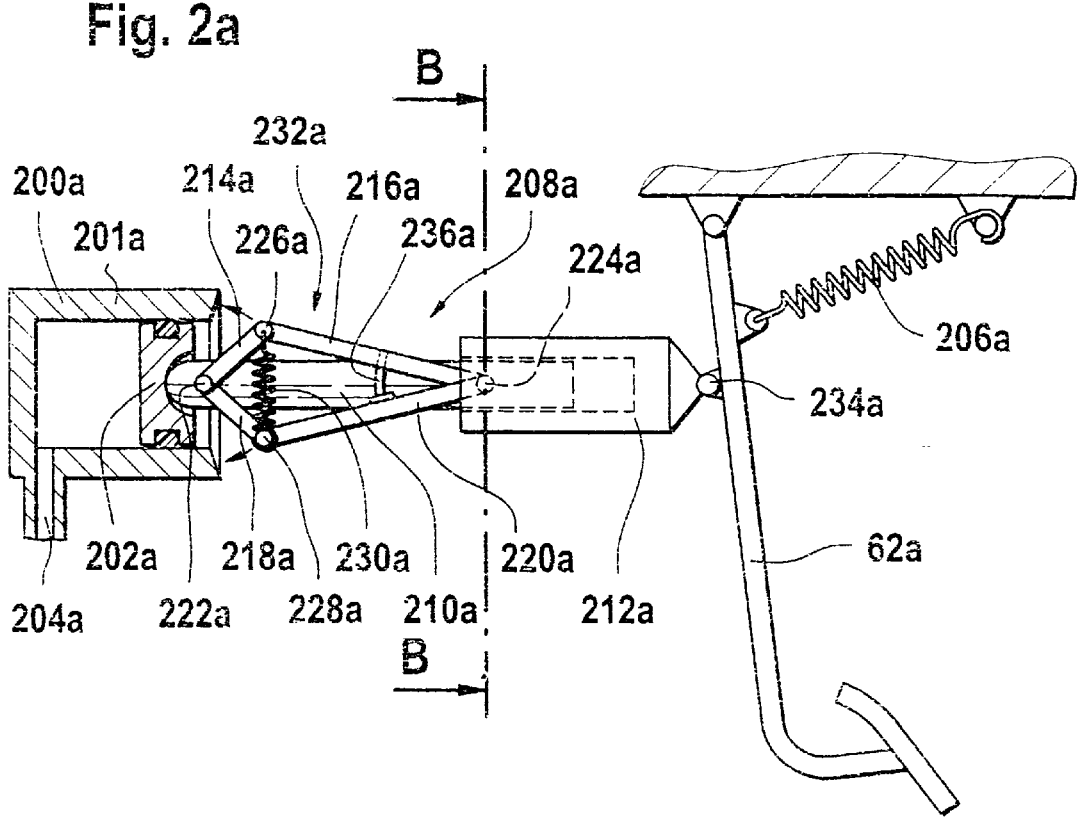
FIG. 2 shows, in FIGS. 2a and 2b, an exemplary embodiment of a signaling and protection device according to the invention, which device is integrated in a clutch-pedal arrangement and could be used in the actuating installation shown in FIG. 1, FIG. 2a being a partly sectioned side view of the clutch-pedal arrangement, and FIG. 2b being a section along line B—B in FIG. 2a through a plunger arrangement of the clutch-pedal arrangement.

FIG. 2a shows a clutch-pedal arrangement according to the invention with an integrated signaling and protection device, which on the one hand prevents a damaging excess pressure in the hydraulic system and on the other hand gives the driver a clear signal should the protection device respond for limiting the hydraulic pressure. The clutch-pedal arrangement comprises a hydraulic master cylinder 200a having a piston 202a and a pressure-line connection 204a (not described in any more detail), for example for the hydraulic line 56 in the case of the actuating installation of FIG. 1, as well as a snifting bore (not shown) and a supply reservoir (not shown).

The clutch pedal 62a is preloaded by a return spring 206a in the direction of an engaging position of the clutch pedal.

The clutch pedal 62a acts on the piston 202a via a plunger arrangement 208a, the plunger arrangement having a plunger 210a, engaging in a recess in the outside of the piston 202a, and a plunger sleeve 212a, which accommodates the other end of the plunger 210a and is pivotably attached to the clutch pedal 62a.

The clutch-pedal-side end of the plunger 210a is arranged so as to be displaceable per se in the plunger sleeve 212a. However, a four-bar linkage 232a composed of four struts 214a, 216a, 218a and 220a is arranged between the plunger 210a and the plunger sleeve 212a, and this four-bar linkage 232a is fastened on the one side to a plunger-side articulation 222a on the plunger in the master-cylinder-side end region of the latter and is fastened on the other side to the sleeve 212a by a sleeve-side articulation 224a. The articulation 222a connects the struts 214a and 218a and permits pivoting of the same relative to one another and relative to the plunger 210a. The articulation 224a connects the struts 216a and 220a and permits pivoting of the same relative to one another and relative to the sleeve 212a and thus relative to the plunger 210a. A further articulation 226a connects the struts 214a and 216a and permits pivoting of the same relative to one another. The same correspondingly applies to the struts 218a and 220a, which are connected to one another via an articulation 228a. A tension spring 230a connecting the two articulations 226a and 228a preloads the four-bar linkage 232a, formed by the struts and the articulations, in the direction of a maximum distance between articulation 222a and articulation 224a and thus in the direction of a maximum length of the plunger arrangement 208a between clutch pedal 62a and piston 202a.

The spring 230a is dimensioned in such a way that, in the event of proper functioning of the actuating installation, the actuating force exerted on the clutch pedal 62a by the driver can be transmitted via the plunger arrangement 208a to the piston 202a without substantial loss of travel, that is substantial buckling of the four-bar linkage relative to the position at maximum distance between the articulations 222a and 224a does not occur. In the case of the exemplary embodiment in FIG. 1 having a positioning arrangement working as a clutch-power amplifier according to the pressure-balance principle, the pedal force, when compressed air is available and the system is finctioning properly, is, for example, about 80 to 120 N, which, on account of the dimensioning, adapted thereto, of the spring 230a, is transmitted, as stated, essentially without loss of travel to the piston 202a, so that a hydraulic-medium volume corresponding to the clutch-pedal actuating stroke is displaced from the master cylinder 200a and transmitted via the hydraulic line 56 to the positioning arrangement.

The driver, however, at least in dangerous situations, can absorb a pedal force of up to 3 kN. If the actuating installation is not functioning properly, for example on account of a lack of pneumatic pressure, this would result in a master-cylinder force of 15 kN acting on the piston at a pedal transmission ratio of, for example, five, a factor which would result in a system pressure of 760 bar in the case of a master cylinder having an effective piston area of 198 mm$^2$ (master-cylinder diameter 15.87 mm). A force of 30 kN would then occur at a hydraulic measuring cylinder having a diameter of 22.2 mm in accordance with an effective piston area of 387 mm$^2$. This force would very probably lead to the jamming of the release-bearing arrangement or of the pneumatic power cylinder due to the acting tilting moment, if the bursting pressure of the hydraulic system has not already been exceeded beforehand and the hydraulic system has accordingly burst.

The tension spring 230a is now dimensioned in such a way that the four-bar linkage 232a, after a preset pedal-force threshold has been exceeded, buckles for shortening the distance between the articulation 222a and the articulation 224a, the force threshold being selected in such a way that jamming of the release-bearing arrangement or even bursting of the hydraulic system cannot occur. In the example considered, a pedal-force threshold which lies within the range of 200 to 600 N, for example, is expedient. This value lies between the normal pedal force of 80 to 120 N and a maximum possible pedal force (relevant to damage) of about 1.2 to 1.3 kN, which may be estimated under the precondition that the release force required for the release of the release-bearing arrangement is to be applied in a purely hydraulic manner by the hydraulic measuring-cylinder arrangement and this force is about 12.5 kN. In the measuring cylinder having the diameter of 22.2 mm, a system pressure of 323 bar would result, which corresponds to a master-cylinder force of 6.4 kN in the master cylinder having the diameter of 15.87 mm and to a pedal force of 1.3 kN at a pedal transmission ratio of 5. In the example considered, therefore, the spring-force threshold triggering the signaling and protection device, on the one hand, is far enough away from the normal pedal force and, on the other hand, is clearly below the hydraulic pressure relevant to damage.

If the signaling and protection device responds when the force threshold is exceeded, the four-bar linkage buckles until the struts 214a and 218a are supported on the master-cylinder housing 201a, as indicated by arrows in FIG. 2a. As soon as the struts are supported on the housing, the hydraulic pressure in the hydraulic system does not continue to rise, since any further increase in the pedal-actuating force is transmitted to the master-cylinder housing 201a (fixed relative to the vehicle) while bypassing the piston 202a. All the components of the actuating installation are designed in such a way that the maximum prevailing hydraulic pressure and the maximum acting forces can be absorbed by the system components without the risk of damage to or jamming of the release-bearing arrangement and the pneumatic-power cylinder arrangement. The signaling and protection device, therefore, on the one hand, does not respond during normal actuation and, on the other hand, locks reliably below a pressure relevant to damage, the locking being effected by positive-locking engagement between the struts 214a and 218a on the one hand and the housing 201a of the master cylinder 200a on the other hand. If the actuating force exerted on the clutch pedal 62a is reduced again below the threshold value, the struts 214a and 218a move away from the master-cylinder housing again with a corresponding increase in the distance between the articulations 222a and 224a until the plunger arrangement 208a finally attains its normal length again (distance between the articulation 234a, effective between clutch pedal 62a and sleeve 212a, and the piston 202a ). A curved element 236a, which is fastened to the strut 220a and engages in a guide opening in the strut 216a, provides for proper guidance of the struts 216a and 220a while avoiding aberrant positions (for example pivoting of both struts 220a and 216a toward one side relative to the plunger 210a).

In addition to the situation (already mentioned) of an insufficient pneumatic pressure (a drop in air pressure after a prolonged stoppage time is primarily to be considered, but failure of air pressure may also occur suddenly during driving, for example on account of a punctured line, inter alia), the system also avoids pressure peaks in the hydraulic system which result from a dynamically sluggish behavior of the positioning arrangement. This is because a very rapid clutch-pedal actuation, occurring in a hazard situation for example, could temporarily lead to temporarily increased system pressures, for example 70 bar. Since the signaling and protection device described, which comprises the four-bar linkage 232a, limits the actuating force which can be transmitted from the clutch pedal 62a to the piston 202a, it counteracts such pressure peaks. This is also helped in particular by the fact that the spring 230a, within a length variation range of the plunger arrangement 208a before the struts 214a and 218a bear against the housing 201a, acts as an energy storage device, which smooths force peaks transmitted from the clutch pedal 62a to the plunger arrangement 208a.

Reference should also be made to the following as an especially important factor. The driver will immediately notice the response of the signaling and protection device, that is the buckling of the four-bar linkage 232a with the struts 240a and 218a subsequently bearing against the master-cylinder housing, since a resistance which cannot be overcome by the driver suddenly opposes further stepping on the clutch pedal 62a. In general terms, the signaling and protection device, after responding to the increased clutch-pedal-actuating force, that is in a "response state" of the signaling and protection device, significantly changes the force/travel characteristic of the clutch-pedal actuation compared with a normally prevailing force/travel characteristic. Therefore the driver's attention is clearly drawn to the fact that the actuating installation and/or the clutch system is not working properly. Incorrect operations of the actuating installation or of the clutch system are thus reliably avoided.

Figure 2B:
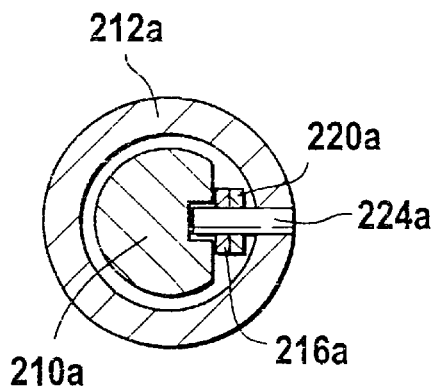
Figure 3:
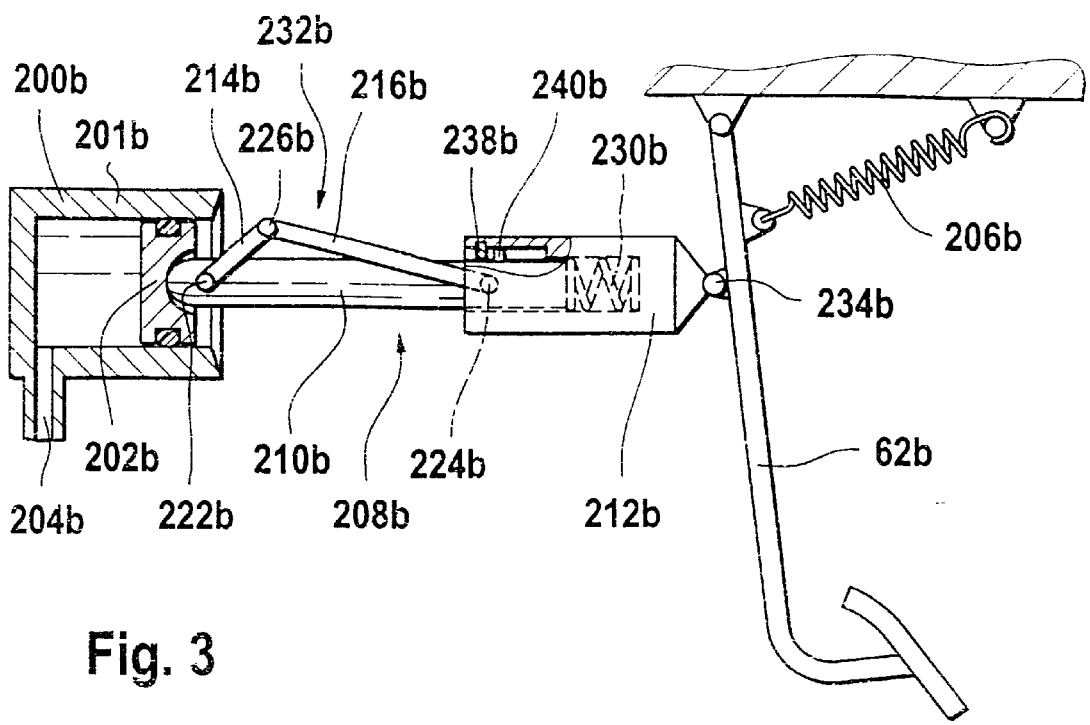

The exemplary embodiment shown in FIG. 3, with regard to the functional principle and the basic construction, essentially corresponds to the exemplary embodiment in FIG. 2. However, instead of a four-bar linkage 232a formed by a first strut pair 214a, 216a and a second strut pair 218a and 220a, only a single strut pair 214b and 216b, which together with the articulations 222b, 224b and 226b forms, as it were, a "three-bar linkage" 232b, is provided. By a compression spring 230b effective between the plunger 210b and the sleeve 212b, this three-bar linkage is preloaded via the plunger 210b and the sleeve 212b in the direction of a maximum distance between the articulations 222b and 224b. In other words, the plunger arrangement 208b is preloaded by the compression spring 230b in the direction of a maximum length (distance between the articulation 234b and the piston 202b ), in which case a stop 238b provided on the sleeve 212b in the sleeve interior and an associated counter-stop 240b on the plunger 210b ensure that the strut pair 214b and 216b cannot reach a fully extended relative position. Transmission of force to the piston 202 to an uncontrolled level, which may occur in the event of a rectilinear relative position, is thereby reliably avoided. As in the exemplary embodiment in FIG. 2, the strut 214b, if the signaling and protection device responds, approaches the master-cylinder housing 201b and, after bearing against the housing, diverts excessive clutch-pedal-actuating forces to the master-cylinder housing and thus to the vehicle body while bypassing the master-cylinder piston 202b.

Figure 4:
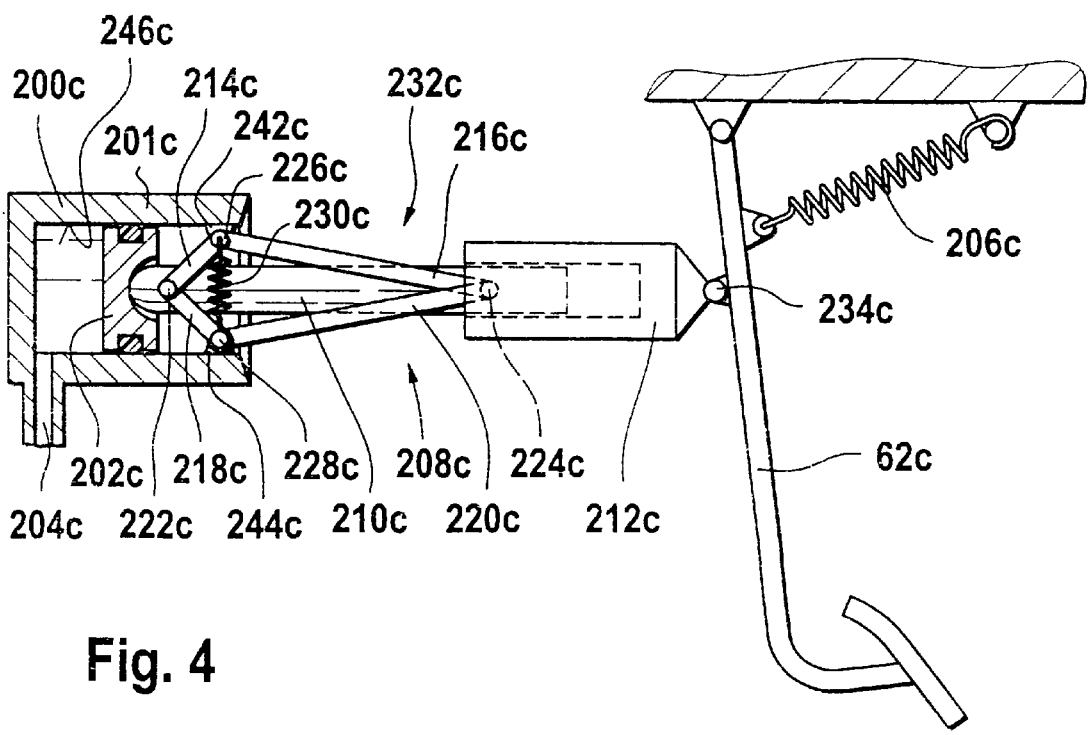

The exemplary embodiment in FIG. 4 essentially corresponds to the exemplary embodiment in FIG. 2. However, an essential difference consists in the fact that, after the response of the signaling and protection device, no positive-locking engagement is produced between the four-bar linkage 232c on the one hand and the master-cylinder housing 201c on the other hand, but rather frictional engagement is produced. To this end, the four-bar linkage 232c, in the region of the articulations 226c and 228c, in each case has brake blocks 242c and 244c respectively, which, after corresponding buckling or spreading of the four-bar linkage 232c on account of a corresponding clutch-pedal-actuating force exceeding the clutch-pedal threshold, act on the cylindrical inner surface 246c of the master cylinder 200c and convert a normal force originating from the spreading of the four-bar linkage into a braking force for limiting the force exerted on the piston 202c and thus for limiting the hydraulic pressure.

Figure 5:
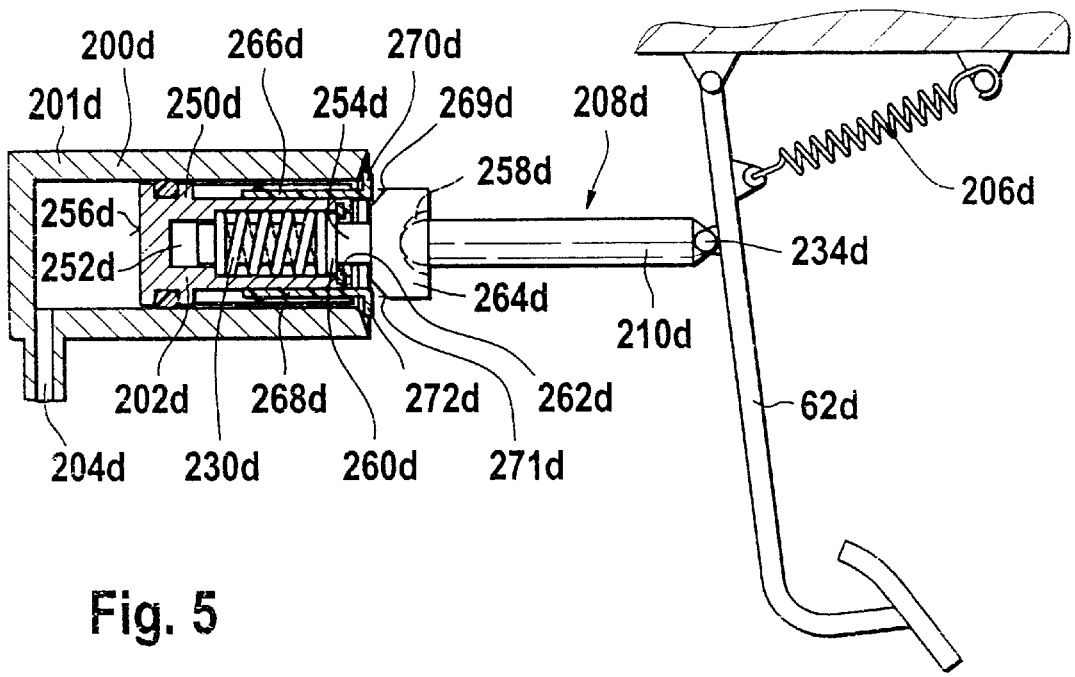

In the exemplary embodiment of FIG. 5, an excessive clutch-pedal force exceeding a force threshold is also diverted via the housing 201d of the master cylinder 200d to the vehicle body, so that excessive hydraulic pressures in the hydraulic system are avoided. In this case, however, the plunger arrangement 208d is designed as a simple one-piece plunger 210d and the signaling and protection device is integrated in the piston 202d of the hydraulic master cylinder 200d. To this end, the piston 202d is of multi-piece design and comprises a first piston element 250d, carrying a sealing ring and defining the hydraulic cylinder space of the master cylinder, and a separate, second piston element 254d displaceable in a recess 252d of the first piston element 250d in the direction of movement of the piston. The plunger 210d engages in a recess of the second piston element 254d. Arranged between the first piston element 250d and the second piston element 254d is a compression spring 230d, which preloads the two piston elements in the direction of a maximum length of the piston (distance between that surface 256d of the first piston element 250d which defines the cylinder space and the recess 258 of the second piston element 254d for the plunger 210d). The maximum length of the piston 202d corresponds to a relative position of the two piston elements in which an annular collar 260d of the second piston element runs against a stop ring 262d secured in the recess 252d of the first piston element 250d. The annular collar has the additional function of allowing the compression spring 230d to act on it.

During normal clutch-pedal-actuating forces, which occur in the case of a functioning system and sufficient pneumatic pressure, the total length of the piston 202d in the direction of movement remains essentially unchanged relative to the maximum length on account of an appropriate design of the compression spring 230d, so that the clutch-pedal actuation is converted without substantial loss of travel into a corresponding displacement of hydraulic medium from the hydraulic master cylinder 200d. On the other hand, if the pedal-actuating force exceeds a force threshold determined by the dimensioning of the spring 230d, the second piston element 254d, by the force acting on it and transmitted by the plunger 210d, is pushed further into the recess 252d of the first piston element 250d, against the pressure force exerted by the spring 230d, with a corresponding reduction in the total length of the piston 202d, in the course of which a head 264d arranged outside the recess 252d and having inclined deflection surfaces 269d, 271d approaches two blocking elements 266d and 268d carried by the first piston element. At an end remote from the head 264d, the blocking elements 266d and 268d are fastened to an outer circumferential surface of the first piston element, for example are firmly riveted thereto, and normally extend essentially parallel to the direction of movement of the piston 202d. On the other hand, if the head 264d acts on a head-side end of the respective blocking element, the latter is pressed outward under elastic deformation until finally a relative position of the two piston elements is achieved in which the blocking elements are pressed outward to such an extent that a respective, outwardly angled engagement section 270d or 272d of the respective blocking element acts on the housing 201d of the hydraulic master cylinder 200d, runs in the process with the engagement sections 270d, 272d against a plunger-side front surface of the housing 201d and thus, during a further increase in the actuating force exerted on the second piston element 254d, limits the force transmitted to the first piston element 250d by virtue of the fact that force is transmitted via the blocking elements to the housing of the master cylinder 200d and thus to the body while bypassing the first piston element. The effect is the same as in the exemplary embodiment in FIG. 2: by positive-locking engagement with the master-cylinder housing 201d, pedal-actuating force transmitted by the plunger arrangement 208d is directed into the housing in order to limit the pressure in the hydraulic system.

Figure 6:
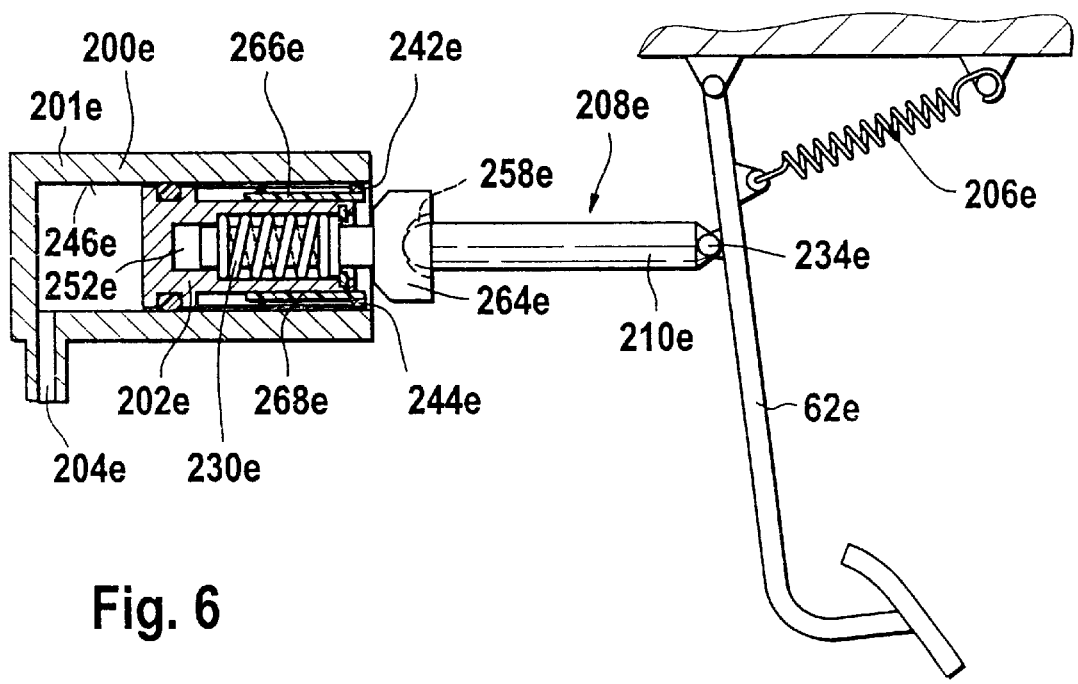

The above statements correspondingly apply to the exemplary embodiment in FIG. 6. In this case, however, the blocking elements 266e and 268e, instead of the engagement sections 270d and 272d angled outward in a hook shape, have brake blocks 244e and 244e, which, after the response of the signaling and protection device, come into frictional engagement with the inner surface 246e of the master cylinder 200e. The same effect as in the exemplary embodiment in FIG. 4 is achieved.

In the exemplary embodiments in FIGS. 2 to 6, the plunger arrangement and/or the piston of the master cylinder has been blocked in a positive-locking or frictional manner. The other approach is to block the clutch pedal itself. To this end, reference is made to FIGS. 7 and 8.

Figure 7:
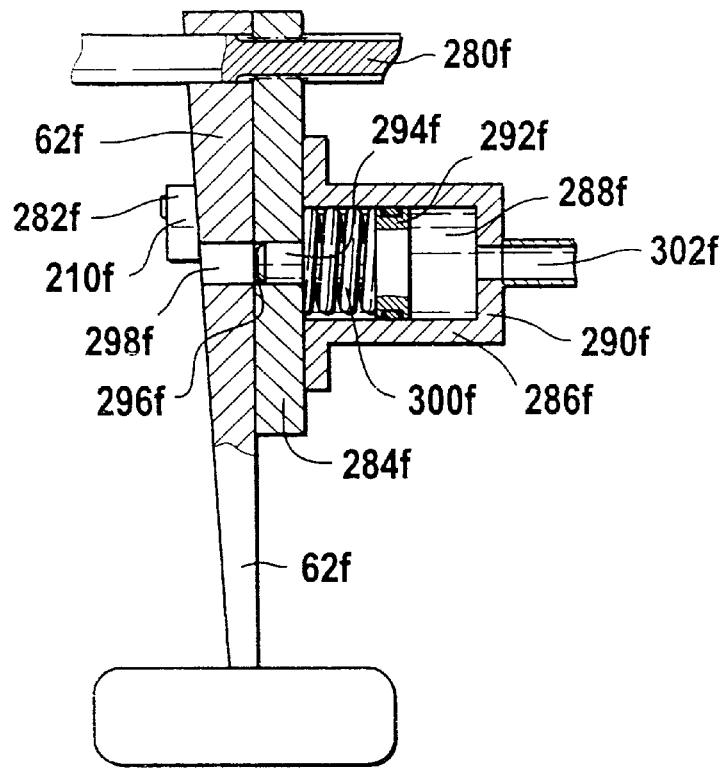
FIG. 7 shows a signaling and protection device, integrated in a clutch-pedal arrangement, for blocking a clutch pedal.

In the exemplary embodiment in FIG. 7, the clutch pedal 62f is mounted such that it can pivot about a pedal pivot 280f and is pivotably connected via an articulation 282f to the plunger 210f, which acts on a piston of a hydraulic master cylinder (not shown). In addition to the clutch pedal 62f, a pedal anchor 284f connected to the pedal pivot 280f in a rigid manner, that is non-rotatably, is provided, and this pedal anchor 284f, in an engaging position without clutch-pedal actuation, extends parallel to the clutch pedal 62f. The pedal anchor 284f carries a hydraulic slave cylinder 286f, comprising a housing 290f, which defines a hydraulic chamber 288f and in which a hydraulic piston 292f, sealing the hydraulic chamber 288f, is arranged to be displaceable, specifically in a direction which is essentially orthogonal to the motion plane of the clutch pedal 62f. The piston 262f carries a locking pin 294f, which extends in the direction of movement of the piston 292f and to which a passage opening 296f in the pedal anchor 284f is assigned, through which passage opening 296f the locking pin 294f can project laterally to the clutch pedal 62f beyond the pedal anchor 284f during appropriate positioning of the piston 292f.

The clutch pedal has an engagement opening 298f, which is coordinated with the position of the passage opening 296f and in which the locking pin 294f can engage in a positive-locking manner in order to lock the clutch pedal 62f on the pedal anchor 284f in a positive manner, that is to prevent the clutch pedal 62f from being depressed.

The piston 292f is preloaded by a compression spring 300f in the direction of a rest position in which the locking pin 294f does not project from the passage opening 296f. In this rest position, the volume of the hydraulic chamber 288f is at a minimum. The hydraulic chamber 288f is connected via a hydraulic line 302f to the hydraulic system connecting the hydraulic master cylinder to the positioning arrangement, so that, apart from any slight pressure drops, the same hydraulic pressure as in the rest of the hydraulic system prevails in the hydraulic chamber 288f.

At hydraulic pressures which normally occur, that is when the system is functioning and there is sufficient pneumatic pressure, the pressure force exerted on the piston 292f by the hydraulic medium in the hydraulic chamber 288f is not sufficient to displace the piston 292f so far in the direction of the pedal anchor 284f that the locking pin 294f projects from the passage opening 296f in the direction of the pedal 62f. However, if the hydraulic pressure exceeds a preset pressure threshold determined by the spring 300f, the clutch-pedal-side end of the locking pin 294f projects from the passage opening 296f and, provided the clutch pedal has still not been moved well away from the engaging position, engages in the engagement opening 298f and locks the clutch pedal 62f on the pedal anchor 284f in a positive manner. The clutch pedal can thus no longer be depressed further, and actuating forces exerted on the clutch pedal are diverted to the body via the pedal anchor 284f and the pedal pivot 280f while bypassing the plunger 210f and the hydraulic master cylinder.

It should be pointed out that the engagement opening 298f is somewhat larger in the pivoting direction of the clutch pedal 62f than the corresponding size of the locking pin 294f, so that, in the event of a malfunction of the actuating installation or in the event of an insufficient pneumatic pressure, a certain actuating movement of the clutch pedal 62f is possible without the subsequent production of the positive-locking engagement between locking pin 294f and engagement opening 298f being jeopardized. The hydraulic pressure, necessary for displacing the piston 292f, in the hydraulic chamber 288f may therefore build up without the clutch pedal 62f already having been moved so far out of a rest position without clutch actuation that the locking pin 294f can no longer engage in the engagement opening 298f.

The arrangement shown in FIG. 7 and described above therefore thus reliably provides for a limit to the force transmitted via the plunger 210f to the hydraulic master cylinder and thus for a limit to the hydraulic pressure in the hydraulic system. The driver will notice the locking of the clutch pedal 62f on the pedal anchor 234f owing to the fact that he cannot depress the clutch pedal 62f further. This clearly draws his attention to the fact that the actuating installation is not operative in the normal manner, so that incorrect operations of the actuating installation and/or of the motor vehicle are avoided. Furthermore, the hydraulic slave cylinder takes over the function of an overload-protection unit in the sense of the overload-protection unit 100 according to FIG. 1, since hydraulic medium displaced from the hydraulic master cylinder of the clutch-pedal arrangement is received in the hydraulic chamber 288f correspondingly increasing its volume. This is advantageous especially with regard to any pressure peaks in the hydraulic system, which are smoothed by means of the hydraulic slave cylinder 286f.

Furthermore, the hydraulic slave cylinder 286f –as described–serves, as it were in a hydraulic manner, to convert the actuating force exerted on the clutch pedal into a movement of the locking pin 294f and thus to utilize it for locking the clutch pedal 62f on the pedal anchor 284f.

Figure 8:
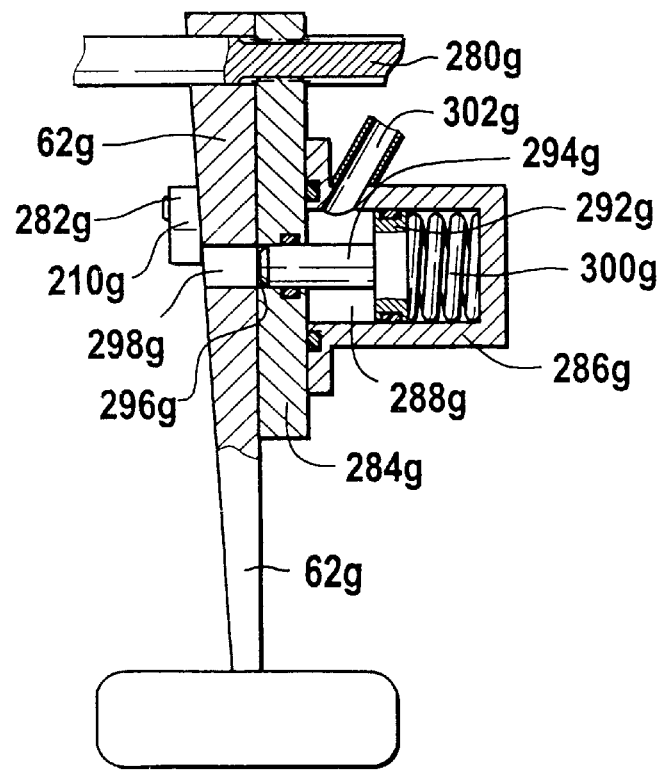
FIG. 8 shows a variant of the exemplary embodiment of FIG. 7.

The exemplary embodiment in FIG. 8, with regard to its mechanical construction, corresponds essentially to the exemplary embodiment in FIG. 7. A considerable difference, however, consists in the fact that, instead of a hydraulic slave cylinder, a pneumatic slave cylinder 286g is provided, the pneumatic chamber 288g of which is arranged on the pedal-anchor side of the pneumatic piston 292g. To seal the pneumatic chamber 288g, a sealing ring, which is in sealing engagement with the locking pin 294g, is provided in the passage opening 296g. On the other hand, the compression spring 300g is arranged on that side of the piston 292g which is remote from the pedal anchor 284g and preloads the piston 292g in the direction of a locking position, in which the locking pin 294g engages in the engagement opening 298g and thus locks the clutch pedal 62g on the pedal anchor 284g. However, the piston 292g only assumes this locking position when there is insufficient pneumatic pressure in the pneumatic chamber 288g, which is connected via a pneumatic line 302g to the pneumatic system and thus to the pneumatic source 51. This is because the compression spring 300g is adapted to the pneumatic pressure normally provided by the pneumatic source 51 in such a way that, when this pneumatic pressure rises in the pneumatic chamber 288g, the piston 292g is put into an unlocking position against the force of the spring 300g, in which unlocking position the locking pin 294g does not engage in the engagement opening 298g. The clutch pedal is then freely movable for the clutch actuation. On the other hand, if the pneumatic pressure is insufficient, the clutch pedal 62g is locked on the pedal anchor 284g, so that no actuating forces can be transmitted to the hydraulic master cylinder via the plunger 210g. Generation of an excessive hydraulic pressure is thus reliably prevented and at the same time a clear signal is given to the driver to the effect that the normal operability of the actuating system is at least momentarily nonexistent.

In the exemplary embodiments in FIGS. 2 to 8, the protection and signaling effect is primarily or exclusively based on positive or frictional locking or braking of the clutch pedal, the plunger arrangement or the master-cylinder piston on an element fixed relative to the vehicle, although in the case of FIGS. 2 to 6 a certain protection relief effect is achieved by the provision of idle travel, which comes into effect after a certain force threshold. In the subsequent exemplary embodiments in FIGS. 9 to 12, on the other hand, the protection effect against overloads is primarily based on the provision of idle travel, which comes into effect after a certain force threshold.

Figure 9:
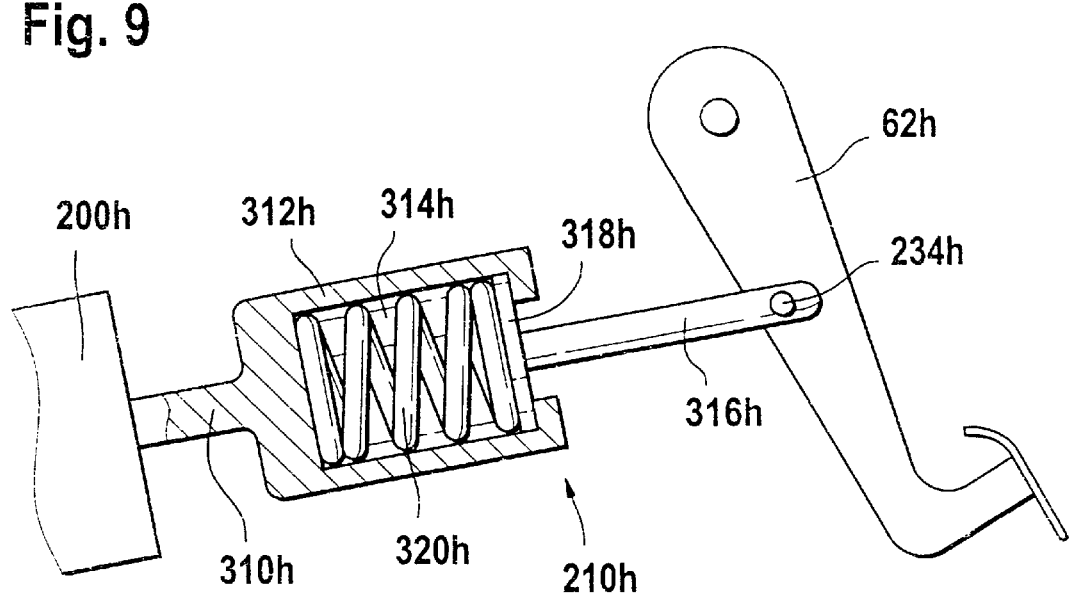
FIG. 9 shows a clutch-pedal arrangement with a plunger arrangement, which connects a clutch pedal to a hydraulic master cylinder and in which an elastic idle-travel arrangement is integrated.

In the example shown in FIG. 9, the clutch pedal 62h is connected to the hydraulic master cylinder 200h via a two-piece plunger 210h. A master-cylinder-side plunger part 310h has a housing 312h, in which a receiving chamber 314h is formed. At its free end, a pedal-side plunger part 316h has a piston-like plate 318h, which is accommodated in the receiving chamber 314h and is guided so as to be displaceable on housing walls laterally defining the receiving chamber. Secured in place between the plate 318h and a master-cylinder-side housing base is a compression spring 320h, which preloads the two plunger parts relative to one another in the direction of a maximum length of the plunger 210h. Normal pedal-actuating forces, which occur when the actuating installation is functioning and there is sufficient pneumatic pressure, are not sufficient to compress the compression spring 320h to a considerable degree while correspondingly shortening the plunger 210h. The actuating movement of the clutch pedal 62h is therefore transmitted to the piston of the master cylinder 200h without substantial loss of travel. On the other hand, if the actuating installation is inoperative on account of a lack of pneumatic pressure, the protection device, after a certain force threshold has been exceeded, responds to the extent that the plunger 210h is shortened to a considerable degree against the action of the spring 320h. An excessive rise in the hydraulic pressure in the hydraulic system adjoining the master cylinder 200h is thus prevented, the actuating force being stored in the compression spring 320h, which serves as an energy storage device. Should the actuating installation still be operative during the same actuating stroke of the clutch pedal 62h, the actuating force stored in the compression spring 320h acts on the piston of the master cylinder 200h via the plunger part 3120h, so that the piston of the master cylinder 200h displaces hydraulic medium (generally hydraulic oil) from the cylinder space of the master cylinder, and the plunger 210h is accordingly lengthened again under the action of the compression spring 320h.

The arrangement shown in FIG. 9 therefore achieves essentially the same or a similar effect as the overload-protection unit 100 shown in FIG. 1, which is to be regarded as a pressure accumulator, the stored pressure likewise being available in the event of the installation coming into the operative state again during the same clutch-pedal-actuating stroke in order to activate the positioning arrangement. However, the arrangement shown in FIG. 9 also has the same disadvantage as the overload-protection unit 100, namely that no clear signal is given to the driver that the protection device has responded in order to limit the hydraulic pressure or the actuating force transmitted to the master cylinder. Therefore provision should be made by means of additional measures for the driver to be given an appropriate signal. For example, a possibility would be to transmit the signal by optical or acoustic means.

Figure 10:
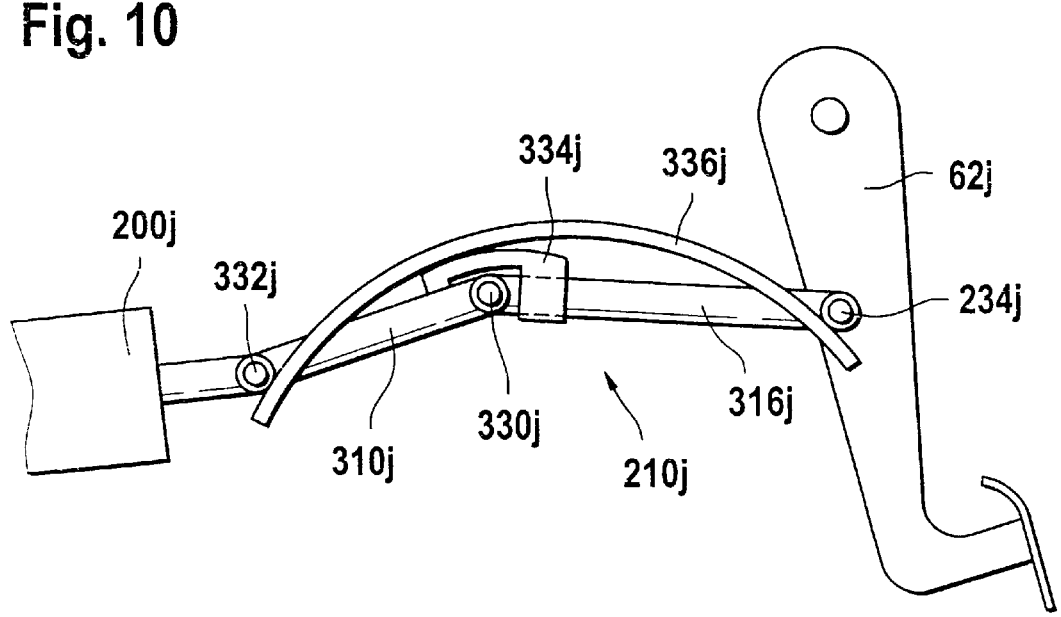
FIG. 10 shows a further exemplary embodiment of a such a clutch-pedal arrangement with an embodiment variant of the idle-travel arrangement serving as signaling and/or protection device.

In the exemplary embodiment in FIG. 10, idle travel of the clutch pedal 62j is likewise provided by shortening an effective length of the plunger 210j. However, the plunger is not shortened by "telescoping" two plunger parts as in FIG. 9 but by pivoting two plunger parts 310j and 316j. To this end, the clutch-pedal-side plunger part 316j is connected to the mastercylinder-side plunger part 310j via an articulation 330j, and the transmitter-element-side plunger part 310j acts on a piston-rod section of the hydraulic master cylinder 200j via a further articulation 332j.

The clutch-pedal-side plunger part 316j carries a stop part 334j, against which the transmitter-element-side plunger part 310j runs in the position shown in FIG. 10. In this position, in which the two plunger parts are buckled relative to a position rectilinear to one another, the plunger 210j assumes its maximum effective length, which is the rectilinear distance between the articulation 234j and the articulation 332j. The two plunger parts are held in this position by a preloaded leaf spring 336j, in engagement with them, as long as the actuating forces acting on the plunger parts do not exceed a threshold value. The actuating stroke of the clutch pedal 62j is then transmitted to the piston of the hydraulic master cylinder 200j without substantial loss of travel. On the other hand, if the clutch-pedal-actuating force increases beyond a threshold value preset by the preloading and dimensioning of the leaf spring 336j, for example on account of a pneumatic pressure which is too low or an actuating installation which is not functioning properly, the two plunger parts pivot toward one another against the action of the leaf spring 336j, as a result of which the rectilinear distance between the articulation 332j and the articulation 234j is reduced, that is idle travel is provided for the clutch pedal. With increasing pivoting of the two plunger parts toward one another, the force components, initiating the pivoting movement, of the actuating force transmitted from the clutch pedal to the plunger 210j increase, since the effective lever arm increases. Therefore the counterforce opposing a depressing movement of the clutch pedal 62j decreases significantly in the course of the relative pivoting movement of the two plunger parts, as a result of which the response of the protection device is clearly indicated to the driver. The protection device formed by the two-piece plunger and the leaf spring therefore has a signaling function even without separate measures.

Figure 11:
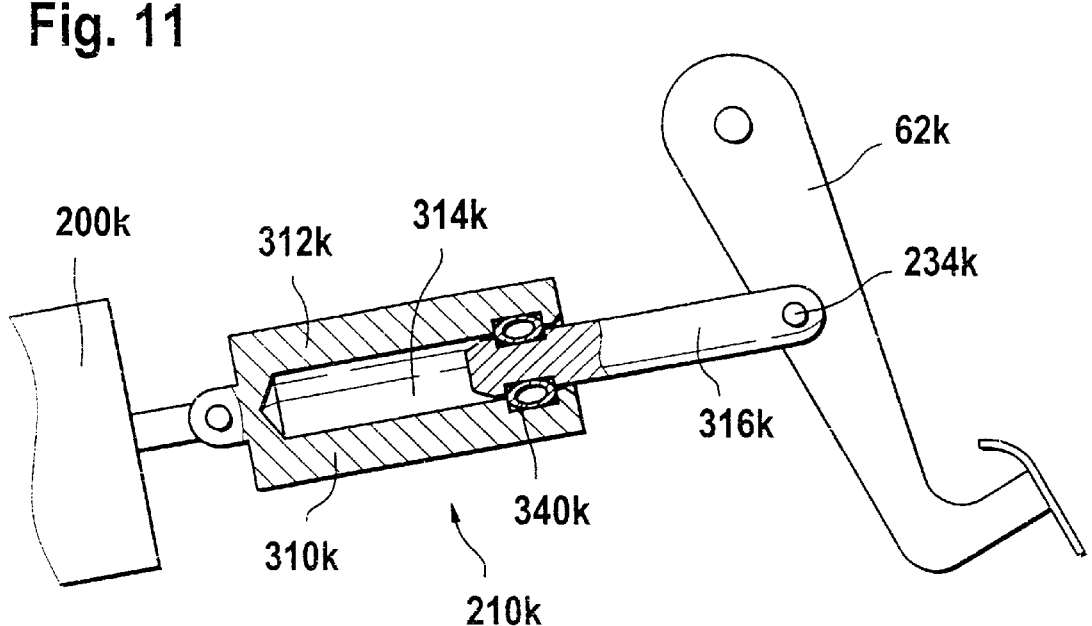
FIG. 11 shows a further idle-travel arrangement integrated in the plunger arrangement of a clutch-pedal arrangement.

The exemplary embodiment in FIG. 11 corresponds to the exemplary embodiment in FIG. 9 insofar as the signaling and protection device integrated in the plunger, after response, provides idle travel by the telescoping of two plunger parts (clutch-pedal-side plunger part 316k and master-cylinder-side plunger part 310k ). Unlike FIG. 9, however, no compression spring which preloads the plunger parts in the direction of a maximum length of the plunger 210k is effective between the two plunger parts. Instead, the two plunger parts, by means of a latching spring 340k effective between them, are held in a positive-locking manner in a relative position producing a maximum length of the plunger. The latching spring 340k engages, on the one hand, in an annular groove in an inner circumferential surface of the plunger part 310k and, on the other hand, in an annular groove in the plunger part 316k.

During normal actuating forces, which occur when the pneumatic pressure is sufficient and the actuating installation is operative, the latching engagement between the two plunger parts via the latching spring 340k is retained. On the other hand, if the force transmitted from the clutch-pedal-side plunger 316k to the latching spring 340k exceeds a preset threshold determined by the design of the latching spring, the latching spring 340k disengages for releasing the positive-locking latching engagement between the two plunger parts and then no longer counteracts telescopic shortening of the plunger length by the plunger part 316k being pushed into the receiving chamber 314k of the plunger part 310k. Since, apart from friction, there is no longer any force counteracting the telescoping of the plunger, the driver steps, as it were, into space after disengagement of the latching spring, since substantial counterforces no longer counteract his clutch-pedal actuation. As a result, the clutch pedal 62k is freed, as it were. This gives the driver a clear signal that the signaling and protection device has responded, and that a normal clutch actuation is therefore momentarily not possible. Thus not only is an excessive hydraulic pressure in the hydraulic system reliably prevented but incorrect operations are also effectively counteracted.

Figure 12:
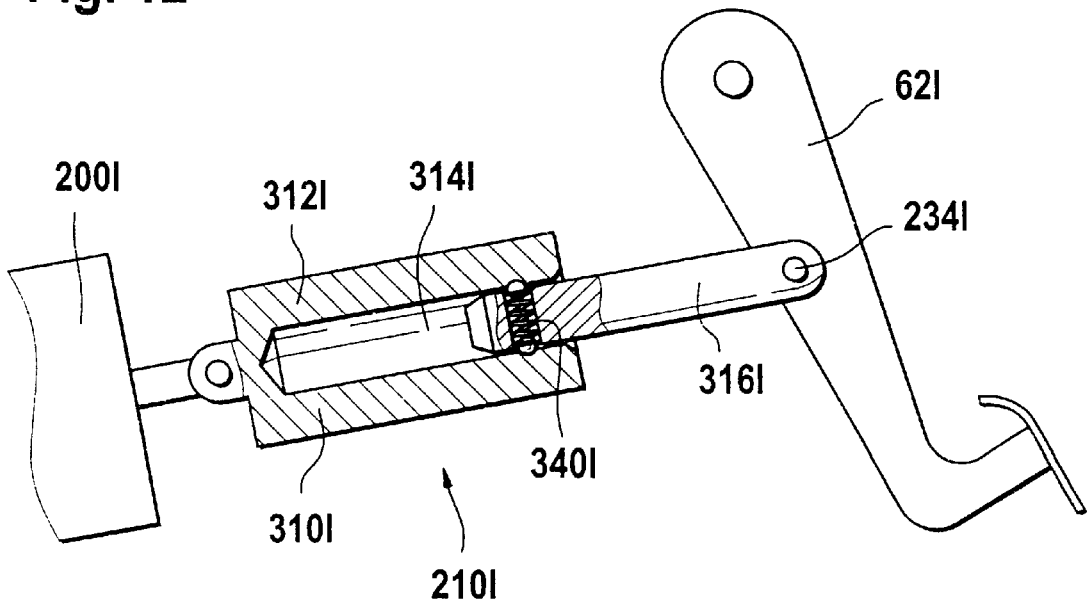
FIG. 12 shows a variant of the arrangement according to FIG. 11.

FIG. 12 shows a modification of the arrangement according to FIG. 11. The plunger 210l is designed as in the exemplary embodiment in FIG. 11; the only difference is that, instead of a latching spring 340k, a latching device 340l formed by latching balls and springs is provided, and this latching device 340l is accommodated in a radial bore of the clutch-pedal-side plunger part 316l. A compression spring of the latching device presses two latching balls into associated latching recesses in an inner circumferential surface of the plunger part 310l, as a result of which the plunger 210l is held in a relative position of the two plunger parts, the relative position resulting in a maximum plunger length. If the actuating force exceeds a certain threshold, the latching balls disengage from the associated recesses, and the plunger part 316l, like the plunger part 316k, can retract telescopically into the receiving chamber 314l. In this case, no substantial counterforces counteract a further clutch-pedal actuation, so that the driver, as it were, steps into space, and the clutch pedal is thus freed. A clear signaling function is achieved.

Unlike the exemplary embodiments shown in FIG. 11 and FIG. 12, a restoring spring could additionally be accommodated in the receiving space 314k or 314l respectively, which restoring spring, after the clutch pedal has been released, pushes the plunger part 316k or 316l respectively out of the receiving space 314k or 314l respectively again until the latching spring 340k or the latching device 340l respectively restores the latching engagement between the two plunger parts. However, in order to ensure the signaling function, this restoring spring must be designed for sufficiently light duty or must be lightly preloaded to a sufficient degree, so that the counterforce applied by it and counteracting the telescoping of the two plunger parts is significantly reduced compared with normal counterforces which occur during a clutch-pedal actuation, and accordingly an unimpaired signaling function is maintained.

Figure 13:
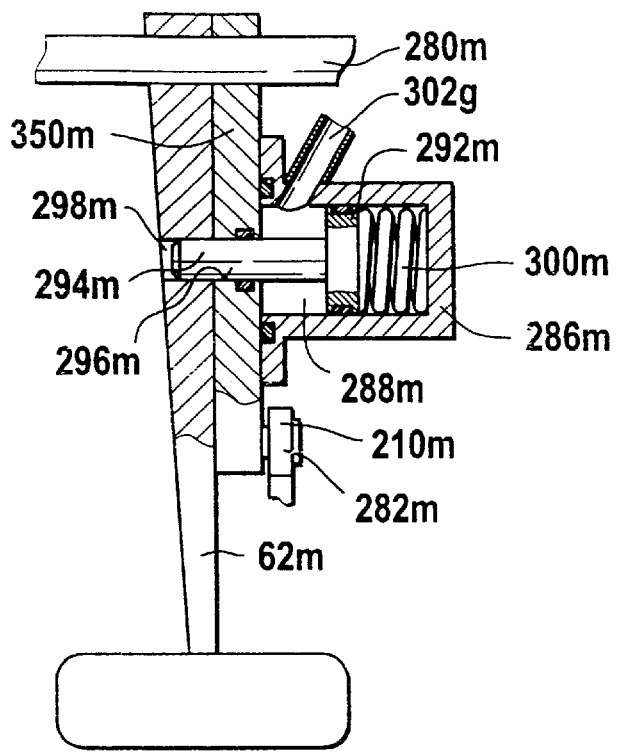
FIG. 13 shows a further exemplary embodiment of a signaling and protection device according to the invention, which is integrated in a clutch-pedal arrangement and in which the clutch pedal is released in the event of a response of the signaling and protection device.
Figure 14:
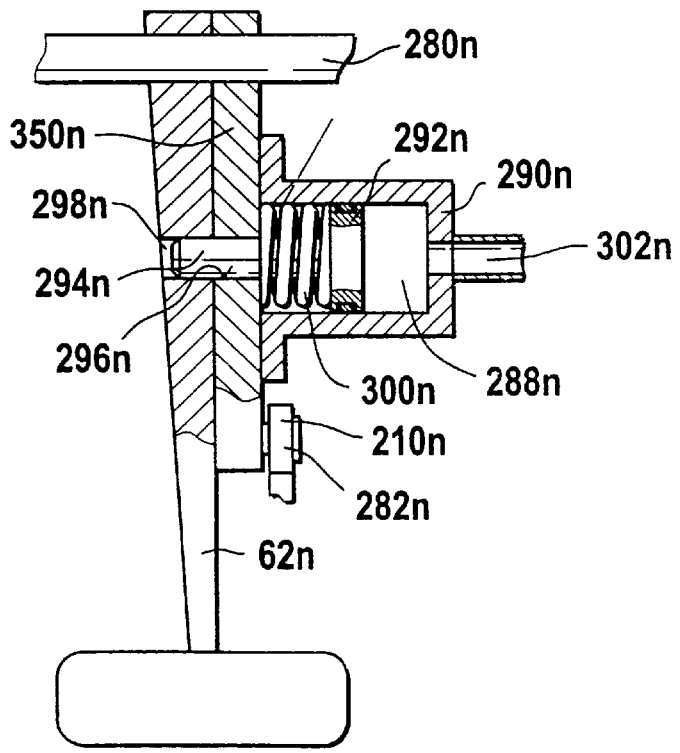
FIG. 14 shows an embodiment variant of the arrangement according to FIG. 13.

Further exemplary embodiments in which the protection and signaling effect is achieved by release of the clutch pedal are shown in FIGS. 13 and 14.

In the exemplary embodiment in FIG. 13, the clutch pedal 62m is not coupled directly to the clutch-pedal plunger 210m but is coupled only by means of a pivoted element 350m, which is pivotably mounted on the same pivot (pedal pivot 280m) and to which the plunger 210m is pivotably linked by means of the articulation 282m. The pivoted element carries a hydraulic slave cylinder 286m, which essentially corresponds to the pneumatic slave cylinder 286g of the exemplary embodiment in FIG. 8 and, like the latter, has a piston 292m, a locking pin 294m carried by the piston, and a compression spring 300m preloading the piston in the direction of a locking position. In the locking position, the locking pin 294m extends through the passage opening 296m in the pivoted element into the engagement opening 298m in the clutch pedal 62m, so that the clutch pedal 62m and the pivoted element 350m are locked on one another in a positive manner. The compression spring 300m is dimensioned and preloaded in such a way that, during normal clutch actuation, that is when the actuating installation is operative and the pneumatic pressure is sufficient, the hydraulic pressure in the hydraulic chamber 288m provided on the pivoted-element-side of the piston 292m is not sufficient to put the piston 292m into an unlocking position against the action of the compression spring 300m, in which unlocking position the locking pin 294m no longer engages in the engagement opening 298m, and accordingly the clutch pedal is uncoupled from the pivoted element and is thus freely movable, that is, it is freed, without force transmission to the hydraulic master cylinder. The hydraulic pressure in the hydraulic chamber 288m corresponds to the hydraulic pressure in the hydraulic system connecting the hydraulic master cylinder to the positioning arrangement, since provision is made for a corresponding hydraulic connection via the hydraulic line 302g.

On the other hand, if the actuating arrangement is inoperative, for example on account of insufficient pneumatic pressure, the pressure in the hydraulic system and thus in the hydraulic chamber 288m increases during a clutch-pedal actuation, as a result of which the piston 292m is moved in the direction of the unlocking position until finally the connection between clutch pedal 62m and plunger 210m is unlocked and the clutch pedal is freed, and a further increase in the hydraulic pressure on account of an actuation of the clutch pedal is no longer possible.

The exemplary embodiment in FIG. 14 differs from the exemplary embodiment in FIG. 13 owing to the fact that, instead of a hydraulic slave cylinder, a pneumatic slave cylinder 286n is provided, and this pneumatic slave cylinder 286n is composed essentially like the hydraulic slave cylinder 286f in FIG. 7. The piston 292n is preloaded by the compression spring 300n in the direction of an unlocking position. The pneumatic chamber 288n, which is connected via the pneumatic line 302n to the pneumatic system and thus to the pneumatic source 51, is provided on that side of the piston 292n which is remote from the pivoted element 250n. As long as the pneumatic pressure is insufficient, the compression spring 300n holds the piston 292n in an unlocking position, in which the locking pin 294n does not engage in the engagement opening 298n of the clutch pedal. The clutch pedal 62n is thus freed without actuating forces being transmitted via the plunger 210n to the hydraulic slave cylinder. On the other hand, if the pneumatic operating pressure has been reached, the piston 292n is displaced into a locking position by the pneumatic medium which has flowed into the pneumatic chamber 288n, in which locking position the locking pin 294n couples the clutch pedal 62n to the pivoted element 350n by positive-locking engagement, so that the power-transmission connection between the clutch pedal 62n on the one hand and the piston of the hydraulic master cylinder on the other hand is produced via the pivoted element 350n and the plunger. As in the exemplary embodiment in FIG. 13, the release of the clutch pedal gives a clear signal to the driver to the effect that proper operation is momentarily not possible. At the same time, excessive hydraulic pressures in the hydraulic system on account of a lack of pneumatic pressure are prevented from occurring.

Figure 15A:
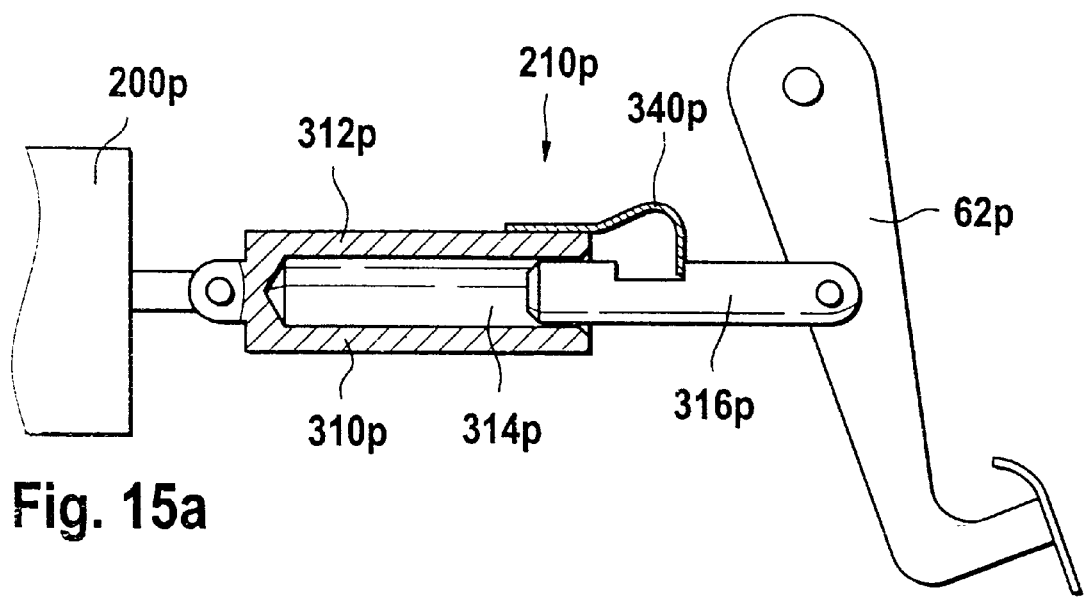
FIG. 15 shows an exemplary embodiment of a signaling and protection device according to the invention, which provides idle travel by telescoping of a plunger and in which an energy storage device effective below a force threshold is integrated, FIGS. 15a, 15b and 15c showing three operating states of the signaling and protection device.
Figure 15B:
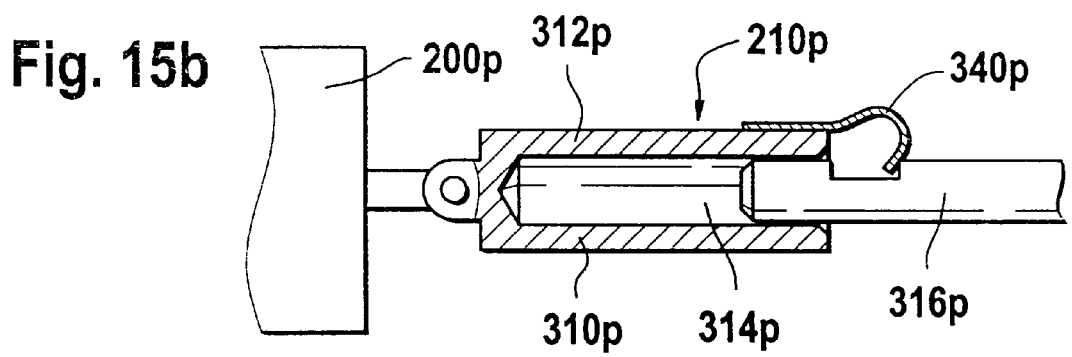
Figure 15C:
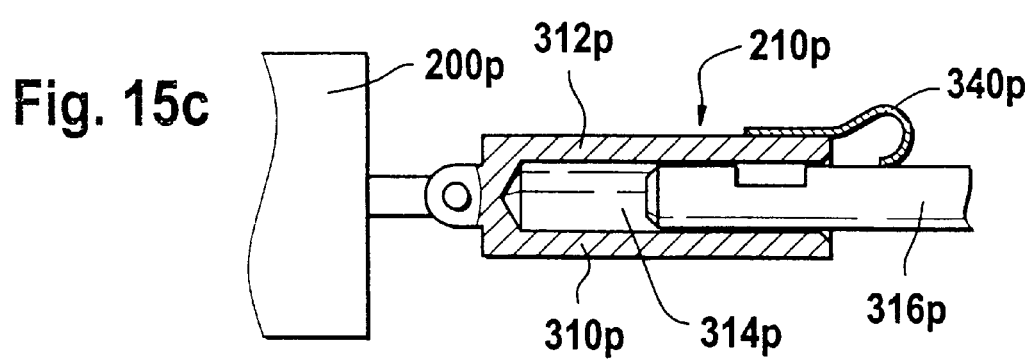

The exemplary embodiment in FIG. 15 corresponds in its basic construction to the exemplary embodiment in FIG. 11. As in FIG. 11, the plunger 210p can be telescoped in the event of a response of the signaling and protection device, in which case a latching spring 340p attached to the master-cylinder-side plunger part 312p engages in a recess of the plunger part 316p and counteracts a retraction of the plunger part 316p into the receiving chamber 314p as long as the latching engagement exists between the latching spring 340p and the latching recess in the plunger part 316p. On account of the special swan-neck shape of the latching spring 340p, which may also be designated as swan-neck spring, this latching spring 340p –as long as the latching connection is maintained–acts as an energy storage device and thus permits a certain relative movement between the two plunger parts under appropriate elastic deformation of the spring. In this way, force peaks which possibly occur during a sudden rapid clutch-pedal actuation can be absorbed. On the other hand, if the force exerted on the swan-neck spring 340p rises above a threshold value, the swan-neck spring 340p disengages from the recess in the clutch-pedal-side plunger 316p. FIG. 15b shows the situation just before the release of the latching engagement. According to FIG. 15c, the swan-neck spring 340p is disengaged from the associated recess, and the clutch-pedal-side plunger part 316p can be retracted telescopically into the master-cylinder-side plunger part 310p without substantial counterforce, so that the clutch pedal 62p is freed. After disengagement of the swan-neck spring 340p, the actuating force stored beforehand in it is also no longer available for the activation of the positioning arrangement via the master cylinder, since the swan-neck spring 340p has relaxed.

In the exemplary embodiment in FIG. 15, two operative mechanisms providing overload protection are used in such a way as to be matched to one another. As long as the force threshold is not exceeded, the swan-neck spring 340p acts as an energy storage device, which absorbs and stores actuating forces exceeding a certain force level. Here, storage refers to the fact that the stored actuating force. When the actuating installation is functioning properly (again), is still available during the same clutch-pedal-actuating stroke in order to act on the hydraulic master cylinder via the plunger arrangement and thereby activate the positioning arrangement. The shortening in the length of the plunger arrangement is therefore "reversible" relative to a clutch-pedal-actuating stroke. On the other hand, if the swan-neck spring disengages, only "irreversible" shortening of the length of the plunger arrangement is possible relative to the individual clutch-pedal-actuating stroke. The driver then steps into space and there is no longer any force stored for activation of the positioning arrangement via the hydraulic master cylinder.

In contrast thereto, only "irreversible" shortening, in the sense mentioned, of the length of the plunger arrangement is possible in the exemplary embodiments in FIGS. 11 and 12, whereas in the exemplary embodiment in FIG. 9 an energy storage device is always effective between the two plunger elements and thus only "reversible" shortening, in the sense mentioned, of the length of the plunger arrangement is possible. By analogy with the fact that the force is stored by an energy storage device in the case of the "reversible" shortening, the actuating force in the case of the "irreversible" shortening may also be said to be "dissipated", as it were. There is "dissipation" of the actuating force insofar as no actuating force at all can be built up without a counterforce counteracting an actuating force.

A completely different operative mechanism is used in the exemplary embodiments in FIGS. 2 to 8. Here, by blocking of a part moving along during a pedal actuation, actuating force is kept away from following components of the transmission section between clutch pedal and positioning arrangement by the actuating force being absorbed by components fixed relative to the vehicle. The force transmitted to the following components is limited in this way.

Figure 16A:
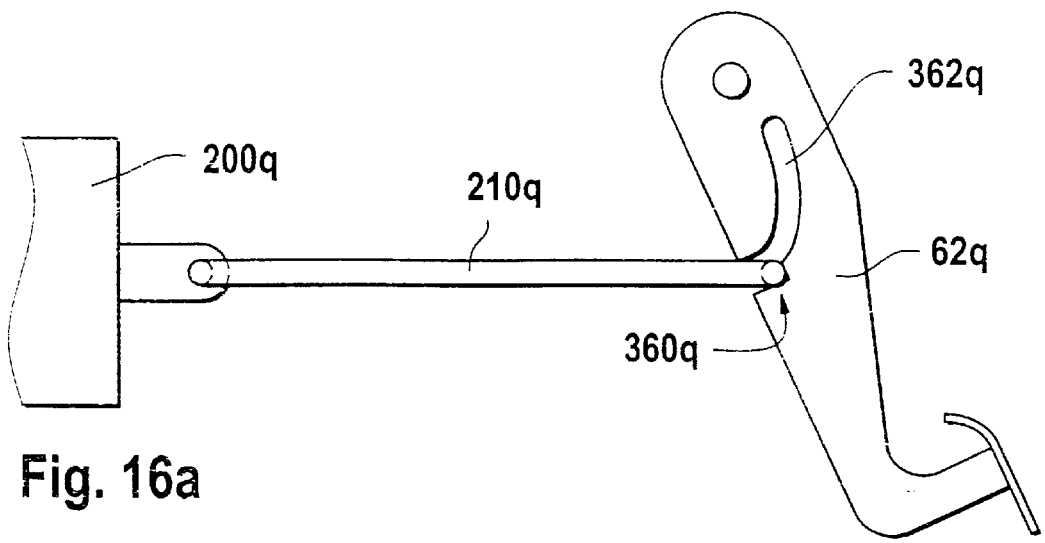
FIG. 16 shows a further exemplary embodiment of a signaling and protection device according to the invention, having an energy storage device integrated in a plunger and abrupt provision of idle travel by release of a latching connection between plunger and clutch pedal, FIGS. 16a, 16b and 16c showing three operating states of the signaling and protection device.
Figure 16B:
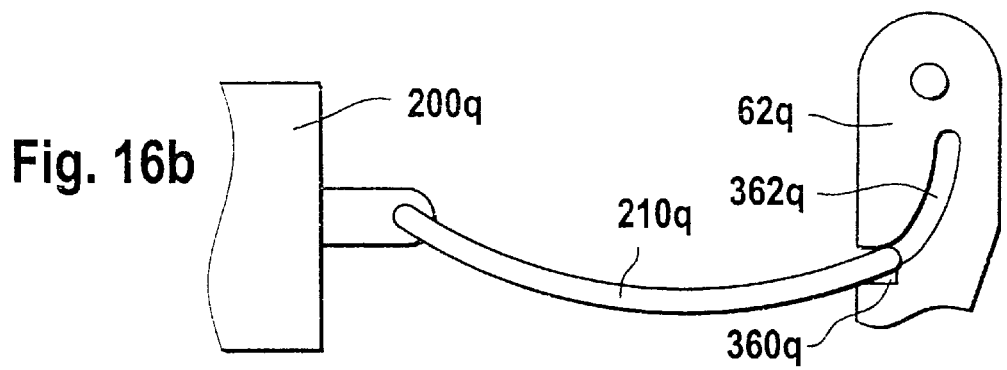
Figure 16C:
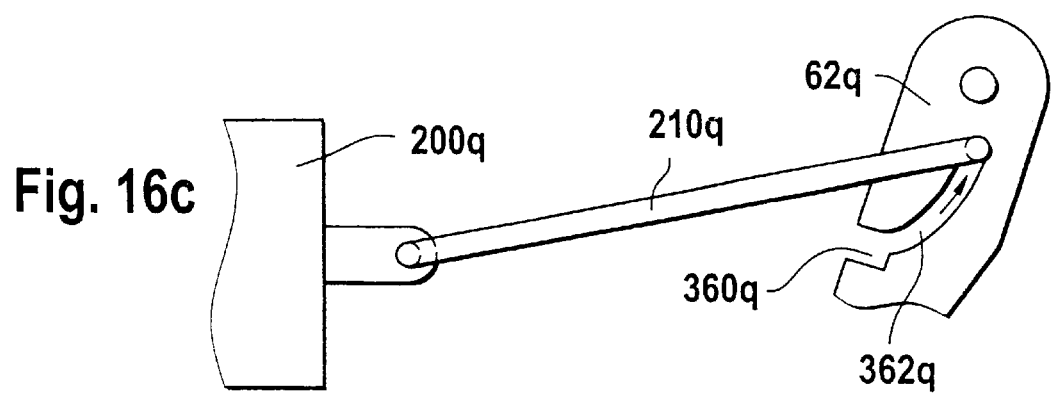

An effect similar to the effect in FIG. 15 is also achieved in the arrangement according to FIG. 16. In this case, the plunger 210q connecting the clutch pedal 62q to the piston of the hydraulic master cylinder 200q is designed as a leaf spring, which is linked to a piston-rod section of the piston of the hydraulic master cylinder 200q and engages by means of a clutch-pedal-side end in a latching recess 360q in the clutch pedal. The latching recess 360q is part of a curved slot 362q in the clutch pedal 62q.

As long as the actuating force exerted on the clutch pedal 62q does not exceed a threshold value, the leaf spring 210q acts as an energy storage device, which stores the actuating force by virtue of the fact that it bends elastically relative to an extended position (FIG. 16a), producing a maximum plunger length, with corresponding shortening of the effective length of the plunger (restricted idle travel is thus provided, FIG. 16b). The deflection and thus the stored actuating force depends on the force exerted on the leaf spring 210q by the clutch pedal 62q. If the clutch-pedal-actuating force exceeds a threshold, the leaf spring 210q bends to such an extent that its clutch-pedal-side end disengages from the latching recess 360q and moves into the adjoining slot 362q while the leaf spring 210q relaxes. As a result, idle travel essentially freeing the clutch pedal is provided, this idle travel on the one hand sending a clear signal to the driver and on the other hand providing for the requisite overload protection.

Figure 17:
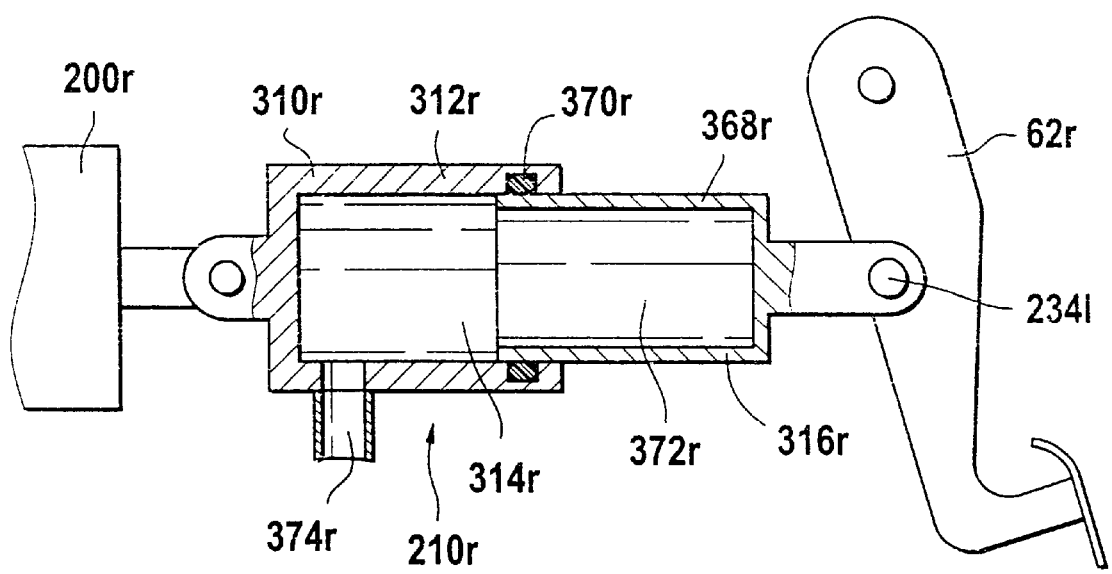
FIG. 17 shows an exemplary embodiment of a signaling and protection device according to the invention, having a pneumatic spring integrated in the plunger between clutch pedal and hydraulic master cylinder.

FIG. 17 shows a further exemplary embodiment of a signaling and protection device according to the invention, having a telescopic plunger 210r between clutch pedal 62r and hydraulic master cylinder 200r. The master-cylinder-side plunger part 310r has a receiving space 314r in which a tubular section, closed toward the clutch pedal, of the plunger part 316r engages by means of a sealing ring 370r, so that the receiving chamber 314r together with the interior of the tubular section 368r forms a pneumatic chamber 372r, which is connected via a pneumatic connection 374r to the pneumatic system and thus to the pneumatic source 51.

As long as the pneumatic source 51 delivers sufficient pneumatic pressure, the two plunger parts are preloaded relative to one another in the direction of a maximum length of the plunger 210r by the pneumatic cushion (in particular a compressed-air cushion) contained in the pneumatic chamber 372r, in which case stops (not shown in FIG. 17) which limit the relative movement of the plunger part 316r away from the plunger part 310r are provided. This limiting may also be achieved by a stop for the clutch pedal 62r. The pneumatic cushion in the pneumatic chamber 372r acts as a pneumatic spring, which can store actuating forces transmitted to the plunger 210r from the clutch pedal 62r and thus smooths force peaks. On the other hand, if the pressure source 51 cannot deliver sufficient pneumatic pressure, telescopic shortening of the plunger 210r is possible, since no pneumatic cushion, or at most a pneumatic cushion having only an inadequate pressure, is contained in the pneumatic chamber 372r, so that an adequate counterforce no longer counteracts the actuating force acting on the plunger part 316r. The plunger 210r, as in the case of the exemplary embodiments in FIGS. 11 and 12 after disengagement of the latching spring 340k and the latching device 340l respectively, can thus be telescoped, as a result of which idle travel absorbing the actuating movement of the clutch pedal 62r is provided. Substantial forces are then no longer transmitted to the hydraulic master cylinder 200r, so that provision is made for the requisite overload protection. On account of the freeing of the clutch pedal 62r in the event of an insufficient pneumatic pressure, the signal, which is important with regard to the avoidance of incorrect operations, is also sent to the driver.

In the exemplary embodiments described previously, the plunger connecting the clutch pedal to the piston of the hydraulic master cylinder, the piston itself or the clutch pedal was blocked mechanically, or the clutch pedal was freed, either by unlocking the connection between pedal and plunger or in another manner providing idle travel, in which case, for the unlocking/locking of the connection between pedal and plunger or for the blocking/unblocking of the pedal, the locking pin provided for this purpose, in some exemplary embodiments, was moved by means of a hydraulic slave-cylinder arrangement, which is connected to the hydraulic system connecting the hydraulic master cylinder to the positioning arrangement. In this way, as already mentioned, the actuating force acting on the clutch pedal may be converted hydraulically into actuating forces for the locking pin.

Figure 18:
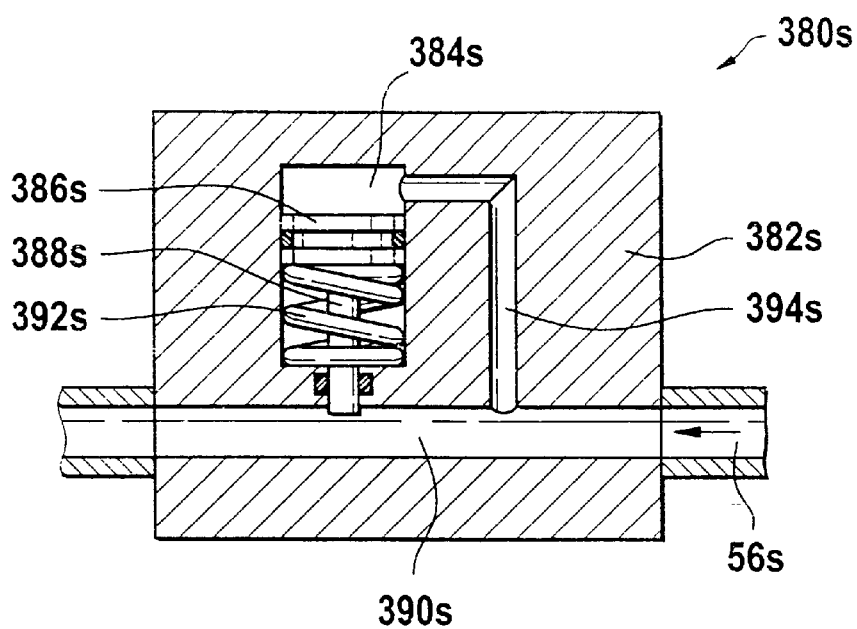
FIG. 18 shows a hydraulically actuated, hydraulic stop valve of a further embodiment form of a signaling and protection device according to the invention.

However, blocking of the clutch pedal or freeing of the clutch pedal may also be achieved by devices which are directly effective solely within the hydraulic system. FIG. 18 shows an exemplary embodiment of a hydraulic stop valve, which in the case of the exemplary embodiment in FIG. 1 could be arranged in the hydraulic line 56 between clutch-pedal arrangement 60 and control valve 42. The stop valve 380s comprises a hydraulic chamber 384s, which is formed in a housing 382s and in which a hydraulic piston 386s is guided in a sealing and displaceable manner. The hydraulic piston carries a barrier valve element 388s, which, in an interrupt position, extends through a sealed-off opening in a hydraulic connection 390s inside the stop valve and interrupts this hydraulic connection 390s, that is it blocks it off. The hydraulic connection between the hydraulic master cylinder inside the clutch-pedal arrangement and the control valve is thus interrupted. The hydraulic piston is preloaded by a compression spring 392s in an opening position, in which the barrier valve element 388s is withdrawn from the hydraulic connection 390s and accordingly the hydraulic connection 390s is uninterrupted. Formed on the other side of the hydraulic piston 386s opposite the compression spring 392s is the actual hydraulic chamber, which is connected to the hydraulic connection 390s via a hydraulic line 394s within the valve. The stop valve is inserted into the hydraulic line 56 (FIG. 1) in such a way that the hydraulic line 394s leads into a master-cylinder-side section of the hydraulic connection 390s.

During hydraulic pressures in the hydraulic system which normally occur, that is when the actuating installation is operative and there is sufficient pneumatic pressure, the hydraulic connection 390s is always uninterrupted on account of appropriate dimensioning of the compression spring 392s. The hydraulic medium in the hydraulic chamber only presses the barrier valve element 388s into the interrupt position against the force of the spring 392s if the hydraulic pressure exceeds a threshold value, so that the hydraulic connection 390s is interrupted by the barrier valve element 388s, and that section of the hydraulic system which is on the control-valve side relative to the stop valve is protected from a further pressure rise. In the process, the pressure in the master-cylinder-side section of the hydraulic system can continue to rise during corresponding clutch-pedal actuation and accordingly must be of sufficiently robust (burst-proof) design.

If the hydraulic connection 390s is interrupted by the barrier valve element 388s, this has such an effect with regard to the clutch pedal that the latter cannot be depressed further, that is it is blocked. In this way, a clear signal to the effect that a normal clutch actuation is momentarily not possible is sent to the driver.

The hydraulic chamber 384s and the compression spring 392s may be dimensioned in such a way that, in certain operating states, they act together with the hydraulic piston 386s like the overload-protection unit 100 in FIG. 1, that is they serve as a pressure accumulator and smooth pressure peaks in the hydraulic system. The stop valve may also be designed in such a way that, before complete closing of the hydraulic connection 390s, the hydraulic connection is only choked over a certain system pressure range, as a result of which a rise in the hydraulic pressure in the control-valve-side section of the hydraulic system is limited and the clutch pedal is braked.

Figure 19:
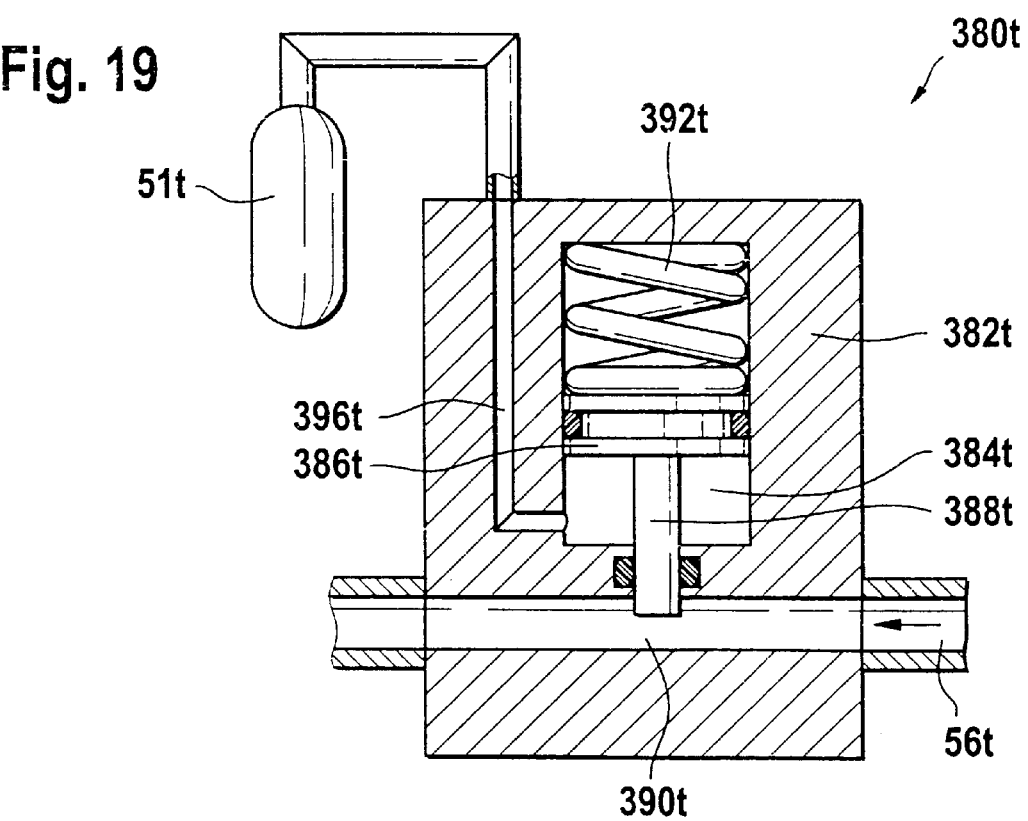
FIG. 19 shows a pneumatically actuated, hydraulic stop valve of such a signaling and protection device.

The exemplary embodiment in FIG. 19 differs from the exemplary embodiment in FIG. 18 owing to the fact that the hydraulic stop valve 380t is pneumatically actuated. To this end, the compression spring 392t, in contrast to the valve in FIG. 18, is not arranged on the side of the hydraulic connection 390t of the pneumatic piston 386t but on the opposite side and preloads the pneumatic piston 386s in an interrupt position, in which the barrier valve element 388t interrupts the hydraulic connection 390t.

Formed on the other side of the hydraulic piston 386t opposite the compression spring 392t is a pneumatic chamber 384t, which is connected via a pneumatic line 396t to the pneumatic system and thus to the pneumatic source 51t. The compression spring 392t is dimensioned in such a way that, when the pneumatic source 51t provides its normal pneumatic pressure, the pneumatic cushion contained in the pneumatic chamber 384t moves the pneumatic piston 386t together with the barrier valve element 388t into an open position, in which the connection between the hydraulic master cylinder of the clutch-pedal arrangement and the control valve is opened by the hydraulic stop valve 380t by means of the hydraulic connection 390t, that is said connection is uninterrupted.

If the hydraulic connection 390t is interrupted by the barrier valve element 388t on account of a lack of pneumatic pressure, on the one hand, as in the exemplary embodiment in FIG. 18, that section of the hydraulic system which is on the control-valve side relative to the stop valve is protected from pressure rises and, on the other hand, the momentary inoperability of the actuating installation is signalled to the driver by the clutch pedal being blocked hydraulically.

Figure 20:
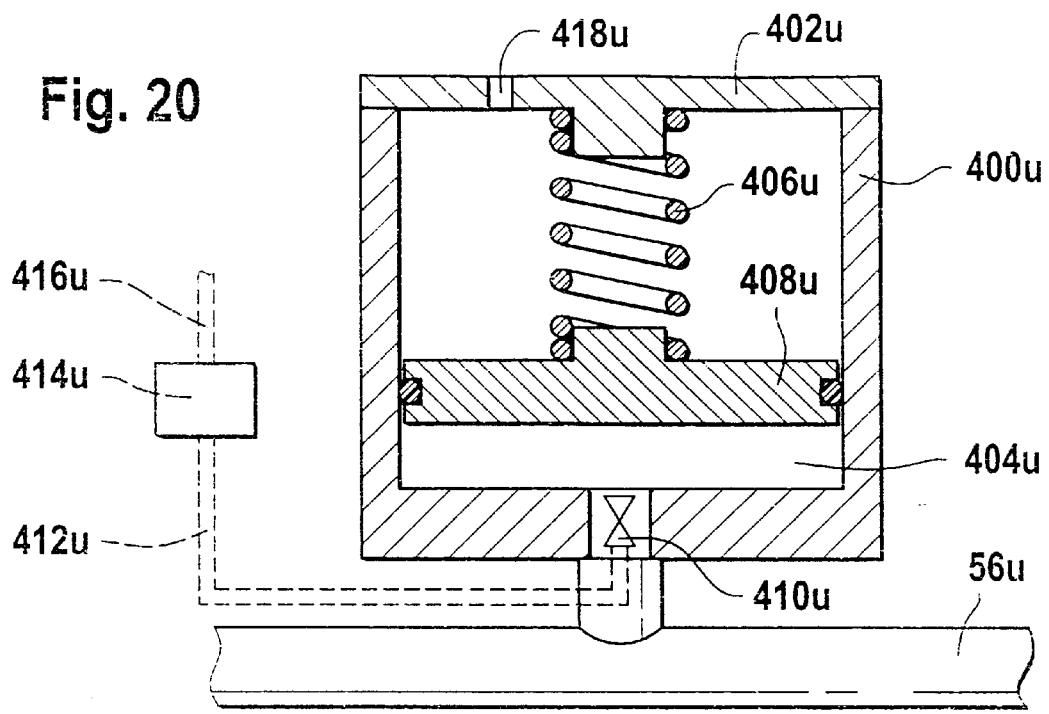
FIG. 20 shows an exemplary embodiment of a compensating reservoir (hydraulic-medium intermediate accumulator), which is arranged in the hydraulic system, can be connected to the system by a valve and is intended for receiving hydraulic medium for the purpose of reducing a hydraulic pressure in the hydraulic system.

FIG. 20 shows a possible means of releasing the clutch pedal in a purely hydraulic manner in the event of a response of the signaling and protection device. The signaling and protection device comprises a hydraulic chamber 404u, which is formed in a housing 400u having a cap 402u and in which a piston 408 carrying a sealing and preloaded by means of a preloading spring 406u is arranged to be displaceable. The piston is preloaded by the spring 406u in the direction of a reduction in volume of the hydraulic chamber 404u. In this respect, the arrangement in FIG. 20 corresponds essentially to the overload-protection unit 100 of FIG. 1 and could be arranged instead of the latter on the hydraulic line 56 connecting the clutch-pedal arrangement 60 to the control valve 42. However, a deviation from the overload-protection unit 100 which makes a considerable difference with regard to the mode of operation of the arrangement consists in the fact that, on the one hand, the spring 406u is designed for substantially lighter loading than the spring, preloading the piston 104, of the overload-protection unit 100 and, on the other hand, a valve 410u is provided, which normally, that is when the actuating installation is fully operative, keeps the connection between the hydraulic chamber 404u and the hydraulic system (line 56u) closed.

In the exemplary embodiment in FIG. 20, the valve 410u is an electrically actuated valve, which is connected via an activating line 412u to a control unit 414u. The control unit is connected via a signal line 416u to a force sensor detecting the actuating force acting on the clutch pedal. Alternatively or additionally, the control unit could also be connected, for example, to a pressure sensor, which detects the hydraulic pressure in the hydraulic system.

If the actuating force detected by the force sensor and acting on the clutch pedal rises above a threshold value (or if the hydraulic pressure detected by the pressure sensor and prevailing in the hydraulic system rises above a threshold value), the control unit 414u activates the valve 410u in such a way that the valve opens, and accordingly the hydraulic connection between the hydraulic system (line 56u) and the hydraulic chamber 404u is produced. The hydraulic medium can then flow into the hydraulic chamber 404u with corresponding displacement of the piston 408u against the force of the spring 406u. The spring has such preloading that only a relatively small resistance is offered to the increase in volume of the hydraulic chamber 404u, and accordingly a noticeable pressure drop occurs in the hydraulic system. This pressure drop, with the opening of the valve 410u, occurs very suddenly, which is also helped by the fact that an air-relief bore 418u is provided in the cap 402u.

In contrast to the overload-protection unit 100 in FIG. 1, which essentially maintains the pressure in the hydraulic system on account of appropriate dimensioning of its preloading spring, that is it works as a pressure accumulator, the arrangement in FIG. 20 works primarily as an intermediate accumulator for hydraulic medium without a substantial pressure-accumulator function. With the opening of this "intermediate accumulator" by the valve 410$u$, a substantial quantity of hydraulic medium can be displaced from the hydraulic master cylinder of the clutch-pedal arrangement under at most small counterforces, so that the clutch pedal is freed at least a little way. As a result, a signal is sent to the driver to the effect that the actuating installation is momentarily not fully operative. In addition, by connection of the intermediate accumulator to system, an excessive rise in the hydraulic pressure in the system is prevented, in which case even a substantial drop in the hydraulic pressure in the system occurs. The preloading spring 406$u$ only has the function of returning the hydraulic medium which has flowed into the hydraulic chamber 404$u$ back into the hydraulic system by appropriate reduction in the volume of the hydraulic chamber 404$u$ when the clutch pedal is no longer actuated. On the other hand, if the actuating installation, for example on account of a pneumatic pressure which is now sufficient, should be operative again when the clutch pedal is still depressed, the hydraulic pressure in the hydraulic system, which hydraulic pressure is determined indirectly by the compression spring 406$u$, is not sufficient to activate the control valve 42 with sufficient hydraulic pressure, so that the clutch can no longer be disengaged during the same clutch-pedal-actuating stroke. This cannot be achieved until after the release of the clutch pedal and return of the hydraulic medium from the hydraulic chamber 404$u$ with subsequent closing of the valve 410$u$ during the following clutch-pedal-actuating stroke.

Figure 21:
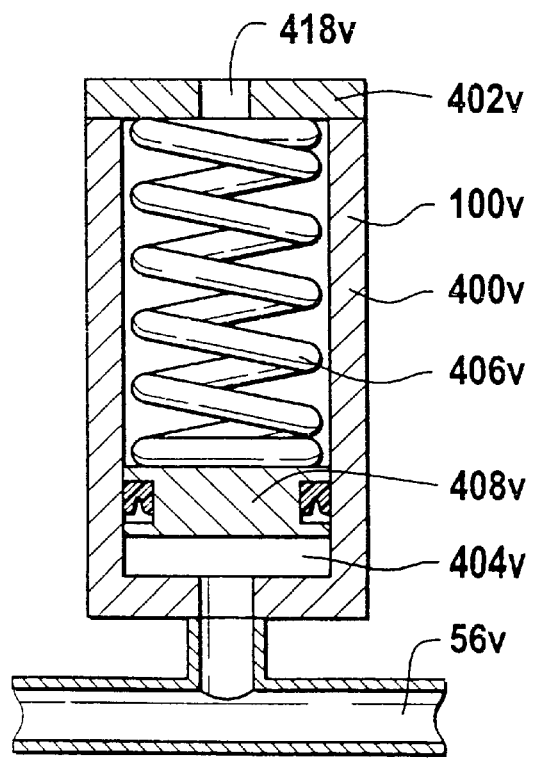
FIG. 21 shows an exemplary embodiment of a hydraulic pressure accumulator, which is arranged in the hydraulic system and serves as overload-protection device.

In contrast thereto, the overload-protection unit 100 in FIG. 1, which is shown again in detail in FIG. 21 as overload-protection unit 100$v$, works as a pressure accumulator, which is constantly connected to the hydraulic system and in which the preloading spring 406$v$ is dimensioned in such a way that, after a hydraulic threshold pressure has been reached, this hydraulic pressure does not continue to rise to a considerable degree. There is only a slight rise in the hydraulic pressure in accordance with the loading of the spring 406$v$, which increases during displacement of the hydraulic piston 408$v$ in order to increase the volume of the hydraulic chamber 404$v$. The hydraulic pressure achieved is thus essentially maintained, stored as it were, and is still available during the same clutch-pedal-actuating stroke for the activation of the control valve 42, should the actuating installation become operative during this clutch-pedal-actuating stroke.

Since the hydraulic pressure in the hydraulic system is kept essentially constant in the event of a response of the overload-protection unit 100$v$, a clear signal concerning the momentary inoperability of the actuating installation is given to the driver, since the clutch pedal is neither blocked nor freed. However, additional measures could be taken in order to give the driver a signal. For example, the displacement of the piston 408$v$ could be detected by means of a position sensor, from which an optical or acoustic alarm could be delivered to the driver. The overload-protection unit 100$v$ could additionally also expediently be provided, for example, at one of the signaling and protection devices in FIGS. 2 to 6 in order to smooth hydraulic pressure peaks in the hydraulic system.

Figure 22:
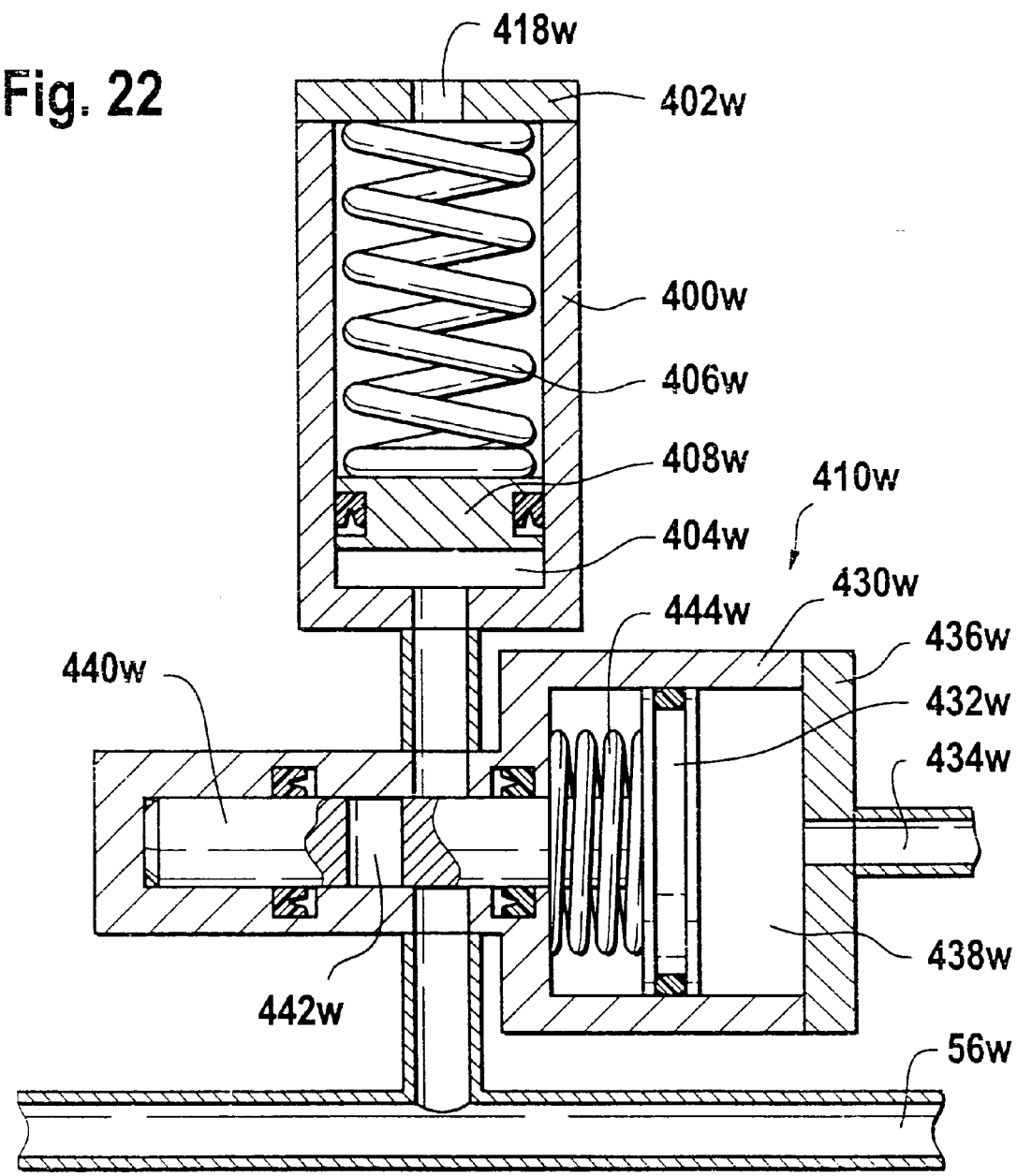
FIG. 22 shows a further exemplary embodiment of a compensating reservoir, which is arranged in the hydraulic system, can be connected to the system by a valve and is intended for receiving hydraulic medium.

FIG. 22 shows an embodiment variant of the arrangement in FIG. 20. The statements made with respect to the intermediate accumulator in FIG. 20 apply to the hydraulicmedium intermediate accumulator formed by the housing 400$w$, the cap 402$w$, the piston 408$w$ and the preloading spring 406$w$; this is a hydraulic-medium accumulator without a substantial pressure-accumulator function, since the spring 406$w$ is designed for correspondingly light loading. The somewhat different dimensions of the components forming the intermediate accumulator compared with the intermediate accumulator in FIG. 20 are not important. However, a pneumatically operated valve 410$w$ is provided instead of the electrically actuated valve 410$u$. It comprises a pneumatic piston 432$w$, which is displaceably guided in a housing 430$w$ and, together with the housing 430$w$ and a housing cap 436$w$ having a pneumatic connection, defines a pneumatic chamber 438$w$. The pneumatic piston 432$w$ carries a valve element 440$w$, which is of pin-like design and has a control bore 442$w$. The valve element 440$w$ is displaceably mounted in a sealed-off manner in a housing recess and can be put into a displacement position in which a hydraulic connection is produced between the hydraulic system (hydraulic line 56$w$) and the hydraulic chamber 440$w$ via the control bore 442$w$. In the position shown in FIG. 22, the control bore 442$w$ is in contrast laterally offset from the hydraulic-line sections connecting the hydraulic line 56$w$ to the hydraulic chamber 440$w$, so that the connection between the hydraulic line 56$w$ and the hydraulic chamber 440$w$ is interrupted.

The hydraulic piston 432$w$ is preloaded by a preloading spring 444$w$ in an open position, in which the valve element 440$w$, via the control bore 442$w$, opens the connection between the hydraulic line 56$w$ and the hydraulic chamber 440$w$. If the pneumatic source 51 connected to the pneumatic chamber 438$w$ via the pneumatic connection 434$w$ provides sufficient pneumatic pressure, the pneumatic cushion contained in the pneumatic chamber 438$w$, on account of appropriate dimensioning of the preloading spring 444$w$, presses the piston 432$w$ against the action of the preloading spring 444$w$ into the closed position shown in FIG. 22. The same effects with regard to overload protection and signaling to the driver as in the exemplary embodiment in FIG. 20 are achieved; the only difference is that the valve 410$w$ is operated by the pneumatic pressure of the pneumatic source 51.

Figure 23:
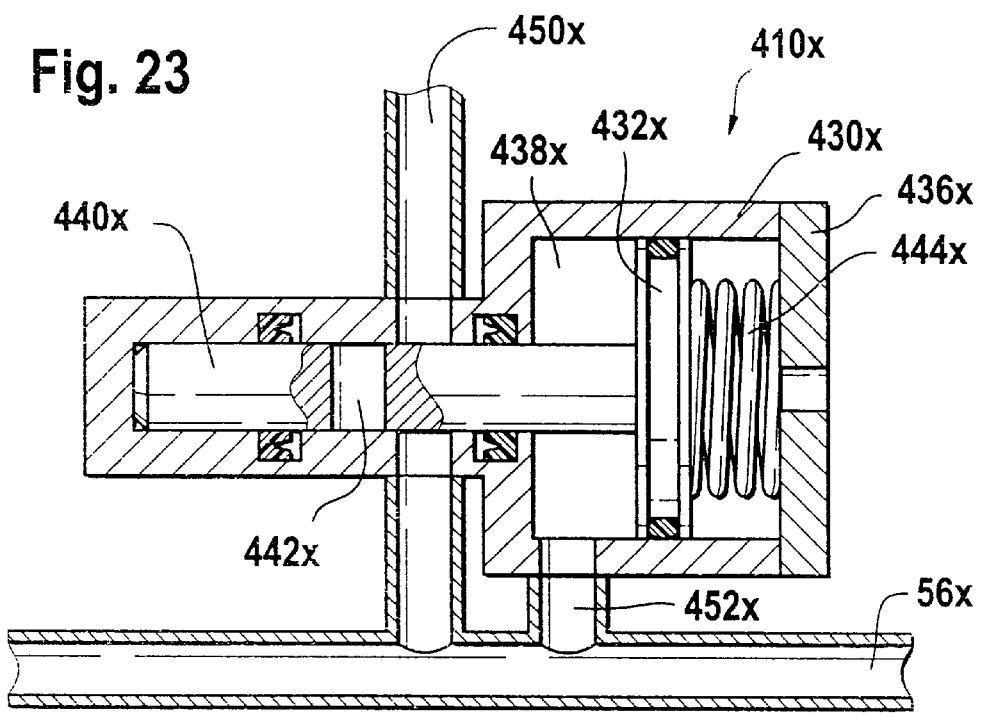
FIG. 23 shows an exemplary embodiment of a signaling and protection device, in which, instead of a compensating reservoir (FIG. 22), a hydraulic connection to a pressureless hydraulic-medium reservoir is provided.

Instead of the valve 410$w$, the hydraulically operated valve in FIG. 23 could also be provided such that the connection between hydraulic line 56$w$ and hydraulic chamber 440$w$ opens when the hydraulic pressure in the hydraulic system reaches a preset threshold value. Reference is made to the following description of the exemplary embodiment in FIG. 23.

The exemplary embodiment of a signaling and protection device shown in FIG. 23 comprises an overload valve 410$x$, which in a first control state closes a connection between the hydraulic system (line 56$x$) and a pressureless hydraulic-medium reservoir and in a second control state opens this connection. To this end, the valve 410$x$ is interposed in a hydraulic line 450$x$, which leads from the hydraulic line 56$x$ to the reservoir. The basic construction of the valve 410$x$ is similar to that of the valve 410$w$. However, the valve 410$x$ is a hydraulically actuated valve, in which the preloading spring 444$x$, compared with the valve in FIG. 22, is arranged on the other side of the hydraulic piston 432$x$ and loads the latter in the direction of a closed position, in which the control bore 442$x$ of the valve element 440$x$ is laterally offset from the hydraulic line 450$x$, and accordingly the hydraulic connection between the hydraulic line 56$x$ and the reservoir via the hydraulic line 450$x$ is interrupted by the valve element 440$x$. Provided on the other side of the hydraulic piston 432*x* is a hydraulic chamber 438*x*, which is connected to the hydraulic line 56*x* via a hydraulic line 452*x*. The preloading spring 444*x* is dimensioned in such a way that, when the pressure in the hydraulic system reaches a certain threshold value, the hydraulic medium in the hydraulic chamber 438*x* can move the hydraulic piston 432*x* against the action of the spring 444*x* into an open position, in which the control bore 442*x* is in alignment with the hydraulic line 450*x*, and accordingly the hydraulic connection between the hydraulic line 56*x* and the reservoir is produced. The hydraulic medium can then flow out of the hydraulic system into the reservoir, as a result of which a corresponding pressure drop occurs in the hydraulic system, which manifests itself in freeing of the clutch pedal, and this freeing of the clutch pedal can be felt by the driver. Thus the important signal is given to the driver, and on the other hand protection from excessive hydraulic pressures in the hydraulic system is achieved. After release of the clutch pedal, the hydraulic medium which has flowed out of the hydraulic system into the reservoir can flow back via a snifter bore in the hydraulic master cylinder of the clutch-pedal arrangement into the hydraulic system connecting the hydraulic master cylinder to the positioning arrangement.

Figure 24:
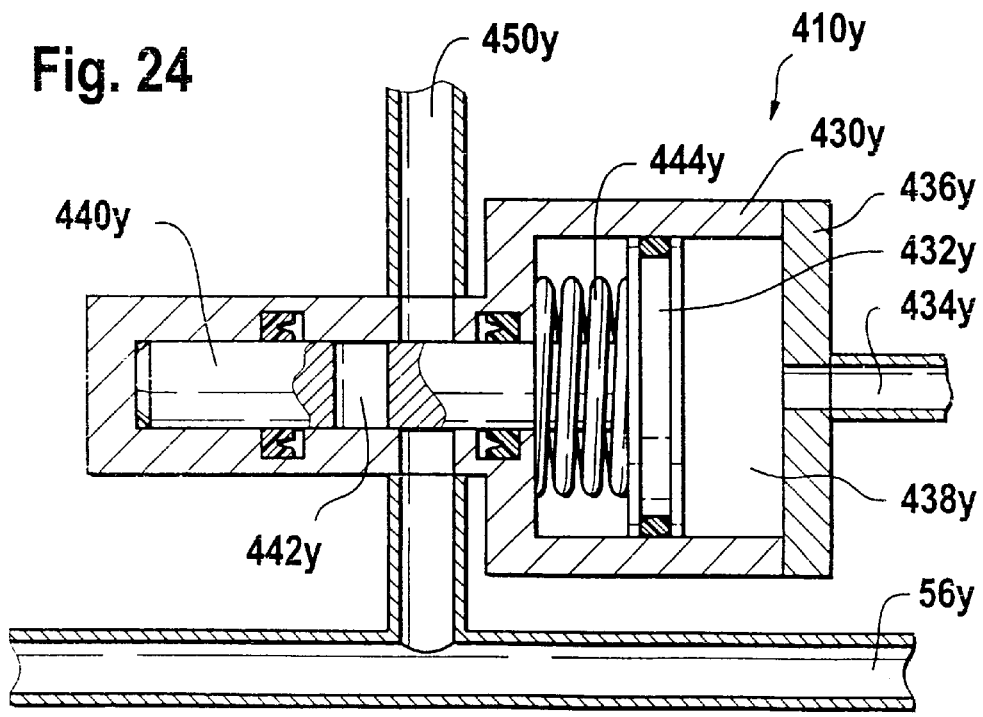
FIG. 24 shows a variant of the exemplary embodiment in FIG. 23, in which the valve is not connected hydraulically but pneumatically.

Instead of the hydraulically operated valve 410*x*, a pneumatically operated valve like the valve 410*w* in FIG. 22 may also be provided in order to open and close the hydraulic connection between the hydraulic system and the reservoir. This design of the signaling and protection device is shown in FIG. 24. With regard to the mode of operation and the construction of the pneumatically operated valve 410*y*, reference is made to the explanation of the construction and the mode of operation of the valve 410*w* in FIG. 22, the valve 410*w* being identical in this respect.

Figure 25A:
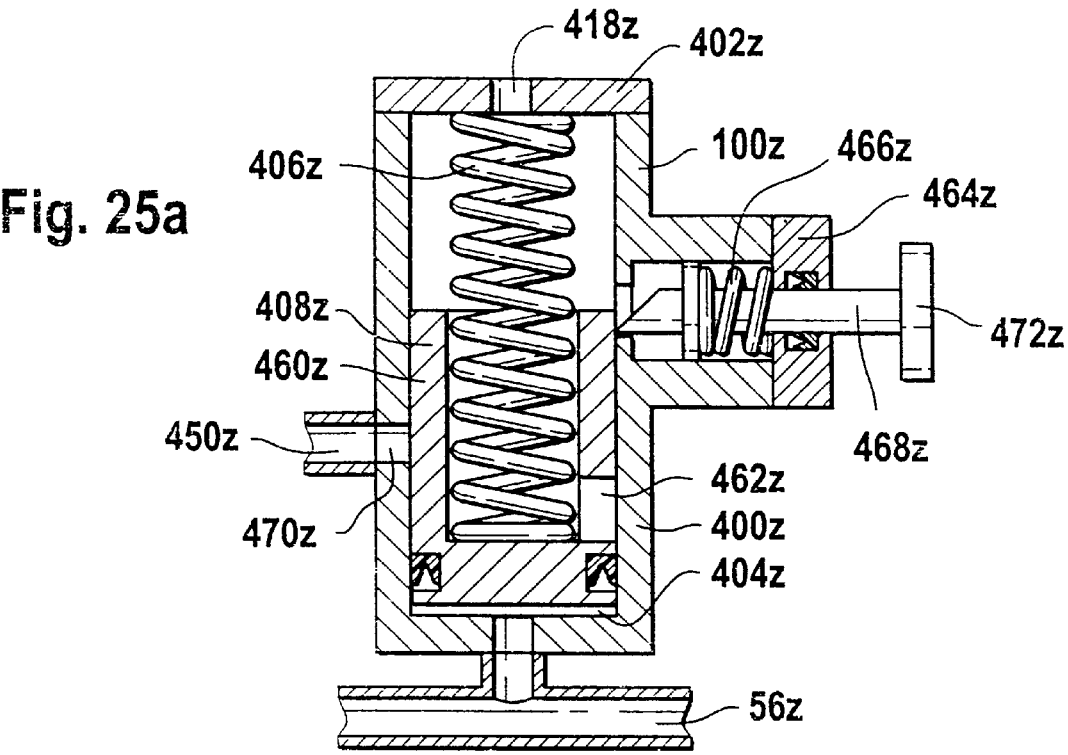
FIG. 25 shows a further exemplary embodiment of a signaling and protection device according to the invention, having an overload valve integrated in a hydraulic pressure accumulator, the pressure-accumulator function being effective in FIG. 25a, and the overload valve being open, with the pressure-accumulator function neutralized, in FIG. 25b.
Figure 25B:
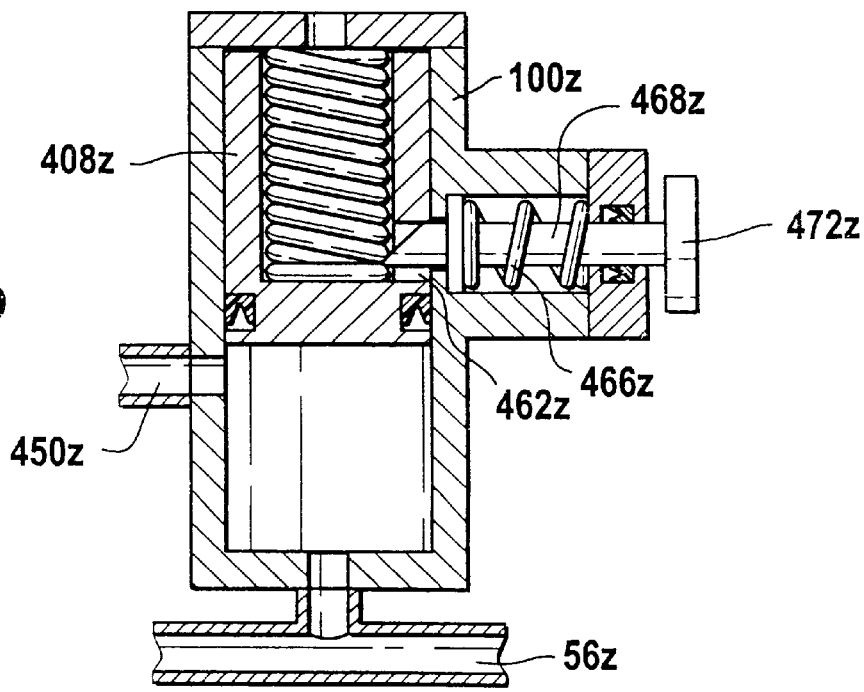

FIG. 25 shows an exemplary embodiment of a signaling and protection device according to the invention having a hydraulic pressure accumulator 100*z*, which could be provided instead of the overload-protection unit 100 in the actuating installation in FIG. 1. The accumulator comprises a housing 400*z* having a cap 402*z*, which has an air-relief opening 418*z* and in which a chamber is formed. Displaceably arranged in the chamber is a hydraulic piston 408*z*, which together with the housing walls defines a hydraulic chamber 404*z*. The piston 408*z* is preloaded by a preloading spring 406*z* in the direction of a reduction in size of the hydraulic chamber 404*z*, which is constantly connected to the hydraulic line 56*z*, which in the case of the exemplary embodiment in FIG. 1 is the hydraulic line connecting the hydraulic master cylinder of the clutch-pedal arrangement to the control valve.

From a certain pressure level in the hydraulic system, the arrangement according to FIG. 25 works in exactly the same way as the pressure accumulator in FIG. 21, since the compression spring 406*z* is appropriately dimensioned. That is to say, a further rise in the hydraulic pressure in the hydraulic system is prevented, except for a slight rise in accordance with the increasing preloading of the spring 406*z*, and hydraulic pressure peaks in the hydraulic system are smoothed.

However, the hydraulic piston 408*z* differs from the hydraulic piston 408*v* owing to the fact that a latching opening 462*z* is provided in a tubular wall section 460*z* of the piston 408*z*, and assigned to this latching opening 462*z* is a latching pin 468*z*, which is preloaded in a housing section 464*z* by means of a preloading spring 466*z* in the direction of a latching position. In the course of a continuous increase in the volume of the hydraulic chamber 404*z*, the hydraulic piston 408*z*, when a preset hydraulic-medium volume has flowed into the hydraulic chamber 404*z*, reaches a latching position, in which the latching pin 468*z* engages in the latching opening 462*z* and holds the piston against the action of the preloading spring 406*z* in the position reached. As soon has the hydraulic piston 408*z* has reached the latching position, it opens a hydraulic connection 470*z*, to which a hydraulic line 450*z* leading to a pressureless hydraulicmedium reservoir is connected. As a result, a flow connection is produced between the hydraulic line 56*z* and the hydraulic-medium reservoir, so that the hydraulic medium can flow unimpeded out of the hydraulic system into the hydraulic reservoir. The effect achieved in connection with FIG. 23 is achieved, namely prevention of a further pressure rise in the hydraulic system on account of a pronounced drop in the hydraulic pressure, as a result of which the clutch pedal is freed as it were, and it can thus be actuated without substantial counterforces, so that the important signal to the effect that the actuating installation is momentarily not working properly or momentarily cannot work properly is given to the driver. Instead of leading to the hydraulic reservoir, the hydraulic line 450*z* could also lead to an intermediate accumulator like the accumulator 400*w*, which does not work as a pressure accumulator but only as a hydraulic-medium intermediate accumulator.

The control state described, with hydraulic piston arranged in the latching or open position, which hydraulic piston, with regard to the opening and closing of the connection 470*z*, may also be regarded as a valve element, is shown in FIG. 15*b*. The hydraulic piston or the valve element 408*z*, by manual actuation of the latching pin 468*z* for disengaging from the latching opening 462*z*, can be moved back into the position shown in FIG. 15*a*; to this end, the latching pin 468*z* has a head 472*z* at which the latching pin 468*z* can be pulled out of the latching opening 462*z* against the action of the spring 466*z*.

Figure 26:
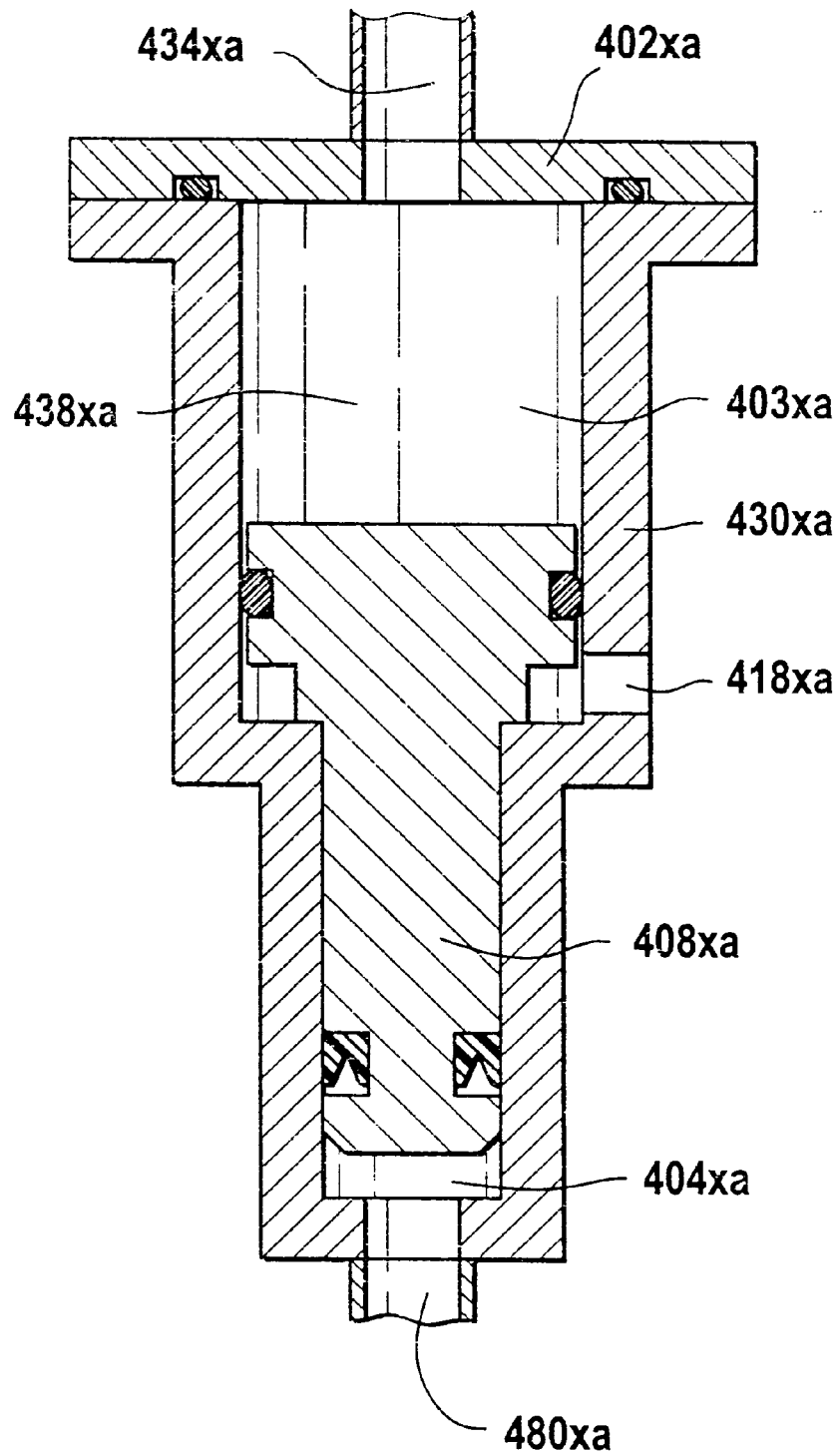
FIG. 26 shows an exemplary embodiment of a signaling and protection device according to the invention, which in a first operating state serves as a pneumatically preloaded pressure accumulator and in a second operating state serves as a hydraulic-medium intermediate accumulator for reducing a hydraulic pressure.

The exemplary embodiment of a signaling and protection device according to the invention shown in FIG. 26, in a first operating state, performs a pressure-accumulator function with retention of the hydraulic pressure reached and, in a second operating state, performs a pressure-medium intermediate-accumulator function for the hydraulic-pressure relief with significant reduction in the hydraulic pressure. To this end, a chamber 403*xa* is formed in a housing 430*xa* having a cap 402*xa*, and this chamber 403*xa* is subdivided into a hydraulic-chamber part 404*xa* and a pneumatic-chamber part 438*x* a by a piston 408*xa* displaceable in a sealed manner in the chamber 403*xa*. The hydraulic-chamber part 404*xa*, hereinafter the hydraulic chamber 404*xa*, is connected via a hydraulic line 480*xa* to the hydraulic system connecting the hydraulic master cylinder having the clutch-pedal arrangement to the control valve, so that the same hydraulic pressure prevails in the hydraulic chamber 404*xa*. The pneumatic-chamber part 438*x* a, hereinafter pneumatic chamber 438*x* a, is connected to the pneumatic source 51 via a pneumatic line 434*x* a. Provided the pneumatic source 51 delivers sufficient pneumatic pressure, the pneumatic cushion contained in the pneumatic chamber 438*x* a acts as a pneumatic spring, which elastically preloads the piston 408*xa* in the direction of a reduction in size of the hydraulic chamber 404*xa*. The piston 408*xa* then performs a function like the piston 408*v* of the exemplary embodiment in FIG. 21, so that the arrangement works as a pressure accumulator and smooths hydraulic pressure peaks in the hydraulic system. The preloading achieved by the pneumatic cushion is matched to the normal hydraulic pressure in the hydraulic piston by virtue of the fact that the effective area of the hydraulic-chamber-side end of the piston 408xa and the effective area of the pneumatic-chamber-side end of the piston 408xa are appropriately matched to one another. In the exemplary embodiment in FIG. 26, the piston 408xa has a markedly smaller cross-sectional area in the region of the hydraulic chamber 404xa than in the region of the pneumatic chamber 438x a.

If the pneumatic source 51 cannot deliver sufficient pneumatic pressure, the piston 408xa, during a clutch-pedal actuation, is displaced, without substantial counterforces, in the direction of an increase in size of the hydraulic chamber 404xa by the hydraulic medium flowing into the latter, so that the hydraulic pressure in the hydraulic system drops to a marked degree and the clutch pedal can be actuated at least a little way without substantial counterforces, that is, it is freed. As a result, a signal to the effect that the actuating installation is momentarily inoperative is given to the driver. Thus the arrangement in FIG. 26, which is of surprisingly simple construction per se, provides a signaling and protection device which on the one hand provides a pressure-accumulator function for smoothing pressure peaks in the hydraulic system and provides a protective function to counter a rise in the hydraulic pressure to damaging values, this protective function being combined with a signaling function.

Shown in FIG. 27 is a hydraulic measuring cylinder 82xb, which could be provided in the exemplary embodiment in FIG. 1 instead of the hydraulic measuring cylinder 82. For simpler understanding, it may be pointed out that the control-valve construction unit 40xb of the exemplary embodiment in FIG. 27, with respect to a transmission input shaft (not shown), is arranged in a position which is rotated through 180° about the clutch axis relative to the position of the control-valve construction unit 40 according to FIG. 1. In FIG. 27, therefore, the transmission input shaft must be imagined as being below the detail shown.

Displaceably arranged in the hydraulic chamber forming the hydraulic measuring cylinder 82xb is a measuring piston 86xb, which is connected via a carrier 96xb to the release-bearing arrangement (not shown). The measuring piston 86xb is thus motionally coupled to the release-bearing arrangement with regard to the axial position relative to the clutch axis.

The measuring piston 86xb has a compensating chamber 480xb, which opens toward the hydraulic chamber 76xb and in which a hydraulic compensating piston 482xb is displaceably arranged. The compensating piston 482xb is preloaded by a preloading spring 406xb in the direction of the hydraulic-chamber-side opening 76xb and, according to the representation in FIG. 27, runs against a stop ring 484xb, which prevents the compensating piston 482xb from coming out of the compensating chamber 480xb.

The mode of operation of the arrangement corresponds to a combination of the function of the hydraulic measuring cylinder 82 and the overload-protection unit 100 in FIG. 1. On the one hand, the volume of the hydraulic chamber 76xb is determined by the position of the measuring piston 86xb, this position being determined by the axial position of the release-bearing arrangement. If the pressure in the hydraulic chamber 76xb rises, for example because the positioning arrangement is not working during a clutch-pedal actuation on account of a lack of pneumatic pressure, the compensating piston 482xb is pressed into the compensating chamber against the force of the preloading spring 406xb, so that the volume in the hydraulic chamber 76xb increases accordingly (that region of the compensating chamber which is cleared by the compensating piston 482xb is in this case classed as belonging to the hydraulic chamber 76xb). The hydraulic medium present in the hydraulic chamber 76xb always acts against the hydraulic piston 482xb, and the preloading of the spring 406xb is selected in such a way that the piston 482xb together with the compensating chamber 480xb serves as a pressure accumulator. As a result, pressure peaks in the hydraulic system are smoothed and an excessive rise in the hydraulic pressure is prevented. As in the case of the overload-protection unit 100, however, no clear signal is given to the driver if the device responds for limiting the hydraulic pressure.

FIG. 28 shows an embodiment variant of the arrangement according to FIG. 27, which, despite only slight modifications, exhibits considerable functional differences from the embodiment in FIG. 27. In the exemplary embodiment in FIG. 28, the preloading spring 406xc is designed for substantially lighter loading, and the compensating piston 482xc, by a latching spring engaging in annular recesses in the piston and the hydraulic measuring cylinder 86xc, is held in a position in which the piston 482xc bears against the stop ring 484xc.

As long as the pressure in the hydraulic chamber 76xc does not exceed a threshold value, the compensating piston 482xc is retained by the latching spring 490xc in a positive-locking manner in this position bearing against the stop ring 484xc. The volume of the hydraulic chamber 76xc is determined solely by the axial position of the hydraulic measuring piston 86xc. However, if the pressure in the hydraulic chamber 76xc exceeds a threshold value, the latching spring 490xc disengages and releases the compensating piston 482xc, so that the latter, under the effect of the hydraulic pressure in the hydraulic chamber 76xc, now moves into the compensating chamber 480xc in the direction of an increase in the size of the hydraulic chamber 76xc against the action of the spring 406x. Since the preloading spring 406xc is correspondingly designed for light loading, an effect is achieved as in the case of the exemplary embodiments in FIGS. 20 and 22. The compensating chamber 480xc and the compensating piston 482xc thus then work as a hydraulic-medium intermediate accumulator without a substantial pressure-accumulator function, so that the hydraulic pressure in the hydraulic system drops significantly, and the clutch pedal is accordingly freed at least a little way. As a result, the driver receives the signal to the effect that the signaling and protection device has responded and accordingly the actuating installation is momentarily inoperative. In contrast to the exemplary embodiment in FIG. 27, the hydraulic pressure in the hydraulic system is not sufficient during the same clutch-pedal-actuating stroke to actuate the control valve, if sufficient pneumatic pressure should again be available during this clutch-pedal stroke.

Figure 29:
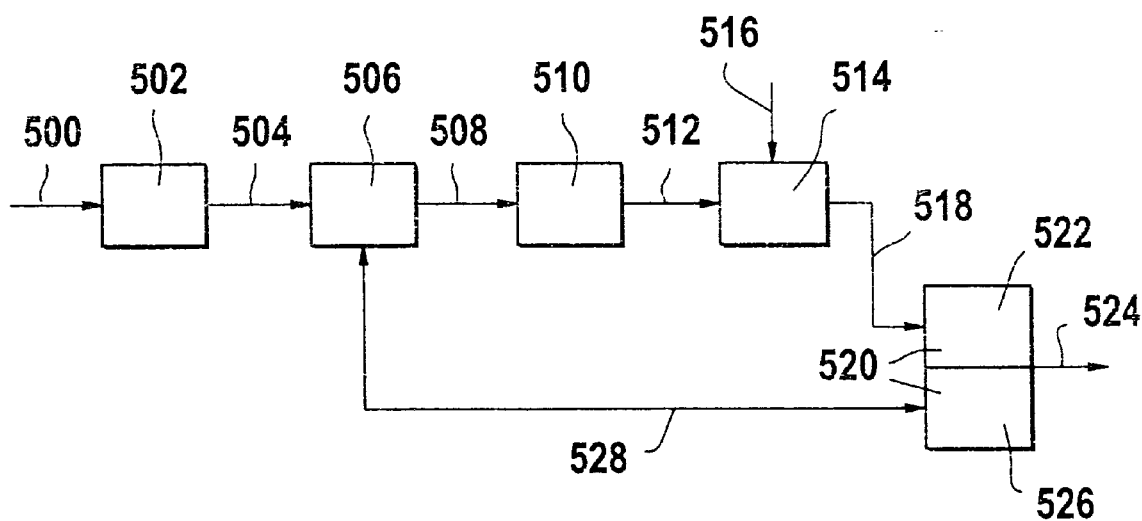
FIG. 29 shows a typical signal-flow diagram of an actuating installation (such as, for example, the actuating installation in FIG. 1).

Finally, a signal-flow diagram, which is shown in FIG. 29 and explains the mode of operation of an exemplary embodiment of an actuating installation according to the invention, is to be explained in more detail. If the friction clutch is to be actuated, a corresponding input signal 500 is input into the system by means of a first mechanism 502. The first mechanism 502 comprises the clutch pedal, the master-cylinder plunger and the master-cylinder housing. The clutch-pedal travel and/or the pedal force may be regarded as the input signal 500. The input signal 500 is converted into a first signal 504 by means of the first mechanism 502, in which case the master-cylinder travel and/or the master-cylinder piston force may be regarded as the first signal. The first signal is fed to a hydraulic means 506, comprising the hydraulic system, that is the hydraulic line between master cylinder and positioning arrangement and all the hydraulically loaded components. The hydraulic means 506 produces a second signal 508, namely the hydraulic pressure acting in the hydraulic system. The latter acts on a second mechanism 510, comprising the pressure balance of the control valve, that is the pressure-balance housing and the control piston. The second mechanism 510 converts the second signal 508 into a third signal 512, namely control-piston/pneumatic-valve travel. This third signal 512 acts on a third mechanism 514, namely the pneumatic part of the control valve, that is the actual pneumatic valve (pressure-balance pneumatic valve), which receives as auxiliary signal 516 the pneumatic pressure provided by the pneumatic source 51. The third mechanism 514 outputs a fourth signal 518, namely the pneumatic volume (air mass) delivered in accordance with the state of the control valve. This fourth signal is fed to a fourth mechanism 520, namely the pneumatic part 522 of the actuating arrangement, that is, in particular, the pneumatic-power-cylinder piston and the pneumatic-cylinder housing. The clutch-release travel or the release force is output from this fourth mechanism as an output signal 524.

Via the hydraulic part 526 of the fourth mechanism 520, namely the hydraulic measuring cylinder, the resulting release-bearing position is fed back to the hydraulic means 506 by means of a fifth signal 528, so that a control loop is formed.

Suitable as starting points for a signaling and protection device according to the invention are all signals which depend directly or indirectly on or are identical to the input signal or the auxiliary signal and which can be evaluated to determine whether the actuating installation in which the overload-protection function and/or the signal function is to be effective for the driver is in the operating state. Thus, as in the exemplary embodiments described above, the force exerted on the clutch pedal, the master-cylinder plunger or the master-cylinder piston may be evaluated, or the hydraulic pressure in the hydraulic system or the pneumatic pressure delivered by the pneumatic source may be evaluated. Furthermore, it would be possible to compare the input signal 500 with the output signal 524 to determine whether a travel difference exceeding a threshold occurs, which travel difference necessitates a response of the protection and signaling device. Furthermore, it is possible to evaluate variables which depend indirectly on said signals, for example the velocity of the clutch-pedal actuation or a hydraulic volumetric flow in the hydraulic system, this flow depending indirectly on the pedal-actuating velocity.

If the signal and protection device responds, the various operative mechanisms already mentioned may be used; thus a signal lying further on the input side in the chain 500, 504, 508, 512 may be blocked in order to limit an increase in the signal following it in the signal-flow direction (cf. exemplary embodiments in FIGS. 2 to 8, in which the input signal 500 is blocked; and the exemplary embodiments in FIGS. 18 and 19, in which the second signal 508 is blocked). Furthermore, it is possible to store a signal appearing further on the input side in the chain (cf., for example, the exemplary embodiment in FIG. 9, in which the input signal 500 is stored, and the exemplary embodiment in FIG. 21, in which the second signal 508 is stored). Furthermore, it is possible to dissipate, as it were, a signal lying further on the input side in the chain (cf. the exemplary embodiments in FIGS. 11 and 12, in which the input signal is "dissipated", and the exemplary embodiments in FIGS. 23 and 24, in which the second signal 508 is "dissipated"). A combination of storing and dissipation is also possible, as shown by the exemplary embodiments in FIGS. 15 to 17 and 25 and 26.

The location at which the overload detection is to be effected depends on which signal is evaluated for this purpose. The overload detection may be effected mechanically, hydraulically or electrically or, in the event of an evaluation of the auxiliary signal 516, mechanically or electrically.

In summary, the present invention relates to an actuating installation for a friction clutch arranged in the drive line between a drive unit and a transmission and having an actuating arrangement for the actuation of the friction clutch and a clutch-pedal arrangement, which is connected to the actuating arrangement and has a clutch pedal, which, in a first operating state, can be actuated according to a force-travel characteristic of a first type. It is proposed that the actuating installation have a signaling and/or protection device, which is in operative connection with or is operatively integrated in the clutch-pedal arrangement, so that, after the response of the signaling and/or protection device to a second operating state, the clutch pedal can be actuated only according to a force/travel characteristic of a second type, which differs significantly from the force/travel characteristic of the first type in order thus to indicate the second operating state.

The invention is not limited by the embodiments described above which are presented as examples only but can be modified in various ways within the scope of protection defined by the appended patent claims.

We claim:

1. An actuating installation for a friction clutch arranged in a drive line of a motor vehicle between a drive unit and a transmission, comprising:

actuating means for actuating the friction clutch;

a clutch-pedal arrangement connected to the actuating means and having a clutch pedal operatively connected to the actuating means for actuating the friction clutch via the actuating means, the clutch pedal, in at least one first operating state of at least one of the actuating installation, the friction clutch and the motor vehicle, being actuable according to a force/travel characteristic of a first type; and a signaling and protection device one of in operative connection with and operatively integrated in the clutch-pedal arrangement so as to be responsive to at least one second operating state of at least one of the actuating installation, the friction clutch and the motor vehicle so that the clutch pedal, in a response state of the device, can be actuated only according to a force/travel characteristic of a second type, which, in order to indicate the second operating state, differs significantly from a force/travel characteristic of the first type.

2. An actuating installation as defined in claim 1, wherein the device is configured to receive at least one of an electric, mechanical, hydraulic, pneumatic and optical signal which directly or indirectly indicates whether a first or a second operating state is present.

3. An actuating installation as defined in claim 2, wherein the respective signal is represented by one of a voltage, a current, a pressure, a force, a volume, a travel, an angle and a light intensity.

4. An actuating installation as defined in claim 2, wherein the signal represents a primary variable which one of determines the operating state and corresponds to an actuating state of one of the actuating means and the clutch-pedal arrangement.

5. An actuating installation as defined in claim 4, and further comprising a hydraulic system that connects the clutch-pedal arrangement to the actuating means, and a pneumatic system assigned to the actuating means, the primary variable being one of an actuating force, a hydraulic pressure in the hydraulic system connecting the clutch-pedal arrangement to the actuating arrangement, a pneumatic pressure in the pneumatic system assigned to the actuating arrangement, an actuating-travel difference, an actuating velocity and a hydraulic-medium volumetric flow (volume per unit of time) in the hydraulic system.

6. An actuating installation as defined in claim 5, wherein the device is operatively configured to respond to at least one of a clutch-pedal force exceeding a limit value; a hydraulic pressure exceeding a limit value in the hydraulic system connecting the clutch-pedal arrangement to the actuating arrangement; an incorrect or exceptional state of at least one of the actuating installation, the friction clutch and the motor vehicle; a pneumatic pressure undershooting a limit value in the pneumatic system assigned to the actuating installation; an actuating velocity, exceeding a limit value, of the clutch pedal; a hydraulic-medium volumetric flow (volume per unit of time) exceeding a limit value in the hydraulic system connecting the clutch-pedal arrangement to the actuating means; and a difference exceeding a limit value between clutch-pedal-side actuating travel and clutch-side actuating travel.

7. An actuating installation as defined in claim 4, wherein the device, in the response state, is operative to prevent a secondary variable from rising above a critical threshold, the secondary variable occurring in the actuating installation and being dependent on the actuating state of the clutch-pedal arrangement.

8. An actuating installation as defined in claim 5, wherein the device is operative to smooth peaks of a secondary or tertiary variable occurring in the actuating installation and dependent on the actuating state of the clutch-pedal arrangement.

9. An actuating installation as defined in claim 8, wherein at least one of the secondary variable and the tertiary variable is one of an actuating force, a hydraulic pressure in the hydraulic system connecting the clutch-pedal arrangement to the actuating arrangement, an actuating-travel difference, an actuating velocity and a hydraulic-medium volumetric flow (volume per unit of time) in the hydraulic system.

10. An actuating installation as defined in claim 8, wherein the device is operative to act on the secondary or tertiary variable so as to at least one of limit a rise in said variable and smooth said variable by virtue of at least one of the following measures:
  a) i) an actuating force stored in an energy storage arrangement;
     ii) the actuating force is absorbed by an abutment arrangement;
  b) actuating travel is absorbed by an idle-travel arrangement;
  c) an actuating velocity is decelerated by a braking device;
  d) i) a hydraulic connection is interrupted by a hydraulic interrupt device;
     ii) the hydraulic connection is choked by a hydraulic choke device;
  e) i) hydraulic medium is stored intermediately by a hydraulic pressure accumulator arrangement; and
     ii) the hydraulic medium is at least one of discharged by a hydraulic discharge device into a pressureless or pressure-reduced region of the hydraulic system and stored intermediately by a hydraulic-medium intermediate-accumulator arrangement while reducing the hydraulic pressure prevailing in the hydraulic system.

11. An actuating installation as defined in claim 10, wherein a plurality of measures mentioned under a) to e) are used at least one of simultaneously and successively according to a preset program of travel measures in order to provide a certain force/travel characteristic.

12. An actuating installation as defined in claim 11, wherein, during a course of a clutch-pedal actuation, after the response of the device, the force/travel characteristic is first significantly determined by at least one of measure a) i) and measure e) i) and is then significantly determined by at least one of measure b), measure e) ii), measure a) ii), and measure d) i).

13. An actuating installation as defined in claim 1, wherein a force/travel characteristic of the second type differs from a force/travel characteristic of the first type due to the fact that, according to the force/travel characteristic of the second type, the clutch pedal one of can be actuated against substantially reduced counterforces or even without substantial counterforces at least over a substantial part of its actuating stroke, and can be actuated with actuating forces to be expected from a vehicle driver at most only over a markedly restricted section of the actuating stroke possible according to the force/travel characteristic of the first type or against substantially larger counterforces.

14. An actuating installation as defined in claim 1, wherein the device includes a blocking device by means of which the clutch pedal can be blocked.

15. The actuating installation as defined in claim 14, wherein the blocking device comprises at least one engagement element assigned to the clutch-pedal arrangement for blocking of an actuating movement of the clutch pedal by producing one of a positive-locking and a frictional engagement between the engagement element, moving along during a clutch-pedal actuation, and an associated counterelement secured against an associated movement during the clutch-pedal actuation.

16. An actuating installation as defined in claim 15, wherein the engagement element and the counterelement can be brought into engagement with one another by at least one of mechanical, hydraulic, and electrical conversion of an actuating force exerted on the clutch pedal, and by means of a hydraulic slave-cylinder arrangement, if need be against the action of a preloading-spring arrangement, which preloads the engagement element and the counter-engagement element in a direction of a position without mutual engagement, or wherein the engagement element and the counterelement are preloaded by means of a preloading-spring arrangement in the direction of mutual engagement and can be disengaged from one another by means of a pneumatic-cylinder arrangement against the action of the preloading-spring arrangement.

17. An actuating installation as defined in claim 15, wherein the clutch-pedal arrangement comprises a plunger arrangement, which connects the clutch-pedal to a transmitter-element arrangement, has the engagement element, has a longitudinal axis and is displaceable at least approximately along the longitudinal axis in accordance with the actuating movement of the clutch pedal, the extension of the plunger arrangement being variable in at least one radial direction relative to the longitudinal axis as a function of the actuating force exerted on the plunger arrangement by the clutch pedal, and, if the extension exceeds a limit due to an actuating force exceeding a limit value, the engagement element, projecting beyond the limit, of the plunger arrangement can be brought into one of positive-locking and frictional engagement with the associated counterelement in order to block or brake the actuating movement.

18. An actuating installation as defined in claim 17, wherein the plunger arrangement comprises a first end element, having a clutch-pedal-side end, and a second end element, having a transmitter-element-side end and movable relative to thee first end element, a spring arrangement being effectively arranged between the end elements, the spring arrangement preloads the end elements relative to one another in order to spread the two ends apart, so that a relative movement, shortening a distance between the two ends, of the two end elements against a preloading force of the spring arrangement can be converted into an one of an extension and a swing-out movement of the engagement element, if need be serving as intermediate element, in a direction of the limit.

19. An actuating installation as defined in claim 18, wherein a shortening in the distance between the two ends which is necessary for producing the engagement between the engagement element and the counterelement is substantially less than a disengaging travel of the clutch pedal.

20. An actuating installation as defined in claim 15, and further comprising a transmitter arrangement having the engagement element and a transmitter which is motionally coupled to the clutch pedal and is displaceable along an axis of movement in accordance with the actuating movement of the clutch pedal so that an extension of the transmitter element is variable in at least one radial direction relative to the axis of movement as a function of an actuating force exerted on the transmitter element by the clutch pedal and so that, if the extension exceeds a limit due to an actuating force exceeding a limit value, the engagement element projecting beyond the limit, of the transmitter element can be brought into one of positive-locking and frictional engagement with the associated counterelement in order to block the actuating movement.

21. An actuating installation as define in claim 20, wherein the transmitter element comprises a first sectional element, motionally coupled to the clutch pedal, and a second sectional element, movable relative to the first sectional element, and a spring arrangement being effective between the sectional elements so as to preload the sectional elements relative to one another in order to spread the two sectional elements apart so that a relative movement of the two sectional elements toward one another against a preloading force of the spring arrangement can be converted into one of an extension and a swing-out movement of the engagement element in the direction of the limit.

22. An actuating installation as defined in claim 21, wherein the relative movement of the two sectional elements which is necessary for producing the engagement between engagement element and counterelement is substantially less than the disengaging travel of the clutch pedal.

23. An actuating installation as defined in claim 16, and further comprising a pedal anchor secured in the vehicle, the pedal anchor one of carries the engagement element and serves as the engagement element, the clutch pedal one of carrying the counterelement and serving as the counterelement.

24. An actuating installation as define in claim 23, wherein the clutch pedal can be locked in a positive manner on the pedal anchor in a preset position by the engagement element and the counterelement .

25. An actuating installation as defined in claim 24, wherein one of the engagement element and the counterelement is a sliding pin which engages in an opening of the other element of the engagement element and the counterelement in order to block the clutch pedal.

26. An actuating installation as defined in claim 1, wherein the device comprises at least one of a hydraulic interrupt and choke device, which serves as a blocking device for the clutch pedal and by means of which a hydraulic connection connecting a hydraulic master-cylinder arrangement of the clutch-pedal arrangement to the actuating means can be interrupted and choked.

27. An actuating installation as defined in claim 26, wherein the hydraulic interrupt and choke device comprises a barrier element which can be moved out of a through position without interrupting or choking the hydraulic connection into a barrier position and, in the barrier position, at least reduces a cross section of a hydraulic passage.

28. An actuating installation as defined in claim 27, wherein the barrier element can be put into the barrier position by at least one of mechanical, hydraulic and electrical conversion of an actuating force exerted on the clutch pedal, and by means of a hydraulic slave-cylinder arrangement against the action of a preloading-spring arrangement, which preloads the barrier element in a direction of the through position, the barrier element being movable into the barrier position by a preloading arrangement that preloads the barrier element in the direction of the barrier position and being movable into the through position from the barrier position by a pneumatic-cylinder arrangement against the action of the preloading-spring arrangement.

29. An actuating installation as defined in claim 28, wherein the hydraulic slave-cylinder arrangement is connected at a point of the hydraulic connection which lies between the hydraulic passage and the hydraulic master-cylinder arrangement.

30. An actuating installation as defined in claim 1, wherein the device has a freeing and idle-travel arrangement by means of which the clutch pedal can be freed and, in a response state, permits an actuating movement of the clutch pedal via idle travel, corresponding to at least a substantial part of normal clutch-pedal-actuating travel, without clutch actuation and without damaging components of the actuating installation.

31. An actuating installation as defined in claim 30, wherein the freeing and idle-travel arrangement comprises a first element, which moves during a clutch-pedal actuation, and a second element, which is motionally coupled to a transmitter element of a transmitter-element arrangement, the first element and the second element being motionally coupled and can be moved relative to one another for the freeing of the clutch pedal and for the provision of idle travel.

32. An actuating installation as defined in claim 31, wherein the first element is the clutch pedal.

33. An actuating installation as defined in claim 32, wherein the second element is one of a clutch-pedal plunger and a pivoted element pivotable with the clutch pedal about a common pivot.

34. An actuating installation as defined in claim 33, wherein the clutch-pedal plunger, at least in a certain area, is designed as a spring element that is preloaded in a direction of a maximum effective length of the plunger and, during shortening of an effective length of the plunger, starting from a maximum effective plunger length, is increasingly loaded.

35. An actuating installation as defined in claim 31, wherein the first element and the second element are integrated in a plunger arrangement connecting the clutch pedal to the transmitter element and permit shortening in length of the plunger arrangement in order to one of free the clutch pedal and provide idle travel.

36. An actuating installation as defined in claim 1, wherein the clutch-pedal arrangement comprises a plunger arrangement having a first plunger member and a second plunger member, said first and second plunger members, in order to shorten an effective length of the plunger arrangement, being movable relative to one another.

37. An actuating installation as defined in claim 36, wherein a spring arrangement is effective between the two plunger members so that the plunger members, at least in a relative-position region adjoining a relative position having maximum effective length of the plunger arrangement, one of can be preloaded relative to one another and are preloaded relative to one another in a direction of an increase in the effective length.

38. An actuating installation as defined in claim 36, wherein a pneumatic slave-cylinder arrangement is formed in the plunger arrangement for moving the two plunger members relative to one another for increasing the effective length and for securing the two plunger members in a given relative position.

39. An actuating installation as defined in claim 37, wherein the first element and the second element, for the motional coupling, can be locked on one another in a positive manner.

40. An actuating installation as defined in claim 37, and further comprising latching means for latching the first element and the second element together to create the motional coupling.

41. An actuating installation as defined in claim 40, wherein the latching means comprises at least one locking element which is movable between a locking position and an unlocking position and which can be put into the unlocking position by at least one of mechanical, hydraulic and electrical conversion of an actuating force exerted on the clutch pedal, and by means of a hydraulic slave-cylinder arrangement which preloads the locking element in the direction of the locking position, the locking element being preloaded by a preloading-spring arrangement in a direction of the unlocking position and can be put into the locking position by means of a pneumatic-cylinder arrangement against the action of the preloading-spring arrangement.

42. An actuating installation as defined in claim 40, wherein the latching means comprises at least one latching element which can be used by at least one of mechanical and hydraulic conversion of an actuating force exerted on the clutch pedal.

43. An actuating installation as defined in claim 42, wherein the latching element is formed one of by a spring element of the spring arrangement effective between the two plunger members and by a clutch-pedal-side end section of the clutch-pedal plunger so that, starting from a maximum effective length of the plunger arrangement, the effective length, at adequate counterforce exerted on the clutch-pedal plunger by the transmitter element, in the response state of the device, can first be shortened by clutch-pedal actuation under elastic deformation and correspondingly increasing loading of the spring element, in the course of which the spring element, after reaching a certain loading, unlatches and the clutch pedal is thereby freed, by permitting a further shortening in the effective length.

44. An actuating installation as defined in claim 1, wherein the device is arranged in a hydraulic system connecting a hydraulic master-cylinder arrangement of the clutch-pedal arrangement to the actuating means and comprises at least one of a hydraulic-medium accumulator and a discharge arrangement, which comprises at least one first hydraulic-medium intermediate accumulator essentially receiving the hydraulic pressure in the hydraulic system, serving as a hydraulic pressure accumulator and if need capable of being rendered active and inactive, and further comprises at least one second hydraulic-medium intermediate accumulator capable of being rendered active and inactive, significantly reducing the hydraulic pressure in the hydraulic system when specifically rendered active and serving as a hydraulic pressure-relief accumulator, and a hydraulic discharge valve for the specific discharge of hydraulic medium to a pressureless or pressure-reduced region of the hydraulic system.

45. An actuating installation as defined in claim 44, wherein the respective hydraulic-medium intermediate accumulator has a holding arrangement for a hydraulic piston, by means of which holding arrangement the intermediate accumulator can be held in the inactive state and which holding arrangement can be released for rendering the intermediate accumulator active, the respective hydraulic-medium intermediate accumulator can be rendered active and inactive by means of a hydraulic valve alternatively opening or closing a hydraulic connection.

46. An actuating installation as defined in claim 45, wherein the holding arrangement can be released at least one of electrically, mechanically, hydraulically and pneumatically; the discharge valve and the hydraulic valve being at least one of an electrically operable, a hydraulically operable, a mechanically operable and a pneumatically operable valve.

47. An actuating installation as defined in claim 46, wherein the respective hydraulic-medium intermediate accumulator can be rendered active by at least one of mechanical, hydraulic and electrical conversion of an actuating force exerted on the clutch pedal, and by means of a hydraulic slave-cylinder arrangement, the respective hydraulic-medium intermediate accumulator can be rendered inactive pneumatically.

48. An actuating installation as defined in claim 44, wherein the hydraulic-medium intermediate accumulator of the hydraulic-medium accumulator arrangement can be switched over between a pressure-accumulator function and a pressure-relief-accumulator function, so that the hydraulic-medium intermediate accumulator, depending on the switching state, serves as one of a first and a second hydraulic-medium intermediate accumulator.

49. An actuating installation as defined in claim 48, wherein the discharge valve and the hydraulic valve can be actuated for opening the valve by at least one of mechanical, hydraulic and electrical conversion of an actuating force exerted on the clutch pedal, and by means of a hydraulic slave-cylinder arrangement, the valve having a valve-element arrangement, which is preloaded by means of a preloading-spring arrangement in the direction of a position opening the valve, and can be put into a position closing the valve by means of a pneumatic-cylinder arrangement against the action of the preloading-spring arrangement.

50. An actuating installation as defined in claim 49, wherein at least one of the discharge valve, the hydraulic valve and a second hydraulic-medium intermediate accumulator is integrated in a first hydraulic-medium intermediate accumulator so that one of the second hydraulic-medium intermediate accumulator is rendered active and the valve is opened when the first hydraulic-medium intermediate accumulator has received a preset hydraulic medium.

51. An actuating installation as defined in claim 50, wherein a holding arrangement is provided so that, after the second hydraulic-medium intermediate accumulator is rendered active or the valve is opened, the holding arrangement keeps the hydraulic-medium intermediate accumulator active or keeps the valve open.

52. An actuating installation as defined in claim 51, wherein the holding arrangement can be actuated at least one of manually, hydraulically, pneumatically, mechanically and electrically for rendering the second hydraulic-medium intermediate accumulator inactive or respectively for closing the valve.

53. An actuating installation as defined in claim 48, wherein the hydraulic-medium intermediate accumulator which can be switched over between a pressure-accumulator function and a pressure-relief-accumulator function has a separating element which subdivides a receiving space into a hydraulic sectional space and a pneumatic sectional space and is movable in the direction of an increase in size of the hydraulic sectional space while the pneumatic sectional space is reduced in size and in the direction of a decrease in the size of the hydraulic sectional space while the pneumatic sectional space is increased in size.

54. An actuating installation as defined in claim 53, wherein the separating element is a piston element, which is displaceably arranged in the receiving space and has a first end face defining the pneumatic sectional space and a second end face defining the hydraulic sectional space, the end faces have surface areas which are preferably adapted to one another, in order to set a response threshold for the pressure-accumulator function.

55. An actuating installation as defined in claim 54, wherein the respective hydraulic-medium intermediate accumulator is integrated in a hydraulic measuring-cylinder arrangement, which detects a position of a release-bearing arrangement of the actuating means and an engaging or actuating state of the friction clutch.

56. An actuating installation as defined in claim 1, wherein the actuating means comprises a positioning arrangement having a control valve, and a release-bearing arrangement serving to actuate the friction clutch, the positioning arrangement comprising a pressure-medium-power cylinder arrangement which acts on the release-bearing arrangement and which, via the control valve connected to a pressure-medium source, can be actuated as a function of a hydraulic or mechanical reference variable and an actual variable representing the position of the release-bearing arrangement so that the reference variable can be produced by means of the clutch-pedal arrangement and can be transmitted to the positioning arrangement by means of a mechanical or hydraulic transmission section.

57. An actuating installation as defined in claim 1, wherein there is no significant difference between the force/travel characteristic decisive in the first operating state and the force/travel characteristic decisive in the second operating state after the response of the device, the device signaling the second operating state in another manner.

58. An actuating installation as defined in claim 57, wherein the device signals the second operating state at least one of by means of an acoustic or optical signaling device, by placing or keeping the drive unit in a state which transmits no drive, and by significant change in a force/travel characteristic of another actuating element.

59. A signaling and protection device for an actuating installation for a friction clutch arranged in a drive line of a motor vehicle between a drive unit and a transmission, and connected to a clutch actuator and a clutch pedal arrangement, the device being one of in operative connection with and operatively integrated in the clutch-pedal arrangement so as to be responsive to at least one second operating state of at least one of the actuating installation,the friction clutch and the motor vehicle so that the clutch pedal, in a response state of the device, can be actuated only according to a force/travel characteristic of a second type, which, in order to indicate the second operating state, differs significantly from a force/travel characteristic of a first type, the force/travel characteristic of the clutch pedal not being significantly influenced or such influencing being possible at all on account of the specific design of the signaling and/or protection device.

* * * * *